United States Patent [19]

Murata et al.

[11] Patent Number: 5,699,443

[45] Date of Patent: Dec. 16, 1997

[54] METHOD OF JUDGING BACKGROUND/ FOREGROUND POSITION RELATIONSHIP BETWEEN MOVING SUBJECTS AND METHOD OF CONVERTING TWO-DIMENSIONAL IMAGES INTO THREE-DIMENSIONAL IMAGES

[75] Inventors: Haruhiko Murata, Takatsuki; Toshiyuki Okino, Kadoma; Shugo Yamashita, Osaka; Susumu Tanase, Hirakata; Toshiya Iinuma, Moriguchi; Hidekazu Uchida, Hirakata, all of Japan

[73] Assignee: Sanyo Electric Co., Ltd., Osaka, Japan

[21] Appl. No.: 600,052

[22] Filed: Feb. 12, 1996

Related U.S. Application Data

[63] Continuation of Ser. No. 530,467, Sep. 19, 1995, abandoned.

[30] Foreign Application Priority Data

Sep. 22, 1994 [JP] Japan .................. 6-228208
Apr. 13, 1995 [JP] Japan .................. 7-88276

[51] Int. Cl.$^6$ .............. G06K 9/00; H04N 13/00
[52] U.S. Cl. .............. 382/107; 382/154; 348/44
[58] Field of Search .............. 382/100, 103, 382/107, 154, 173, 276; 348/25, 44, 155, 169, 699; 395/119, 133, 173; H04N 13/00

[56] References Cited

U.S. PATENT DOCUMENTS

| | | | |
|---|---|---|---|
| 4,335,427 | 6/1982 | Hunt et al. | 364/414 |
| 4,783,833 | 11/1988 | Kawabata et al. | 382/22 |
| 4,994,898 | 2/1991 | Ling et al. | 358/3 |
| 5,283,839 | 2/1994 | Edelman et al. | 382/15 |
| 5,557,684 | 9/1996 | Wang et al. | 382/107 |

FOREIGN PATENT DOCUMENTS

| | | | |
|---|---|---|---|
| 0 205 091 | 12/1986 | European Pat. Off. | H04N 7/137 |
| 2 654 291 | 5/1991 | France | H04N 13/00 |
| 5-91544 | 4/1993 | Japan | H04N 13/00 |
| 88/04804 | 6/1996 | WIPO | G06F 3/14 |

OTHER PUBLICATIONS

Wang et al., "Representing Moving Images with Layers," IEE Transactions on Image Processing. vol. 3, No. 5, Sep. 1994, New York pp. 625–638.
Patent Abstracts of Japan, vol.95,No. 003 & JP-A-059119 (Seiko Epson Co) 17 Dec. 1986, Mar. 3, 1995 abstract.

*Primary Examiner*—Andrew Johns
*Attorney, Agent, or Firm*—Nikaido, Marmelstein, Murray & Oram LLP

[57] ABSTRACT

The present invention relates to a method of judging the back-and-forth positional relationship between subjects. Amounts of horizontal movement of the subjects which are detected for detecting areas set in an image area constituting a 2D image are compared after being assigned plus or minus signs depending on the direction of the movement, thereby to classify all the detecting areas into two types of detecting areas in such a manner that the detecting areas where a relatively large amount of horizontal movement is detected are taken as first detecting areas, while the detecting areas where a relatively small amount of horizontal movement is detected are taken as second detecting areas. A target area is set in a peripheral portion in the image area, to judge which of the total number of first detecting areas existing in the target area and the total number of second detecting areas existing in the target area is larger. It is judged that the subjects in all the detecting areas whose total number existing in the target area is judged to be larger are positioned behind the subjects in all the detecting areas whose total number existing in the target area is judged to be smaller.

17 Claims, 31 Drawing Sheets

| A1 | B1 | C1 | D1 | E1 | F1 | G1 | H1 |
|----|----|----|----|----|----|----|----|
| A2 | B2 | C2 | D2 | E2 | F2 | G2 | H2 |
| A3 | B3 | C3 | D3 | E3 | F3 | G3 | H3 |
| A4 | B4 | C4 | D4 | E4 | F4 | G4 | H4 |
| A5 | B5 | C5 | D5 | E5 | F5 | G5 | H5 |

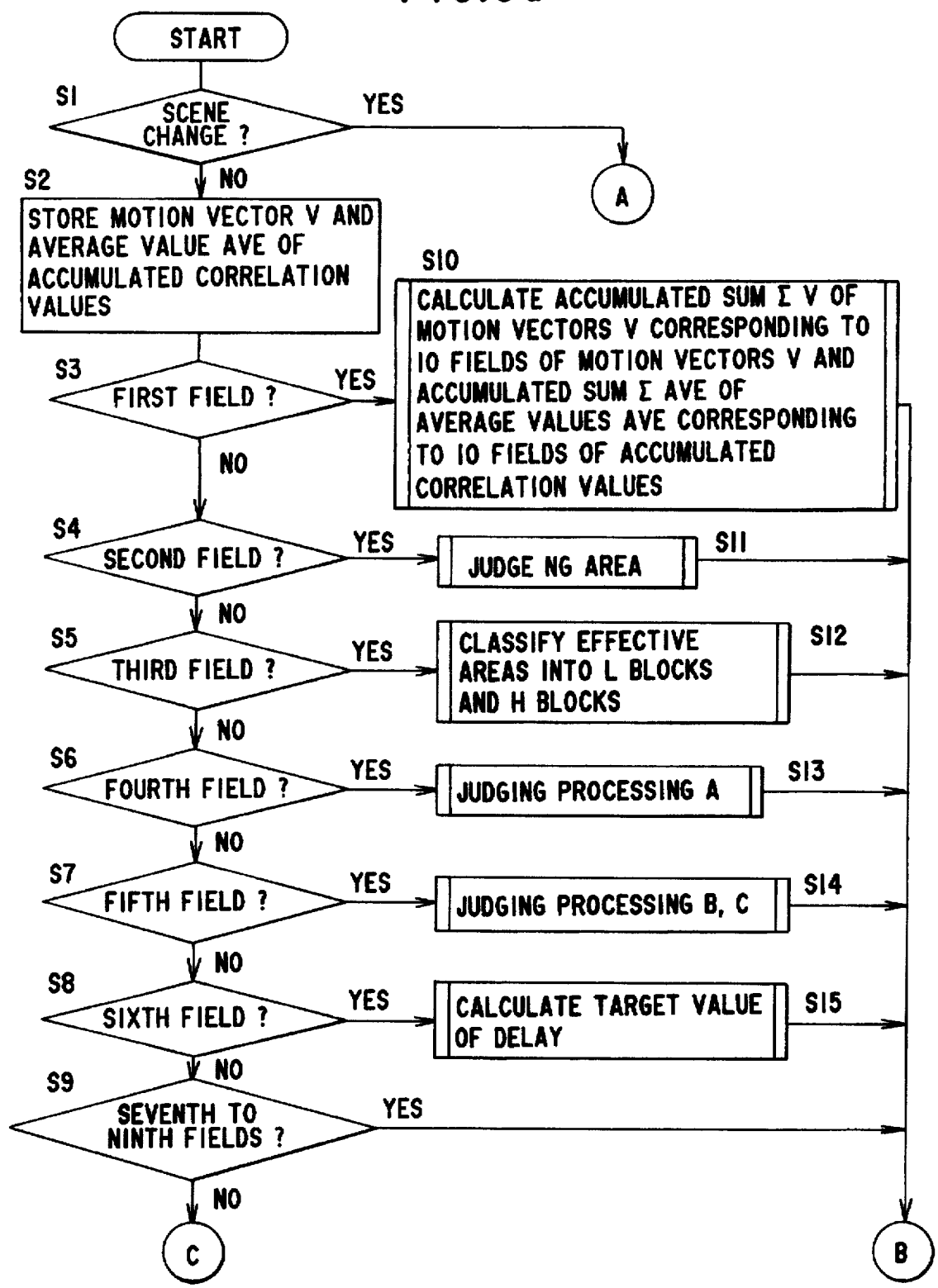

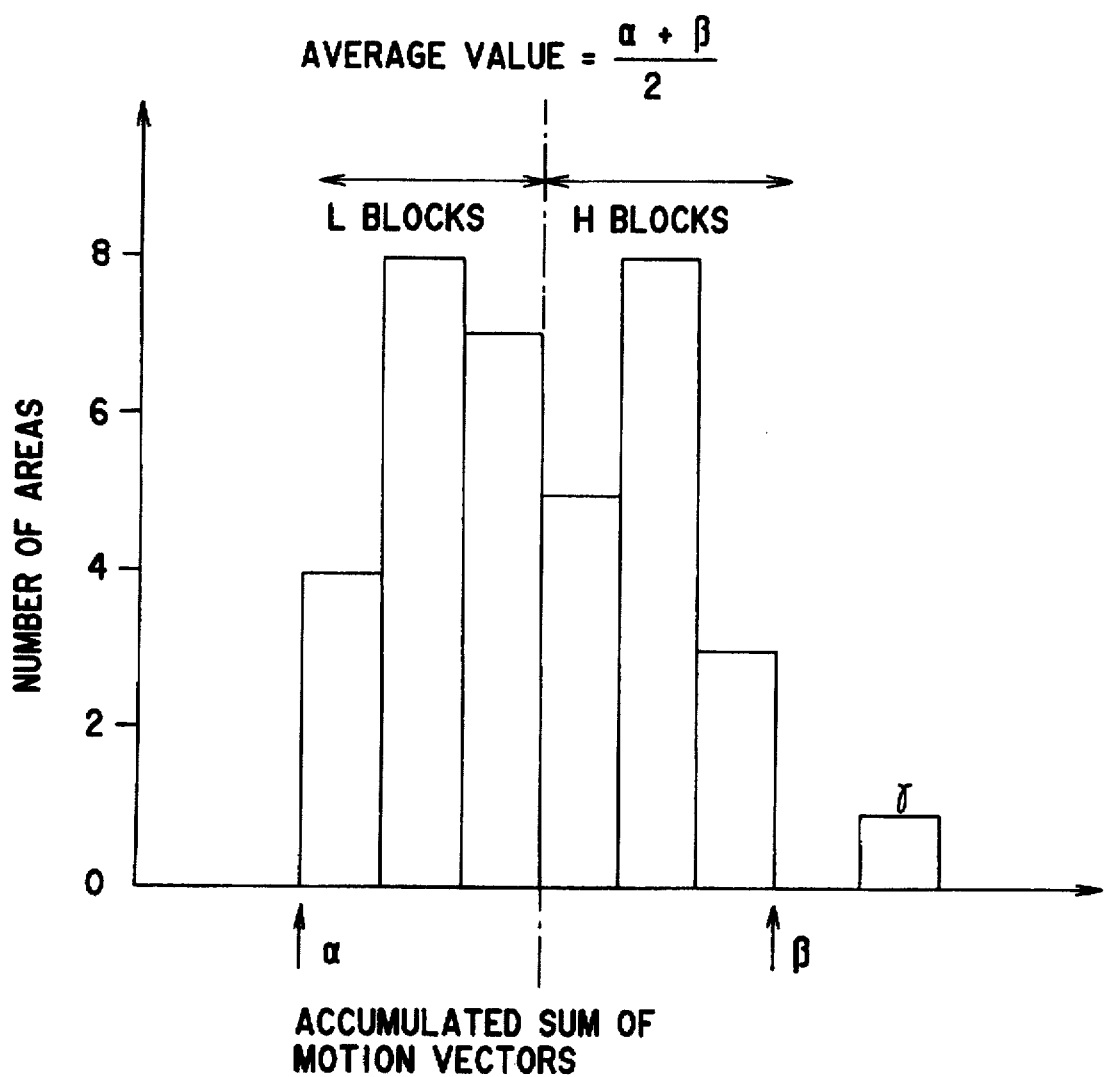

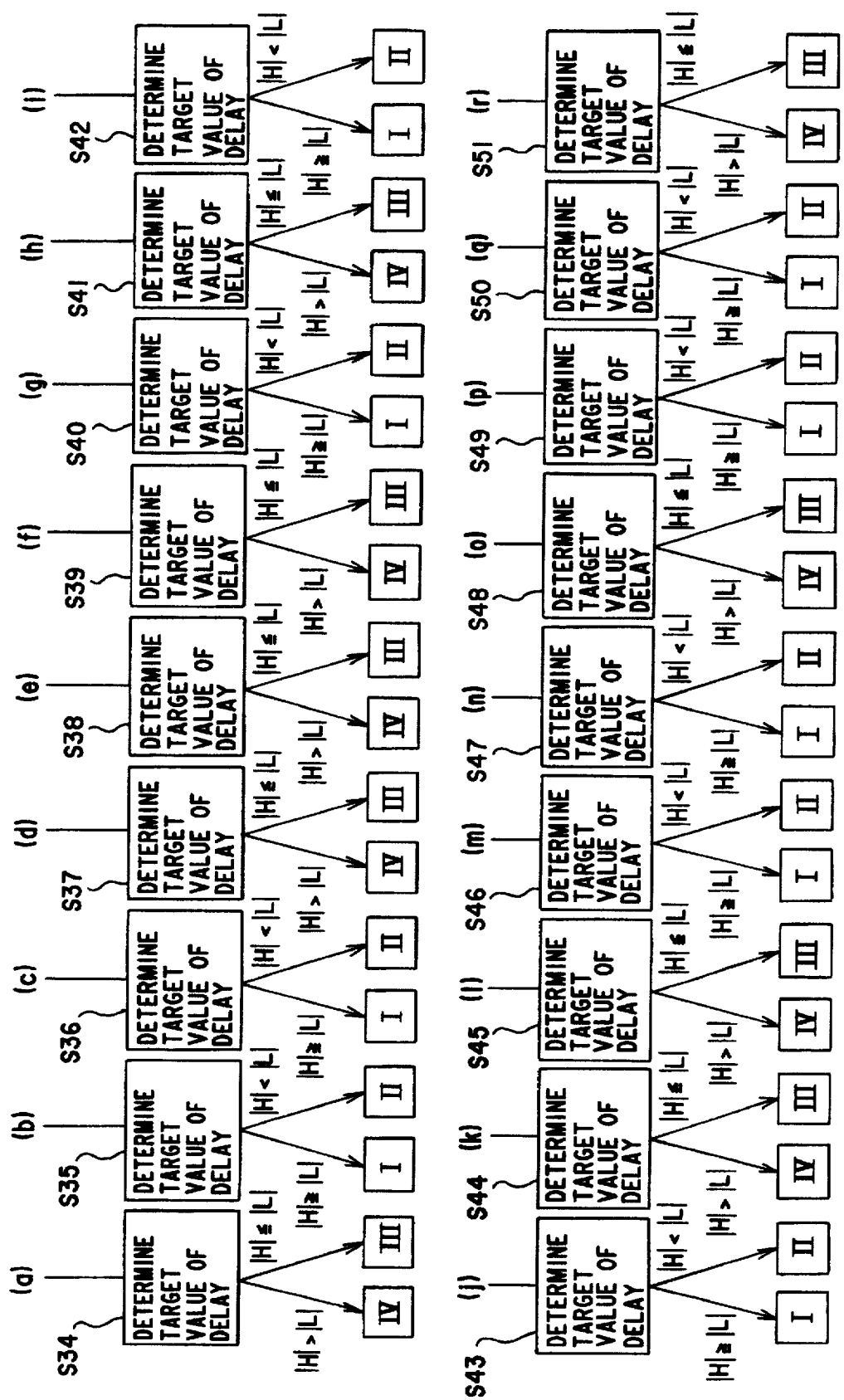

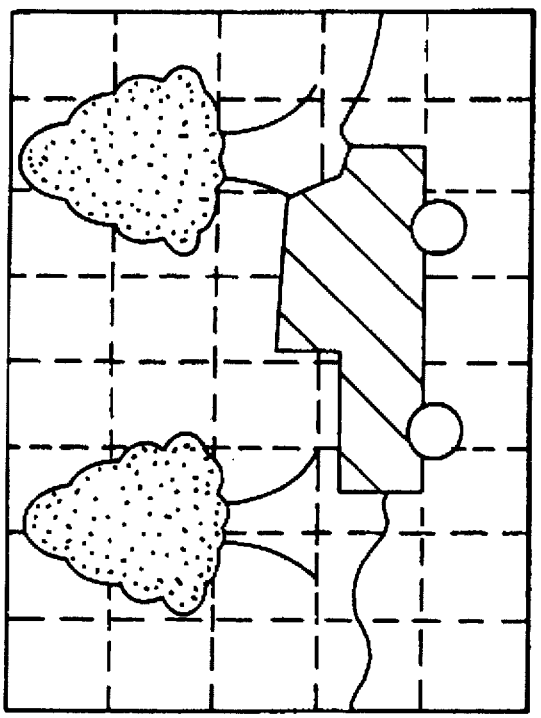
FIG.12b
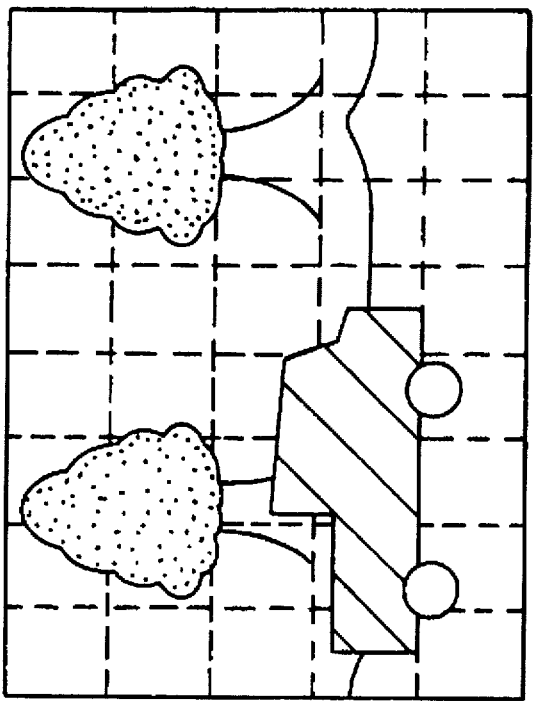
FIG.12a

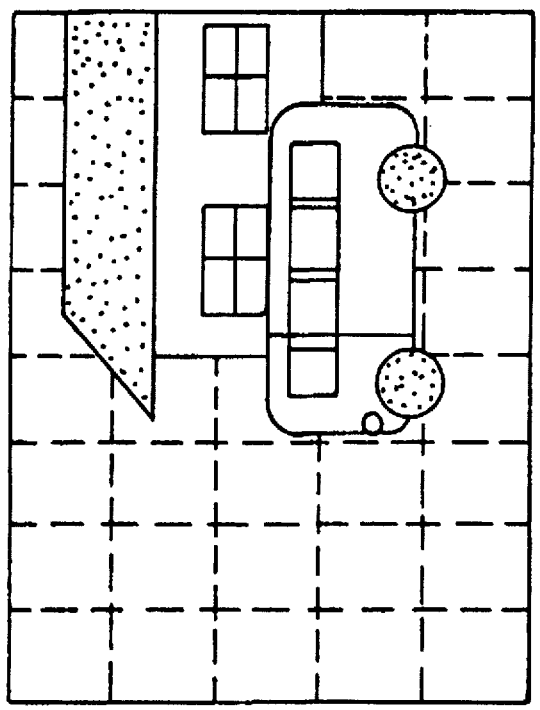
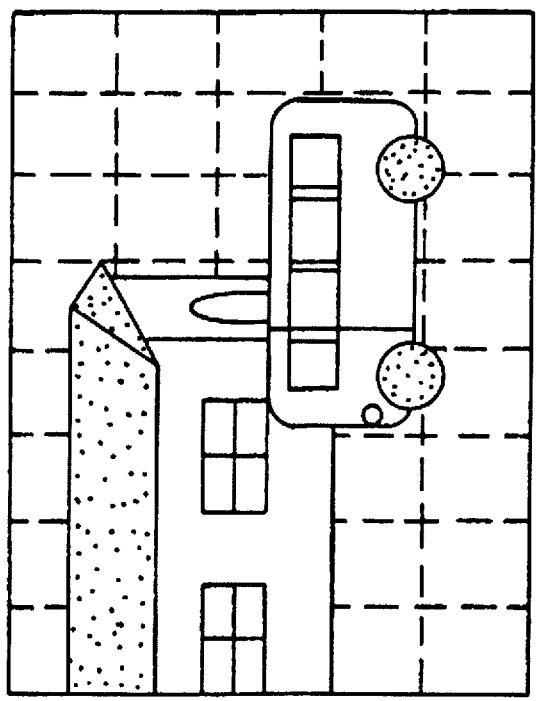

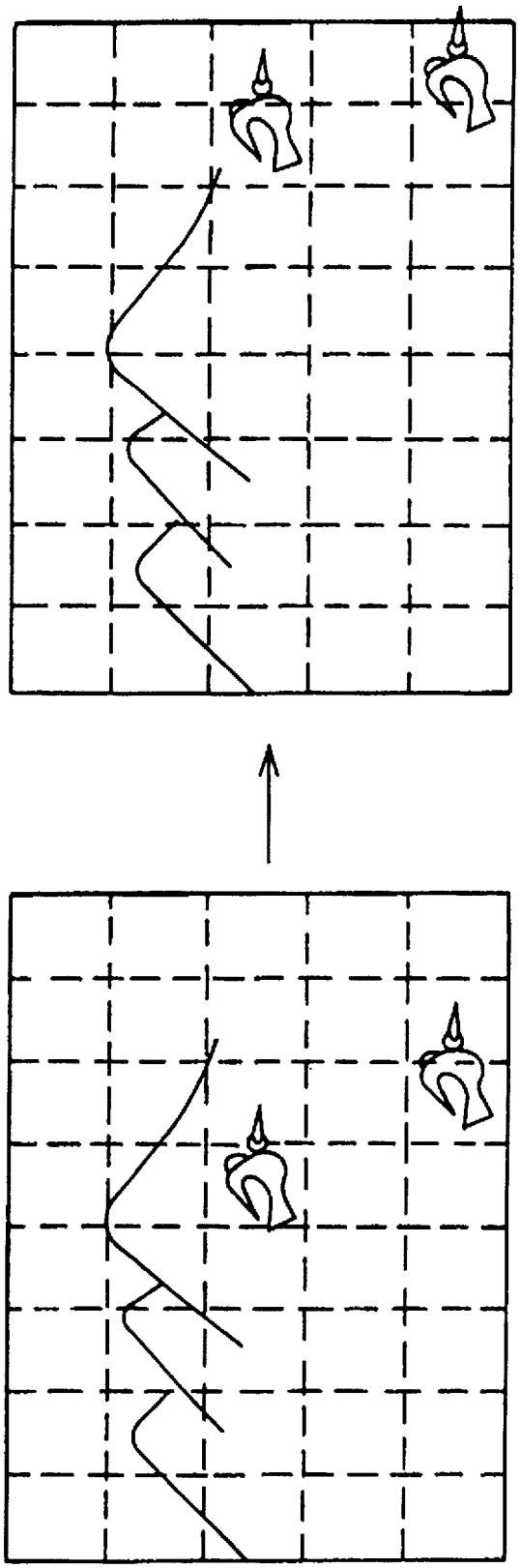

H BLOCK

L BLOCK

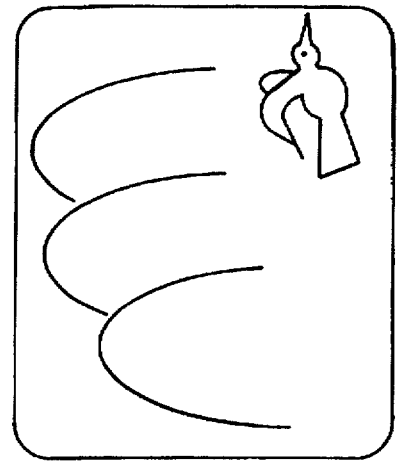
FIG.30c  FIG.30b  FIG.30a
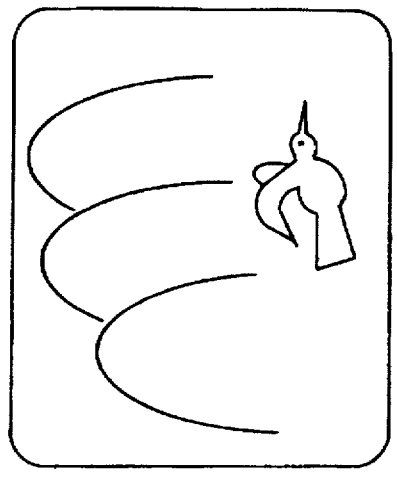
FIG.30f  FIG.30e  FIG.30d
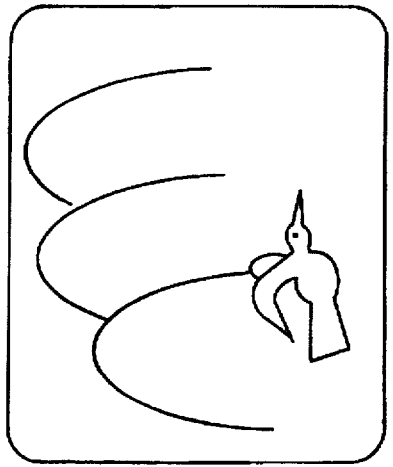

METHOD OF JUDGING BACKGROUND/ FOREGROUND POSITION RELATIONSHIP BETWEEN MOVING SUBJECTS AND METHOD OF CONVERTING TWO-DIMENSIONAL IMAGES INTO THREE-DIMENSIONAL IMAGES

This application is a continuation of application Ser. No. 08/530,467 filed Sep. 19, 1995, now abandoned.

BACKGROUND OF THE INVENTION

1. Field of the Invention

The present invention relates to a method of judging the back-and-forth positional relationship between subjects and a method of converting two-dimensional (2D) images outputted from a VTR (Video Tape Recorder), a video camera or the like and transmitted by a CATV (Cable Television) and TV broadcasting into three-dimensional (3D) images.

2. Description of the Prior Art

Almost all types of 3D image software used for a 3D image display system which has been recently in the news are particularly produced for displaying 3D images. The image software for displaying 3D images is generally produced by picking up a right eye image and a left eye image using two cameras.

The left and right images recorded on the 3D image software are displayed on a display almost simultaneously. The left eye image and the right eye image which are reflected almost simultaneously are respectively incident on the left eye and the right eye of a viewer, whereby the viewer recognizes 3D images.

However, a lot of types of image software produced by 2D images exist in the world, while the number of types of 3D image software is very small, whereby 3D image software must be newly produced so as to display the 3D images, which takes much time and labor and increases the cost.

Therefore, a method of converting 2D images into 3D images has been already proposed. Examples of the method of converting 2D images into 3D images include the following. Specifically, in the case of a 2D image on which an object moving from the left to the right, for example, is reflected, the original 2D image is taken as a left eye image, and an image corresponding to a field which is several fields preceding the left eye image is taken as a right eye image. Consequently, parallax occurs between the left eye image and the right eye image. Therefore, both the images are displayed on a screen almost simultaneously so that the moving object is so recognized that it is raised forward against a background.

In the 2D images, there are a case where a subject (mountains) in the backward position is in an immobile state and a subject (a bird) in the forward position moves, as shown in FIG. 30, and a case where a subject (an automobile) in the forward position is in an immobile state and a subject (a house) in the backward position moves, as shown in FIG. 31.

In the case as shown in FIG. 30, the direction of the movement of the subject (the bird) in the forward position (from the left to the right in this example) is detected, and the original 2D image is taken as a left eye image and an image corresponding to a field which is several fields preceding a field corresponding to the left eye image is taken as a right eye image, thereby to make it possible to raise the subject (the bird) in the forward position forward against the subject (the mountains) in the backward position.

On the other hand, in the case where the subject (the house) in the backward position is moving as shown in FIG. 31, the subject (the house) in the backward position may be raised forward against the subject (the automobile) in the forward position if the direction of the movement of the subject (the house) in the backward position (from the left to the right in this example) is detected, and the original 2D image is taken as a left eye image and an image corresponding to a field which is several fields preceding a field corresponding to the left eye image is taken as a right eye image in the same manner as described above.

SUMMARY OF THE INVENTION

An object of the present invention is to provide a method of judging the back-and-forth positional relationship between subjects, in which the back-and-forth positional relationship among a plurality of subjects can be judged.

Another object of the present invention is to provide a method of converting 2D images into 3D images, in which a subject in the forward position is raised forward against a subject in the backward position even in a case where the subject in the forward position is in an immobile state and the subject in the backward position is moving.

In a first method of judging the back-and-forth positional relationship between subjects according to the present invention, a plurality of detecting areas for detecting amounts of horizontal movement of subjects are set in an image area constituting a 2D image (a first step).

The amounts of horizontal movement of the subjects are respectively detected for the detecting areas (a second step).

The amounts of horizontal movement of the subjects which are detected for the respective detecting areas are compared after being assigned plus or minus signs depending on the direction of the movement, to classify all the detecting areas into two types of detecting areas in such a manner that the detecting areas where a relatively large amount of horizontal movement is detected are taken as first detecting areas, while the detecting areas where a relatively small amount of horizontal movement is detected are taken as second detecting areas (a third step).

A target area is set in a peripheral portion in the image area, to judge which of the total number of first detecting areas existing in the target area and the total number of second detecting areas existing in the target area is larger (a fourth step).

It is judged that the subjects in all the detecting areas whose total number existing in the target area is judged to be larger are positioned behind the subjects in all the detecting areas whose total number existing in the target area is judged to be smaller (a fifth step).

In a second method of judging the back-and-forth positional relationship between subjects according to the present invention, a plurality of detecting areas for detecting amounts of horizontal movement of subjects are set in an image area constituting a 2D image (a first step).

The amounts of horizontal movement of the subjects are respectively detected for the detecting areas (a second step).

The amounts of horizontal movement of the subjects which are detected for the respective detecting areas are compared after being assigned plus or minus signs depending on the direction of the movement, to classify all the detecting areas into two types of detecting areas in such a manner that the detecting areas where a relatively large amount of horizontal movement is detected are taken as first detecting areas, while the detecting areas where a relatively small amount of horizontal movement is detected are taken as second detecting areas (a third step).

A target area is set in a central portion in the image area, to judge which of the total number of first detecting areas existing in the target area and the total number of second detecting areas existing in the target area is larger (a fourth step).

It is judged that the subjects in all the detecting areas whose total number existing in the target area is judged to be larger are positioned ahead of the subjects in all the detecting areas whose total number existing in the target area is judged to be smaller (a fifth step).

In a third method of judging the back-and-forth positional relationship between subjects according to the present invention, a plurality of detecting areas for detecting amounts of horizontal movement of subjects are set in an image area constituting a 2D image (a first step).

The amounts of horizontal movement of the subjects are respectively detected for the detecting areas (a second step).

The amounts of horizontal movement of the subjects which are detected for the respective detecting areas are compared after being assigned plus or minus signs depending on the direction of the movement, to classify all the detecting areas into two types of detecting areas in such a manner that the detecting areas where a relatively large amount of horizontal movement is detected are taken as first detecting areas, while the detecting areas where a relatively small amount of horizontal movement is detected are taken as second detecting areas (a third step).

A first target area is set in a peripheral portion in the image area, to judge which of the total number of first detecting areas existing in the first target area and the total number of second detecting areas existing in the first target area is larger (a fourth step).

A second target area is set in a central portion in the image area, to judge which of the total number of first detecting areas existing in the second target area and the total number of second detecting areas existing in the second target area is larger (a fifth step).

When the detecting areas whose total number existing in the first target area is judged to be larger in the fourth step out of the first detecting areas and the second detecting areas and the detecting areas whose total number existing in the second target area is judged to be larger in the fifth step out of the first detecting areas and the second detecting areas differ, it is judged that the subjects in all the detecting areas whose total number existing in the first target area is judged to be larger in the fourth step are positioned behind the subjects in all the detecting areas whose total number existing in the first target area is judged to be smaller in the fourth step (a sixth step).

A fourth method of judging the back-and-forth positional relationship between subjects according to the present invention, a plurality of detecting areas for detecting amounts of horizontal movement of subjects are set in an image area constituting a 2D image (a first step).

The amounts of horizontal movement of the subjects are respectively detected for the detecting areas (a second step).

The amounts of horizontal movement of the subjects which are detected for the respective detecting areas are compared after being assigned plus or minus signs depending on the direction of the movement, to classify all the detecting areas into two types of detecting areas in such a manner that the detecting areas where a relatively large amount of horizontal movement is detected are taken as first detecting areas, while the detecting areas where a relatively small amount of horizontal movement is detected are taken as second detecting areas (a third step).

A first target area is set in a peripheral portion in the image area, to judge which of the total number of first detecting areas existing in the first target area and the total number of second detecting areas existing in the first target area is larger (a fourth step).

A second target area is set in a central portion in the image area, to judge which of the total number of first detecting areas existing in the second target area and the total number of second detecting areas existing in the second target area is larger (a fifth step).

When the detecting areas whose total number existing in the first target area is judged to be larger in the fourth step out of the first detecting areas and the second detecting areas and the detecting areas whose total number existing in the second target area is judged to be larger in the fifth step out of the first detecting areas and the second detecting areas differ, it is judged that the subjects in all the detecting areas whose total number existing in the first target area is judged to be larger in the fourth step are positioned behind the subjects in all the detecting areas whose total number existing in the first target area is judged to be smaller in the fourth step (a sixth step).

When the detecting areas whose total number existing in the first target area is judged to be larger in the fourth step out of the first detecting areas and the second detecting areas and the detecting areas whose total number existing in the second target area is judged to be larger in the fifth step out of the first detecting areas and the second detecting areas are the same, it is judged which of the total number of first detecting areas existing in all the detecting areas and the total number of second detecting areas existing in all the detecting areas is smaller (a seventh step).

The detecting areas whose total number existing in all the detecting areas is judged to be smaller in the seventh step out of the first detecting areas and the second detecting areas are taken as third detecting areas, to judge the back-and-forth positional relationship of the subjects in the first detecting areas and the subjects in the second detecting areas on the basis of the ratio of the total number of third detecting areas existing in the first target area to the total number of third detecting areas existing in all the detecting areas (an eighth step).

In the eighth step, when the ratio of the number of third detecting areas existing in the first target area to the total number of third detecting areas existing in all the detecting areas is not less than a predetermined value, it is judged that the subjects in one detecting areas, which correspond to the third detecting areas, out of the first detecting areas and the second detecting areas are positioned behind the subjects in the other detecting areas. When the ratio of the number of third detecting areas existing in the first target area to the total number of third detecting areas in all the detecting areas is less than a predetermined value, it is judged that the subjects in the one detecting areas, which correspond to the third detecting areas, out of the first detecting areas and the second detecting areas are positioned ahead of the subjects in the other detecting areas.

In a fifth method of judging the back-and-forth positional relationship between subjects according to the present invention, a plurality of detecting areas for detecting amounts of horizontal movement of subjects are set in an image area constituting a 2D image (a first step).

The amounts of horizontal movement of the subjects are respectively detected for the detecting areas (a second step).

The amounts of horizontal movement of the subjects which are detected for the respective detecting areas are compared after being assigned plus or minus signs depending on the direction of the movement, to classify all the detecting areas into two types of detecting areas in such a manner that the detecting areas where a relatively large amount of horizontal movement is detected are taken as first detecting areas, while the detecting areas where a relatively small amount of horizontal movement is detected are taken as second detecting areas (a third step).

A first target area is set in a peripheral portion in the image area, to judge which of the total number of first detecting areas existing in the first target area and the total number of second detecting areas existing in the first target area is larger (a fourth step).

A second target area is set in a central portion in the image area, to judge which of the total number of first detecting areas existing in the second target area and the total number of second detecting areas existing in the second target area is larger (a fifth step).

When the detecting areas whose total number existing in the first target area is judged to be larger in the fourth step out of the first detecting areas and the second detecting areas and the detecting areas whose total number existing in the second target area is judged to be larger in the fifth step out of the first detecting areas and the second detecting areas differ, it is judged that the subjects in all the detecting areas whose total number existing in the first target area is judged to be larger in the fourth step are positioned behind the subjects in all the detecting areas whose total number existing in the first target area is judged to be smaller in the fourth step (a sixth step).

When it is judged in the fourth step that the total number of either first detecting areas or second detecting areas existing in the first target area is larger and it is judged in the fifth step that the total numbers of first detecting areas and second detecting areas existing in the second target area are equal, it is judged that the subjects in all the detecting areas whose total number existing in the first target area is judged to be larger in the fourth step are positioned behind the subjects in all the detecting areas whose total number existing in the first target area is judged to be smaller in the fourth step (a seventh step).

When it is judged in the fourth step that the total numbers of first detecting areas and second detecting areas existing in the first target area are equal and it is judged in the fifth step that the total number of either first detecting areas or second detecting areas existing in the second target area is larger, it is judged that the subjects in all the detecting areas whose total number existing in the second target area is judged to be larger in the fifth step are positioned ahead of the subject in all the detecting areas whose total number existing in the second target area is judged to be smaller in the fifth step (an eighth step).

When the detecting areas whose total number existing in the first target area is judged to be larger in the fourth step out of the first detecting areas and the second detecting areas and the detecting areas whose total number existing in the second target area is judged to be larger in the fifth step out of the first detecting areas and the second detecting areas are the same, or it is judged in both the fourth step and the fifth step that the total numbers of first detecting areas and second detecting areas are equal, it is judged which of the total number of first detecting areas existing in all the detecting areas and the total number of second detecting areas existing in all the detecting areas is smaller (a ninth step).

The detecting areas whose total number existing in all the detecting areas is judged to be smaller in the ninth step out of the first detecting areas and the second detecting areas are taken as third detecting areas, to judge the back-and-forth positional relationship between the subjects in the first detecting areas and the subjects in the second detecting areas on the basis of the ratio of the total number of third detecting areas existing in the first target area to the total number of third detecting areas existing in all the detecting areas (a tenth step).

In the tenth step, when the ratio of the number of third detecting areas existing in the first target area to the total number of third detecting areas existing in all the detecting areas is not less than a predetermined value, it is judged that the subjects in one detecting areas, which correspond to the third detecting areas, out of the first detecting areas and the second detecting areas are positioned behind the subjects in the other detecting areas. When the ratio of the number of third detecting areas existing in the first target area to the total number of third detecting areas in all the detecting areas is less than a predetermined value, it is judged that the subjects in the one detecting areas, which correspond to the third detecting areas, out of the first detecting areas and the second detecting areas are positioned ahead of the subjects in the other detecting areas.

In a sixth method of judging the back-and-forth positional relationship between subjects according to the present invention, a plurality of detecting areas for detecting amounts of horizontal movement of subjects are set in an image area constituting a 2D image (a first step).

The amounts of horizontal movement of the subjects are respectively detected for the detecting areas (a second step).

The amounts of horizontal movement of the subjects which are detected in both two detecting areas adjacent to each other in the horizontal direction out of the detecting areas are compared for the detecting areas (a third step).

When the amounts of horizontal movement of the subjects which are detected in the two detecting areas adjacent to each other in the horizontal direction differ and the subject whose amount of horizontal movement is larger is moving toward the subject whose amount of horizontal movement is smaller, it is judged whether the amount of horizontal movement of a subject which is detected after an elapse of a predetermined time period in the detecting area where the subject whose amount of horizontal movement is smaller is detected is changed in the direction in which it approaches the amount of horizontal movement of the subject whose amount of horizontal movement is larger (a fourth step).

When it is judged in the fourth step that the amount of horizontal movement of the subject which is detected after an elapse of a predetermined time period in the detecting area where the subject whose amount of horizontal movement is smaller is detected is changed in the direction in which it approaches the amount of horizontal movement of the subject whose amount of horizontal movement is larger, it is judged that the subject whose amount of horizontal movement is larger is positioned ahead of the subject whose amount of horizontal movement is smaller (a fifth step).

When it is judged in the fourth step that the amount of horizontal movement of the subject which is detected after an elapse of a predetermined time period in the detecting area where the subject whose amount of horizontal movement is smaller is detected is not changed in the direction in which it approaches the amount of horizontal movement of the subject whose amount of horizontal movement is larger, it is judged that the subject whose amount of horizontal movement is larger is positioned behind the subject whose amount of horizontal movement is smaller (a sixth step).

When the amounts of horizontal movement of the subjects which are detected in the two detecting areas adjacent to each other in the horizontal direction differ and the subject whose amount of horizontal movement is larger is not moving toward the subject whose amount of horizontal movement is smaller, it is judged whether the amount of horizontal movement of a subject which is detected after an elapse of a predetermined time period in the detecting area where the subject whose amount of horizontal movement is larger is detected is changed in the direction in which it approaches the amount of horizontal movement of the subject whose amount of horizontal movement is smaller (a seventh step).

When it is judged in the seventh step that the amount of horizontal movement of the subject which is detected after an elapse of a predetermined time period in the detecting area where the subject whose amount of horizontal movement is larger is detected is changed in the direction in which it approaches the amount of horizontal movement of the subject whose amount of horizontal movement is smaller, it is judged that the subject whose amount of horizontal movement is larger is positioned ahead of the subject whose amount of horizontal movement is smaller (an eighth step).

When it is judged in the seventh step that the amount of horizontal movement of the subject which is detected after an elapse of a predetermined time period in the detecting area where the subject whose amount of horizontal movement is larger is detected is not changed in the direction in which it approaches the amount of horizontal movement of the subject whose amount of horizontal movement is smaller, it is judged that the subject whose amount of horizontal movement is larger is positioned behind the subject whose amount of horizontal movement is smaller (a ninth step).

A method of converting 2D images into 3D images in which a main image signal and a sub-image signal delayed from the main image signal are produced from a 2D image signal, and one of the main image signal and the sub-image signal is taken as a left eye image and the other image signal is taken as a right eye image is characterized by comprising the steps of judging the back-and-forth positional relationship between subjects whose amount of horizontal movement is larger and subjects whose amount of horizontal movement is smaller on the basis of the 2D image signal, and determining which of the main image signal and the sub-image signal is taken as a left eye image or a right eye image on the basis of the result of the judgment of the back-and-forth positional relationship.

As the step of judging the back-and-forth positional relationship between subjects whose amount of horizontal movement is larger and subjects whose amount of horizontal movement is smaller, it is possible to use any one of the first to sixth methods of judging the back-and-forth positional relationship between subjects.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5a and 5b are flow charts showing processing related to subject/background judging processing out of processing performed for each field by a CPU;

FIG. 6 is a graph showing a histogram for classifying motion vector detecting areas into H blocks and L blocks;

FIG. 7 is a typical diagram showing a first target area;

FIG. 8 is a typical diagram showing a second target area;

FIGS. 11a and 11b are flow charts showing the flow of the judging processing and the processing for calculating a target value of a delay which are performed in the steps S13, S14 and S15 shown in FIG. 5a;

FIG. 12 is a typical diagram showing one example of 2D images;

FIG. 14 is a typical diagram showing one example of 2D images;

FIG. 16 is a typical diagram showing one example of 2D images;

FIG. 26 is a flow chart showing the detailed procedure for scene change detecting processing performed in the step S1 shown in FIG. 5a;

FIG. 30 is a diagram for specifically explaining the procedure for the processing for judging the back-and-forth positional relationship between subjects.

DETAILED DESCRIPTION OF THE PREFERRED EMBODIMENTS (1) Description of First Embodiment Referring to FIGS. 1 to 26, a first embodiment of the present invention will be described.

Figure 1:
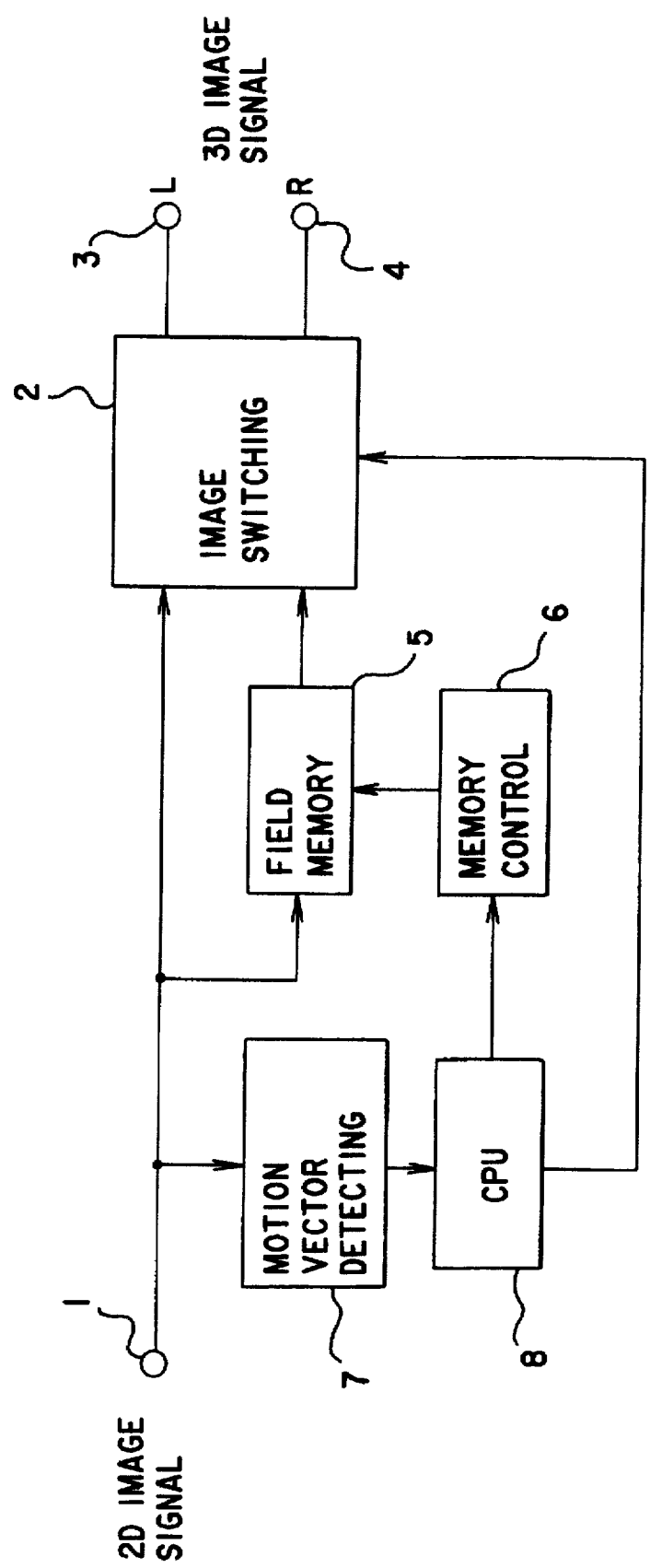
FIG. 1 is a block diagram showing the construction of a 2D/3D image converter.

FIG. 1 illustrates the construction of a 2D/3D image converter for converting 2D images into 3D images.

In the 2D/3D image converter, a normal 2D image signal for displaying a 2D image is inputted to an input terminal 1. The 2D image signal inputted to the input terminal 1 is fed to an image switching circuit 2 and a field memory 5.

The 2D image signal inputted to the field memory 5 is delayed by a predetermined number of fields and is outputted, after which the 2D image signal is fed to the image switching circuit 2. A delay indicating the number of fields from a field corresponding to the inputted 2D image signal to a field corresponding to the 2D image signal delayed by the field memory 5 is variably controlled for each field by a memory control circuit 6.

The image switching circuit 2 is connected to an output terminal 3 for outputting a left eye image signal L and an output terminal 4 for outputting a right eye image signal R, and is so controlled that the output state is switched depending on the direction of the movement of a subject.

Furthermore, the 2D image signal inputted to the input terminal 1 is fed to a motion vector detecting circuit 7. In the motion vector detecting circuit 7, a motion vector corresponding to the movement between fields of an image, that is, the amount of horizontal movement (the moving speed) of the subject is detected. The detected motion vector is supplied to a CPU (Central Processing Unit) 8.

The CPU 8 extracts a horizontal component of the detected motion vector, and controls the memory control circuit 6 in accordance with the horizontal component. Specifically, the memory control circuit 6 is so controlled that the delay is reduced when the subject greatly moves and the motion vector is large, while being so controlled that the delay is increased when the subject slightly moves or the motion vector is small as at the time of slow-motion reproduction.

In the following description, a subject in the backward position out of two subjects which differ in the amount of horizontal movement is referred to as a background, and a subject in the forward direction is merely referred to as a subject.

The CPU 8 controls, when the direction of the horizontal component of the motion vector is from the left to the right, the image switching circuit 2 in the following manner in accordance of an object on an area where the motion vector is detected. Specifically, the image switching circuit 2 is so controlled that the delayed image signal is taken as a right eye image signal when it is judged that the object on the area where the motion vector is detected is the subject positioned ahead of the background, while being taken as a left eye image signal when it is judged that the object on the area where the motion vector is detected is the background positioned behind the subject.

Furthermore, the CPU 8 controls, when the direction of the horizontal component of the motion vector is from the right to the left, the image switching circuit 2 in the following manner in accordance with an object on an area where the motion vector is detected. Specifically, the image switching circuit 2 is so controlled that the delayed image signal is taken as a left eye image signal when it is judged that the object on the area where the motion vector is detected is the subject positioned ahead of the background, while being taken as a right eye image signal when it is judged that the object on the area where the motion vector is detected is the background positioned behind the subject.

With respect to such a scene that the subject or the background horizontally move in the 2D image signal, therefore, there occurs such parallax corresponding to the speed of the movement that the subject is always positioned ahead of the background.

A viewer can view a 3D image with a 3D effect by feeding left and right image signals from the output terminals 3 and 4 to a display for displaying 3D images such as a display by a lenticular method.

Figures 2, 3:
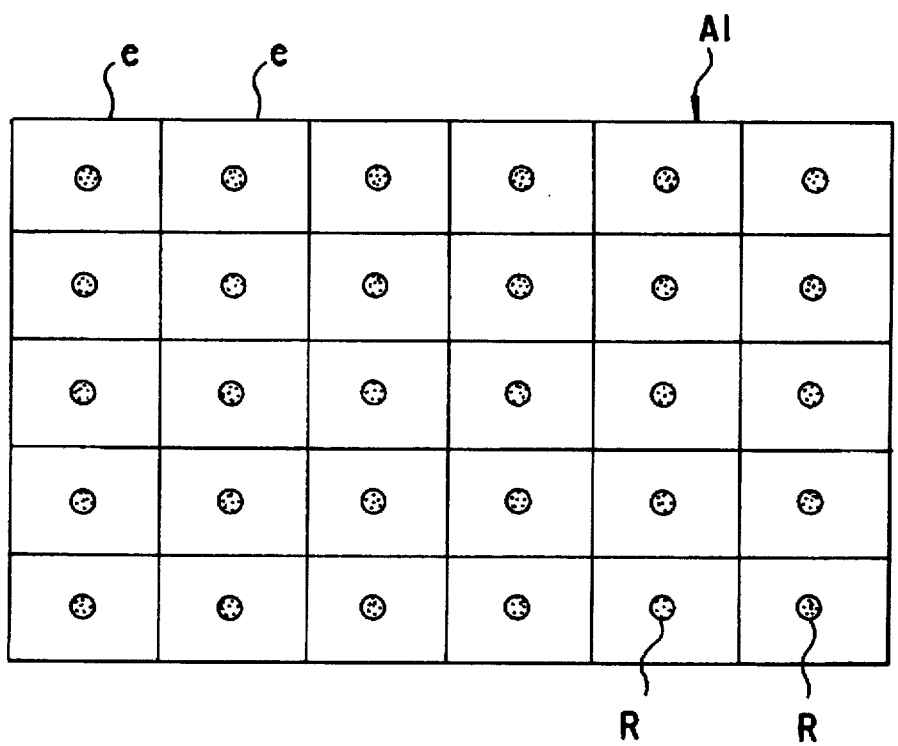
FIG. 2 is a typical diagram showing motion vector detecting areas A1 to H5.
FIG. 3 is a typical diagram showing a plurality of small areas e set in the motion vector detecting area shown in FIG. 2.
Figure 4:
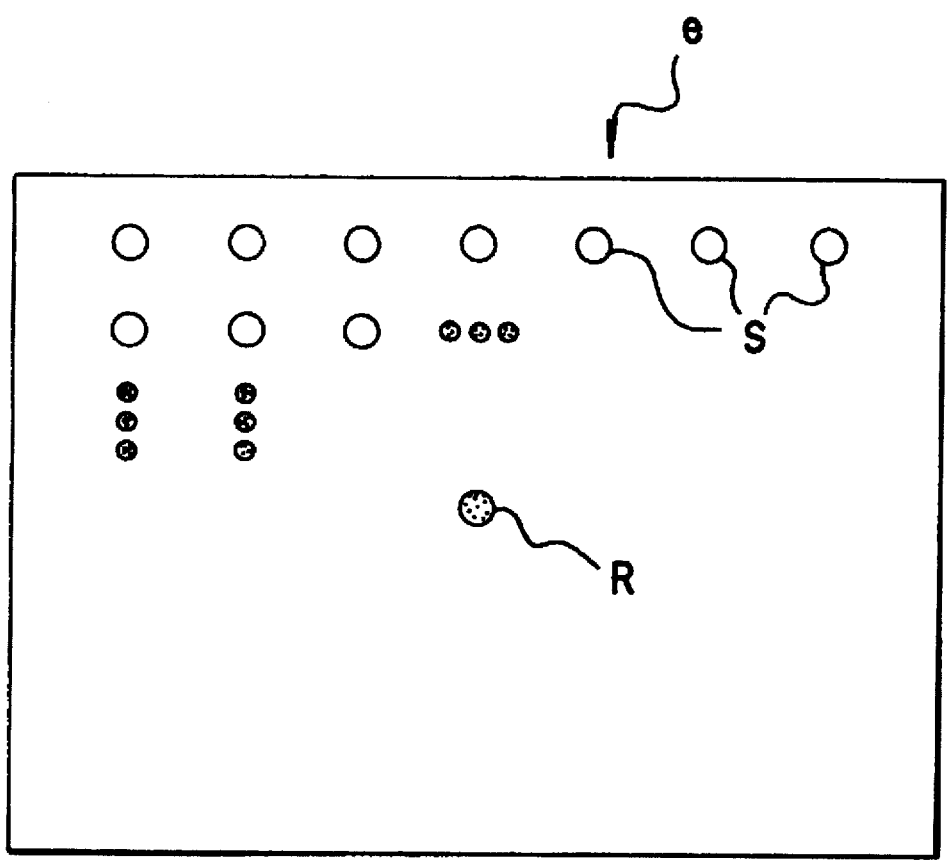
FIG. 4 is a typical diagram showing a plurality of sampling points S and one representative point R which are set in the small area e shown in FIG. 3.

The motion vector detecting circuit 7 detects a motion vector by a representative point matching method. The representative matching method will be briefly described. 40 motion vector detecting areas A1 to H5 are set, as shown in FIG. 2, in an image area constituting each of fields. In addition, each of the motion vector detecting areas A1 to H5 is further divided into a plurality of small areas e, as shown in FIG. 3. As shown in FIG. 4, a plurality of sampling points S and one representative point R are set in each of the small areas e.

The difference between an image signal level at each of sampling points S in each small area e in the current field and an image signal level at a representative point R in a corresponding small area in the preceding field (a correlation value at each of the sampling points) is found for each of the motion vector detecting areas A1 to H5. Correlation values at sampling points S which are the same in displacement from the representative point R are accumulated between small areas e in each of the motion vector detecting areas A1 to H5. Consequently, accumulated correlation values the number of which corresponds to the number of sampling points S in one small area e are found for each of the motion vector detecting areas A1 to H5.

Furthermore, the minimum value MIN of the accumulated correlation values found in each of the motion vector detecting areas A1 to H5 is found for each motion vector detecting area. In addition, the average value AVE of the accumulated correlation values found in each of the motion vector detecting areas A1 to H5 is found for each motion vector detecting area.

The displacement of a point at which the minimum accumulated correlation value is obtained, that is, a point which is highest in correlation in each of the motion vector detecting areas A1 to H5 is extracted as a motion vector in the motion vector detecting area (the movement of a subject).

The CPU 8 judges which of the subject and the background is an object moving in the original 2D image on the basis of the horizontal component of the motion vector, the minimum value MIN of the accumulated correlation values, and the average value AVE of the accumulated correlation values which are detected in each of the motion vector detecting areas by the motion vector detecting circuit 7, to control the image switching circuit 2 and the memory control circuit 6 on the basis of the results of the subject/background judging processing.

Figure 5B:
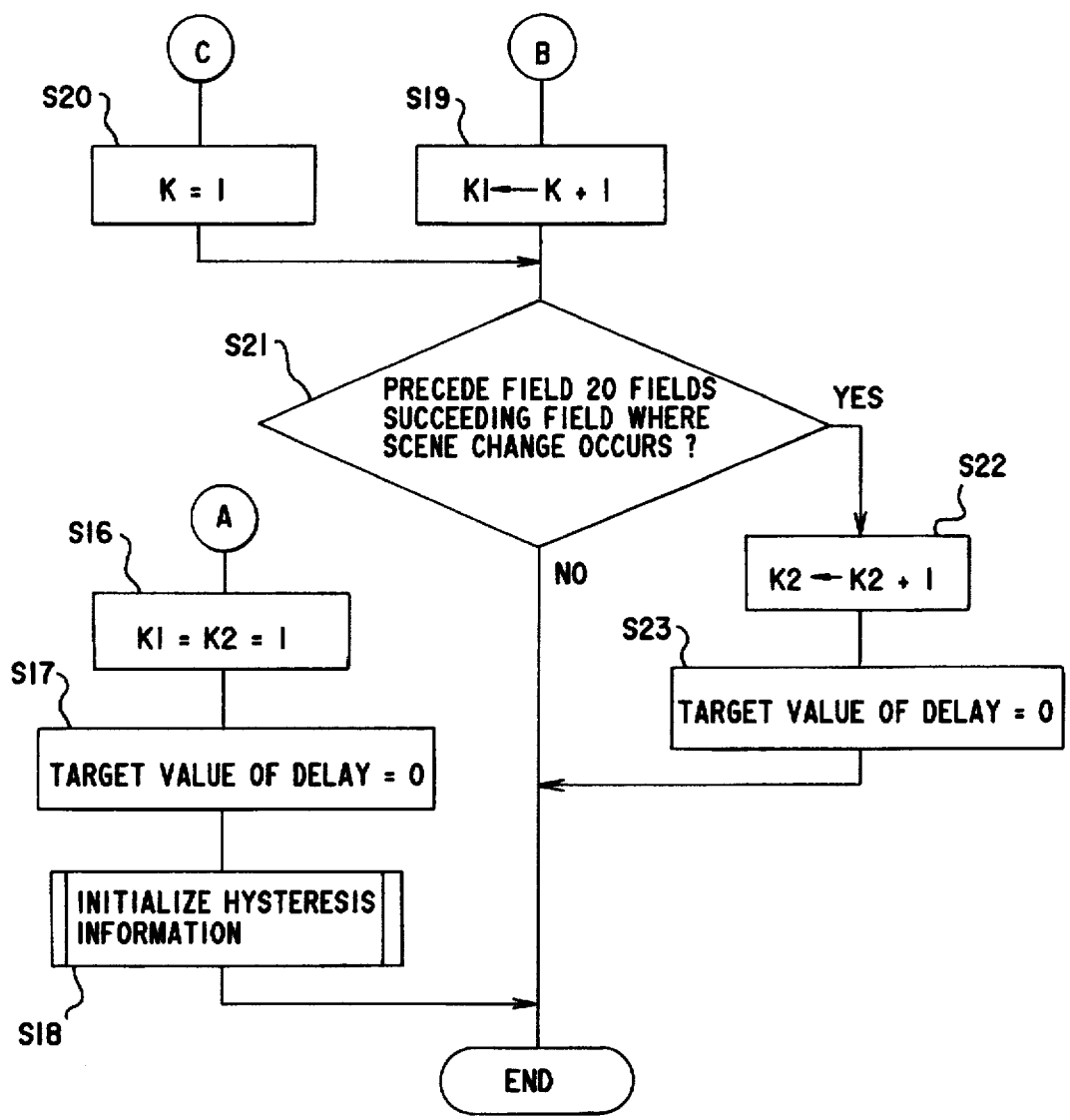

FIGS. 5a and 5b shows processing performed for each field by the CPU 8 and related to processing for judging the back-and-forth positional relationship between subjects.

In the step S1 shown in FIG. 5a, it is judged whether or not a scene represented by a 2D image inputted to the input terminal 1 shown in FIG. 1 is changed. The details of processing used for judging whether or not a scene change occurs will be described later.

When it is judged in the step S1 that a scene change occurs, the content K1 of a first counter K1 and the content K2 of a second counter are set to "1" (step S16). In addition, a delay and a target value of the delay are set to zero (step S17). The delay indicates how many fields are there from a field corresponding to a 2D image signal currently inputted to the input terminal 1 to a field corresponding to a delayed 2D image signal read from the field memory 5 shown in FIG. 1. The delay is so controlled as to gradually approach the target value of the delay. When the processing in the step S17 is performed, hysteresis information used for judging the back-and-forth positional relationship between subjects is initialized (step S18). The present processing is then terminated.

When it is judged in the foregoing step S1 that no scene change occurs, a horizontal component V of a motion vector (hereinafter merely referred to as a motion vector) and the average value AVE of accumulated correlation values for each of the motion vector detecting areas A1 to H5 which are detected by the motion vector detecting circuit 7 are stored (step S2).

Thereafter, the program proceeds to processing in the step S3 and the subsequent steps. In the step S3, it is judged whether or not the current field is a field which is (10n+1) fields succeeding a field where a scene change is detected, where n is an integer of not less than zero. In the step S4, it is judged whether or not the current field is a field which is (10n+2) fields succeeding the field where a scene change is detected. In the step S5, it is judged whether or not the current field is a field which is (10n+3) fields succeeding the field where a scene change is detected. In the step S6, it is judged whether or not the current field is a field which is (10n+4) fields succeeding the field where a scene change is detected.

In the step S7, it is judged whether or not the current field is a field which is (10n+5) fields succeeding the field where a scene change is detected. In the step S8, it is judged whether or not the current field is a field which is (10n+6) fields succeeding the field where a scene change is detected. In the step S9, it is judged whether or not the current field is a field which is (10n+7) fields, a field which is (10n+8) fields or a field which is (10n+9) fields succeeding the field where a scene change is detected. The judgments are made on the basis of the content K1 of the first counter.

If the current field is the field which is (10n+1) fields succeeding the field where a scene change is detected (YES in the step S3), the program proceeds to the step S19 after processing in the step S10. If the current field is the field which is (10n+2) fields succeeding the field where a scene change is detected (YES in the step S4), the program proceeds to the step S19 after processing in the step S11.

If the current field is the field which is (10n+3) fields succeeding the field where a scene change is detected (YES in the step S5), the program proceeds to the step S19 after processing in the step S12. If the current field is the field which is (10n+4) fields succeeding the field where a scene change is detected (YES in the step S6), the program proceeds to the step S19 after processing in the step S13. If the current field is the field which is (10n+5) fields succeeding the field where a scene change is detected (YES in the step S7), the program proceeds to the step S19 after processing in the step S14.

If the current field is the field which is (10n+6) fields succeeding the field where a scene change is detected (YES in the step S8), the program proceeds to the step S19 after processing in the step S15.

If the current field is the field which is (10n+7) fields, the field which is (10n+8) fields or the field which is (10n+9) fields succeeding the field where a scene change is detected (YES in the step S9), the program proceed to the step S19. If the current field is a field which is (10n+10) fields succeeding the field where a scene change is detected (NO in the step S9), the program proceeds to the step S20.

In the step S19, the content K1 of the first counter is incremented by one. In the step S20, the content K1 of the first counter is set to "1". That is, the content K1 of the first counter is set to "1" when a scene change is detected in the current field (YES in the step S1) or when the current field is a field which is (10n+10) fields succeeding the field where a scene change is detected (NO in the step S9). The content K1 of the first counter is incremented by one in the step S19 when the current field is a field which is (10n+1) fields to (10n+9) fields succeeding the field where a scene change is detected (YES in any one of the steps S3 to S9).

When the processing for judging the back-and-forth positional relationship between subjects in each of the fields is started, therefore, the content K1 of the first counter is any one of 1 to 10, which indicates which of the field which is (10n+1) fields to the field which is (10n+10) fields succeeding the field where a scene change is detected is the current field. Therefore, it can be judged on the basis of the content K1 of the first counter which of the field which is (10n+1) fields to the field which is (10n+10) fields succeeding the field where a scene change is detected is the current field.

When the processing in the foregoing step S19 or S20 is performed, the program proceeds to the step S21. In the step S21, it is judged whether or not the current field is one of fields preceding a field which is 20 fields succeeding the field where a scene change is detected. This judgment is made on the basis of the content K2 of the second counter.

The content K2 of the second counter is set to "1" when a scene change is detected, as described above. In the step S21, the content K2 of the second counter is incremented by one when the current field is one of fields preceding the field which is 20 fields succeeding the field where a scene change is detected (step S22).

In a case where the processing in the step S21 is performed, therefore, the content K2 of the second counter is a value of not more than 20 when the current field is one of the fields preceding the field which is 20 fields succeeding the field where a scene change is detected, while being "21" when the current field is one of fields succeeding the field which is 20 fields succeeding the field where a scene change is detected. Therefore, it can be judged on the basis of the content K2 of the second counter whether or not the current field is one of the fields preceding the field which is 20 fields succeeding the field where a scene change is detected.

When it is judged in the foregoing step S21 that the current field is one of the fields preceding the field which is 20 fields succeeding the field where a scene change is detected, and the content K2 of the second counter is updated (step S22), the target value of the delay is set to zero (step S23). The present processing is then terminated. When it is judged in the foregoing step S21 that the current field is one of the fields succeeding the field which is 20 fields succeeding the field where a scene change is detected, the present processing is terminated.

The processing in the steps S10 to S15 is processing for specifying an area of the subject and an area of the background and calculating the target value of the delay. The processing is performed in units of 10 fields after a scene change is detected. Since the target value of the delay is set to "0" in the fields preceding the field which is 20 fields succeeding the field where a scene change is detected (step S23), therefore, a target value of a delay calculated in the fields succeeding the field which is 20 fields succeeding the field where a scene change is detected is used for controlling the delay.

Description is now made of the processing in the steps S10 to S15.

[Description of processing in the step S10]

The processing in the step S10 is processing performed in the field which is (10n+1) fields succeeding the field where a scene change is detected.

In the step S10, the accumulated sum $\Sigma V$ of values related to motion vectors V corresponding to 10 fields for each of the detecting areas A1 to H5 which are detected in a period of 10 fields preceding the current field are found for each detecting area and is stored. In addition, the accumulated sum $\Sigma AVE$ of the average values AVE corresponding to 10 fields of accumulated correlation values for each of the detecting areas A1 to H5 which are detected in a period of 10 fields preceding the current field is found for each detecting area and is stored.

The period of 10 fields preceding the current field is a period of 10 fields from the 11-th field to the 20-th field when the current field is a field which is 20 fields succeeding the field where a scene change occurs.

[Description of processing in the step S11]

The processing in the step S11 is processing performed in the field which is (10n+2) fields succeeding the field where a scene change is detected.

In the step 11, it is judged whether or not the accumulated sum $\Sigma V$ of values related to motion vectors V corresponding to 10 fields for each of the detecting areas A1 to H5 which are detected in a period of 10 fields preceding the current field is low in reliability and is related to the movement of the image. An area having an accumulated sum which is low in reliability and an area having an accumulated sum which is not related to the movement of the image shall be referred to as NG areas.

Specifically, it is judged in the step S11 which of the detecting areas A1 to H5 is an NG area. The judgment whether or not the detecting area is the NG area is made on the basis of the following judgment rules (a), (b) and (c):

(a) If the accumulated sum $\Sigma AVE$ of the average values AVE corresponding to 10 fields of accumulated correlation values for each of the detecting areas A1 to H5 is less than one-fifth of the average value of the accumulated sums $\Sigma AVE$ for the detecting areas A1 to H5 {=(the sum of the accumulated sums $\Sigma AVE$ for the detecting areas A1 to H5)/(the number of detecting areas 40)}, the area is taken as an NG area.

(b) If the accumulated sums $\Sigma AVE$ of the average values AVE corresponding to 10 fields of accumulated correlation values for each of the detecting areas A1 to H5 is less than 350, the area is taken as an NG area.

(c) An area where the absolute value of the accumulated sum $\Sigma V$ of values related to motion vectors corresponding to 10 fields is not less than three out of the detecting areas A5, B5, C5, ... H5 in the lowermost stage is taken as an NG area because the possibility that subtitles are reflected thereon is high.

One-fifth of a constant used in the judgment rule (a) is a value determined by simulation. In addition, a constant 350 used in the judgment rule (b) is a value found by experiments so as to take a blueback area as an NG area.

[Description of processing in the step S12]

The processing in the step S12 is processing performed in the field which is (10n+3) fields succeeding the field where a scene change is detected.

In the step S12, the following processing is performed using the accumulated sum $\Sigma V$ of values related to motion vectors V corresponding to 10 fields for each of the detecting areas which are not judged to be NG areas (effective areas). Specifically, the minimum value $\alpha$ and the maximum value $\beta$ of the accumulated sum $\Sigma V$ of the values related to the motion vectors corresponding to 10 fields for each of the effective areas are extracted. The range from the minimum value $\alpha$ to the maximum value $\beta$ of the accumulated sum $\Sigma V$ of the values related to the motion vectors is divided into eight ranges. For each of the eight ranges obtained by the division, the number of effective areas is found, thereby to produce a histogram of the accumulated sum $\Sigma V$ of values related to motion vectors as shown in FIG. 6.

The large or small relationship of the accumulated sum $\Sigma V$ of the values related to the motion vectors is determined by taking a motion vector directed from the left to the right as a positive motion vector and taking a motion vector directed from the right to the left as a negative motion vector. In this histogram, when a range in which the number of effective areas is one exists and the number of effective areas is zero in at least one of ranges adjacent to the range, it is judged that the possibility that the accumulated sum $\Sigma V$ of the values related to the motion vectors corresponding to the one effective area existing in the range is inaccurate is high, whereby the one effective area existing in the range is removed from the histogram. In an example shown in FIG. 6, a portion of v is removed.

As shown in FIG. 6, the average value $(\alpha+\beta)/2$ of the minimum value $\alpha$ and the maximum value $\beta$ is then found. The found average values $(\alpha+\beta)/2$ is taken as the boundary. Each of the effective areas existing in a range in which the accumulated sum $\Sigma V$ of the values related to the motion vectors is smaller than the accumulated sum $\Sigma V$ of the values related to the motion vectors corresponding to the boundary is defined as an L block, and each of the effective areas existing in a range in which the accumulated sum $\Sigma V$ of the values related to the motion vectors is larger than the accumulated sum $\Sigma$ of the values related to the motion vectors corresponding to the boundary is defined as an H block. That is, the effective areas are classified into the L blocks and the H blocks.

[Description of processing in the step S13]

The processing in the step S13 is processing performed in the field which is (10n+4) fields succeeding the field where a scene change is detected.

In the step S13, first subject/background judging processing (hereinafter referred to as judging processing A) is performed. In the judging processing A, 16 motion vector detecting areas A1, B1, C1, D1, E1, F1, G1, H1, A2, A3, A4, A5, H2, H3, H4 and H5 which exist on the upper end row, the left end column and the right end column, as indicated by hatching in FIG. 7, out of the motion vector detecting areas are taken as a first target area.

In a normal image, a background is reflected in a peripheral portion of a screen in many cases. Therefore, the total number of L blocks existing in the first target area which is an area in the peripheral portion of the screen and the total number of H blocks existing in the first target area are compared with each other, to judge which of the L blocks and the H blocks are the blocks whose total number existing in the first target area is larger.

When the blocks whose total number existing in the first target area is larger are the L blocks, the effective areas defined as the L blocks in the foregoing step S12 out of the 40 motion vector detecting areas are judged to be background areas (areas where a background exists). The effective areas defined as the H blocks in the foregoing step S12 are judged to be subject areas (areas where a subject exists).

When the blocks whose total number existing in the first target area is larger are the H blocks, the effective areas defined as the H blocks in the foregoing step S12 out of the 40 motion vector detecting areas are judged to be background areas. The effective areas defined as the L blocks in the foregoing step S12 are judged to be subject areas.

When in the first target area, the total number of L blocks and the total number of H blocks are equal, the distinction between the subject areas and the background areas is not made.

[Description of processing in the step S14]

The processing in the step S14 is processing performed in the field which is (10n+5) fields succeeding the field where a scene change is detected.

In the step S14, second subject/background judging processing (hereinafter referred to as judging processing B) and third subject/background judging processing (hereinafter referred to as judging processing C) are performed, and final subject/background judgment is made from the results of the judging processing A, B and C.

Figures 7, 8:
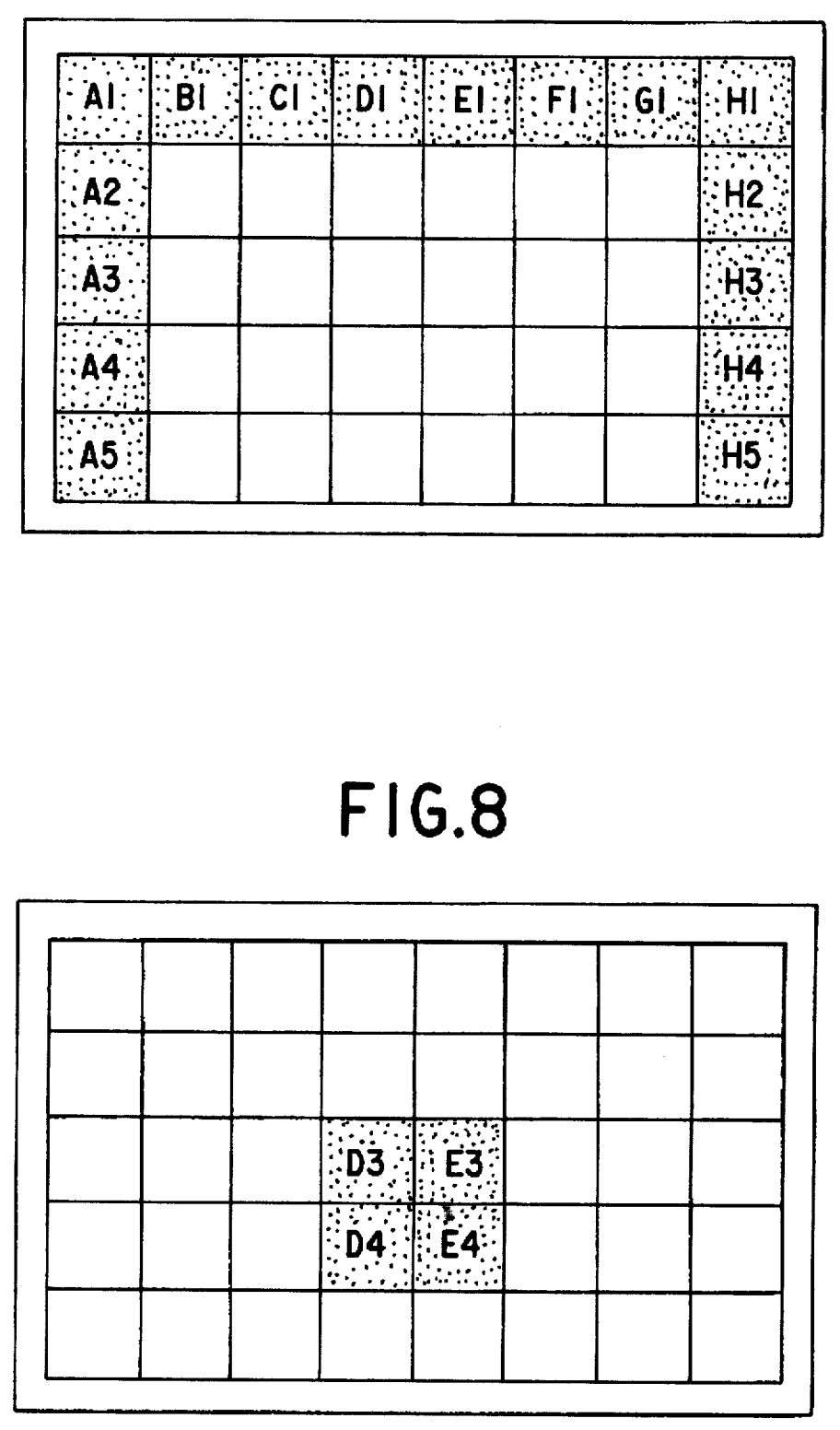

In the judging processing B, four motion vector detecting areas D3, E3, D4 and E4 in the center, as indicated by hatching in FIG. 8, out of the motion vector detecting areas are taken as a second target area.

In a normal image, a subject is reflected in a central portion of a screen in many cases. Therefore, the total number of L blocks existing in the second target area which in an area in the central portion of the screen and the total number of H blocks existing in the second target area are compared with each other, to judge which of the L blocks and the H blocks are the blocks whose total number existing in the second target area is larger.

When the blocks whose total number existing in the second target area is larger are the L blocks, the effective areas defined as the L blocks in the foregoing step S12 out of the 40 motion vector detecting areas are judged to be subject areas. The effective areas defined as the H blocks in the foregoing step S12 are judged to be background areas.

When the blocks whose total number existing in the second target area is larger are the H blocks, the effective areas defined as the H blocks in the foregoing step S12 out of the 40 motion vector detecting areas are judged to be subject areas. The effective areas defined as the L blocks in the foregoing step S12 are judged to be background areas.

When in the second target area, the total number of L blocks and the total number of H blocks are equal, the distinction between the subject areas and the background areas is not made.

When the judging processing B is terminated, the result of the judging processing A and the result of the judging processing B are compared with each other. When the results of the judgment are equal, the results are taken as the final result of subject/background judgment, whereby the processing in the step S14 is terminated.

Specifically, when it is judged that the areas defined as the L blocks are background areas and the areas defined as the H blocks are subject areas in both the judging processing A and B, for example, the results of the judgment are taken as the final result of subject/background judgment.

Furthermore, when it is judged that the total number of L blocks and the total number of H blocks are equal in the first target area in the judging processing A, and it is judged that either one of the total number of L blocks and the total number of H blocks is larger in the second target area in the judging processing B, the result of subject/background judgment by the judging processing B is taken as the final result of subject/background judgment, whereby the processing in the step S14 is terminated.

On the other hand, when it is judged that either one of the total number of L blocks and the total number of H blocks is larger in the first target area in the judging processing A, and it is judged that the total number of L blocks and the total number of H blocks are equal in the second target area in the judging processing B, the result of subject/background judgment by the judging processing A is taken as the final result of subject/background judgment, whereby the processing in the step S14 is terminated.

When the results of both the judging processing A and the judging processing B differ, the judging processing C is performed. When it is judged that the total number of L blocks and the total number of H blocks are equal in the first target area in the judging processing A, and it is judged that the total number of L blocks and the total number of H blocks are equal in the second target area in the judging processing B, the judging processing C is also performed.

In the judging processing C, the total number of L blocks existing in all the motion vector detecting areas and the total number of H blocks existing in all the motion vector detecting areas are first compared with each other, to judge which of the L blocks and the H blocks are the blocks whose total number is smaller. The blocks whose total number is smaller are taken as target blocks, and the blocks whose total number is larger are taken as non-target blocks.

The ratio $\eta$ of the number of target blocks existing in the first target area (see FIG. 7) to the total number of target blocks existing in all the motion vector detecting areas {(the number of target blocks existing in the first target area)/(the total number of target blocks existing in all the motion vector detecting areas)} is calculated.

When the calculated ratio $\eta$ is not less than a predetermined value, it is judged that the target blocks existing in all the motion vector detecting areas are background areas, and it is judged that the non-target blocks existing in all the motion vector detecting areas are subject areas. The result of the judgment is taken as the final result of subject/background judgment, whereby the processing in the step S14 is terminated.

When the calculated ratio $\eta$ is less than a predetermined value, it is judged that the non-target blocks existing in all the motion vector detecting areas are background areas, and it is judged that the target blocks existing in all the motion vector detecting areas are subject areas. The result of the judgment is taken as the final result of subject/background judgment, whereby the processing in the step S14 is terminated.

In the present embodiment, the above described predetermined value is 0.45, which is a value found by conducting experiments on various images.

A subject/background judgment rule by the judging processing C is produced on the basis of the following idea. When the result of subject/background judgment by the judging processing A and the result of subject/background judgment by the judging processing B differ, it is considered that a subject is positioned in a peripheral portion of the screen. When a large subject extends to the peripheral portion of the screen, an area occupied by a background is small on the entire screen, while the ratio of an area of the background existing in the peripheral portion of the screen to the entire area occupied by the background is not less than a predetermined value. On the other hand, when a small subject is reflected on a peripheral portion of the screen, an area occupied by the subject is small on the entire screen, and the ratio of an area of the subject existing in the peripheral portion of the screen to the entire area occupied by the subject is less than a predetermined value.

[Description of processing in the step S15]

The processing in the step S15 is processing performed in the field which is (10n+6) fields succeeding the field where a scene change is detected.

In the step S15, a target value of a delay is calculated on the basis of the final result of subject/background judgment obtained in the foregoing step S14. Specifically, the sum ΣΣV of the accumulated sums ΣV of values related to motion vectors in a period of 10 fields for the blocks finally judged to be subject areas is found. The sum ΣΣV of the accumulated sums ΣV is divided by the total number of blocks judged to be subject areas, thereby to find the average value HI of the sum ΣΣV of the accumulated sums ΣV.

Furthermore, the sum ΣΣV of the accumulated sums ΣV of values related to motion vectors in a period of 10 fields for the blocks finally judged to be background areas is found. The sum ΣΣV of the accumulated sums ΣV is divided by the total number of blocks judged to be background areas, thereby to find the average value HA of the sum ΣΣV of the accumulated sums ΣV.

When the absolute value of the average value HI is not less than the absolute value of the average value HA (|HI|≧|HA|), the absolute value of the target value of the delay is calculated on the basis of the absolute value of the average value HI for the blocks judged to be subject areas. The target value of the delay is made positive if the average value HI is a positive value, while being made negative if the average value HI is a negative value.

On the other hand, when the absolute value of the average value H1 is less than the absolute value of the average value HA (|HI|<|HA|), the absolute value of the target value of the delay is calculated on the basis of the absolute value of the average value HA for the blocks judged to be background areas. The target value of the delay is made negative if the average value HA is a positive value, while being made positive if the average value HA is a negative value.

There is a case where the original 2D image is a transversely flowing image. The transversely flowing image is an image in which both a subject and a background are clearly moving in the same direction. For example, the transversely flowing image is an image in which a far scene is flowing slowly and a near scene is flowing fast when scenery is picked up from the window of an automobile, for example. When the original 2D image is such a transversely flowing image (the signs of HI and HA are the same), the absolute value of the target value of the delay is found in the same method as the above described method, while the plus or minus sign of the target value of the delay is determined in the following manner.

When the original 2D image is a rightward flowing image (the sings of HI and HA are plus), the sign of the target value of the delay is made plus. When the original 2D image is a leftward flowing image (the sings of HI and HA are minus), the sign of the target value of the delay is made minus.

The target value of the delay found in the foregoing step S15 is used for calculating the delay. The delay is so found as to gradually approach the target value of the delay found in the step S15. The sign of the found delay is an index as to whether or not the delayed image signal is selected as a right eye image signal or a left eye image signal. Specifically, when the delayed image signal is selected as a right eye image signal when the sign of the delay is plus, while being selected as a left eye image signal when the sign of the delay is minus.

Figure 9:
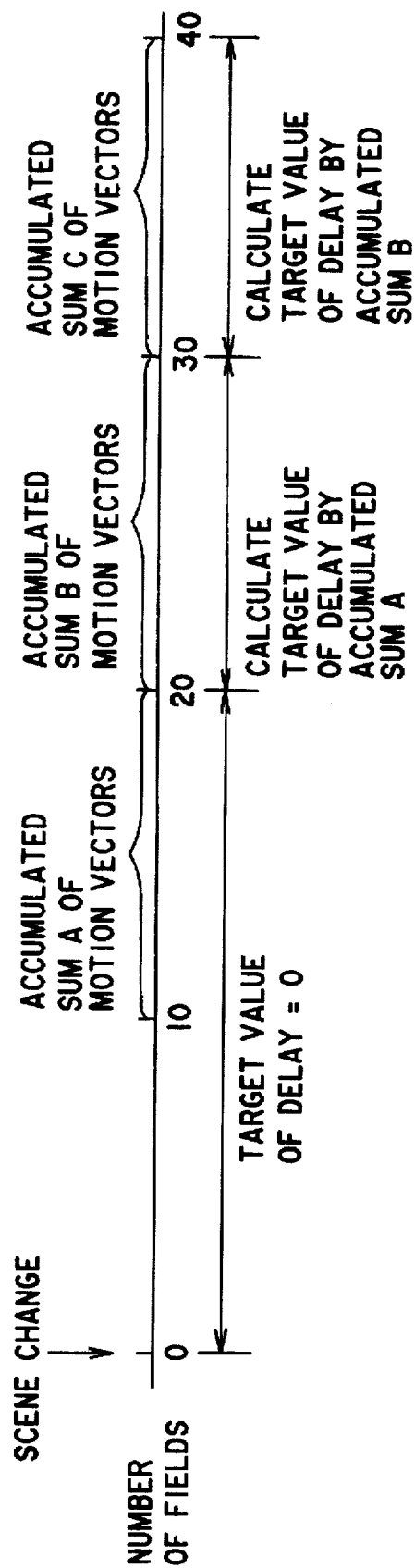
FIG. 9 is a timing chart showing the relationship between a field number of a 2D image signal and processing for calculating a target value of a delay.

The relationship between a field number of the 2D image signal inputted to the input terminal 1 and processing for calculating the target value of the delay performed in the foregoing step S15 is illustrated in FIG. 9.

Figure 10:
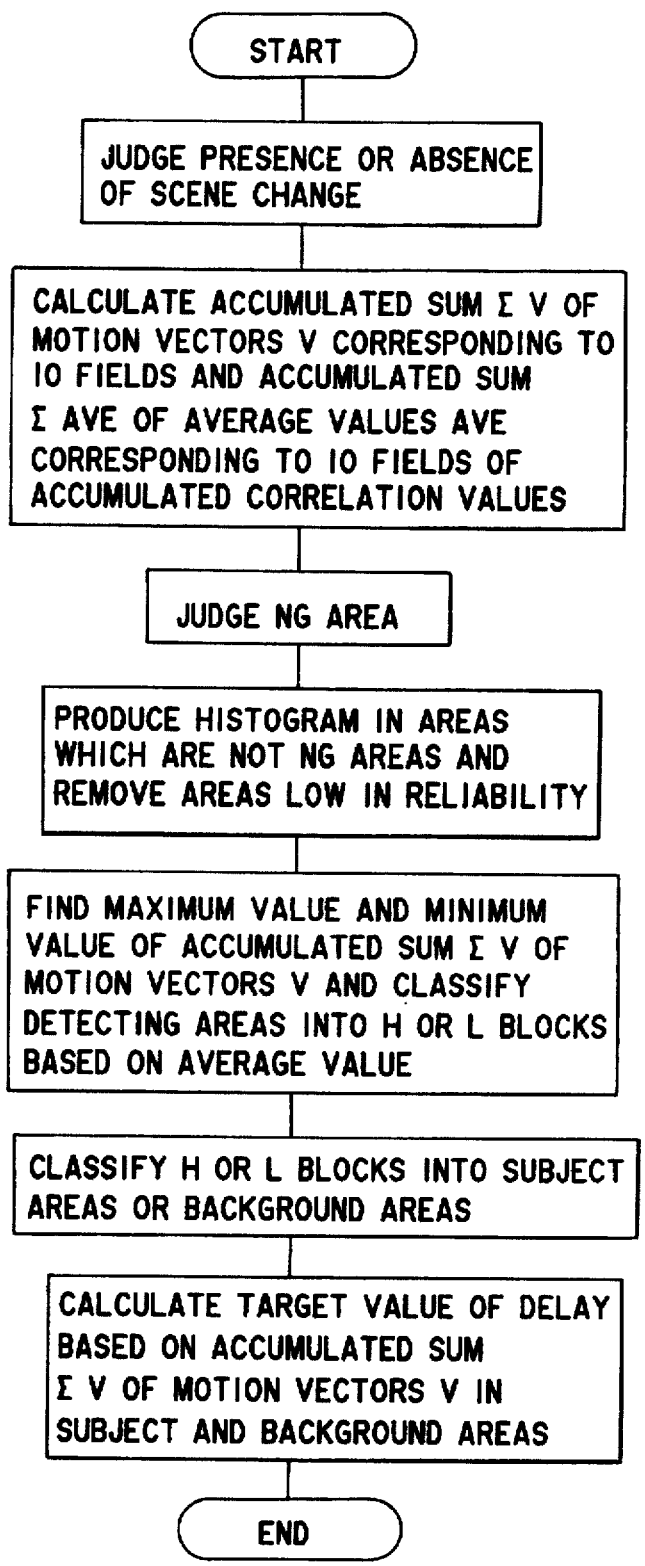
FIG. 10 is a flow chart showing the entire flow of processing for judging the back-and-forth positional relationship between subjects by a CPU.

Furthermore, the entire flow of the above described subject/background judging processing is shown in FIG. 10.

Figure 11A:
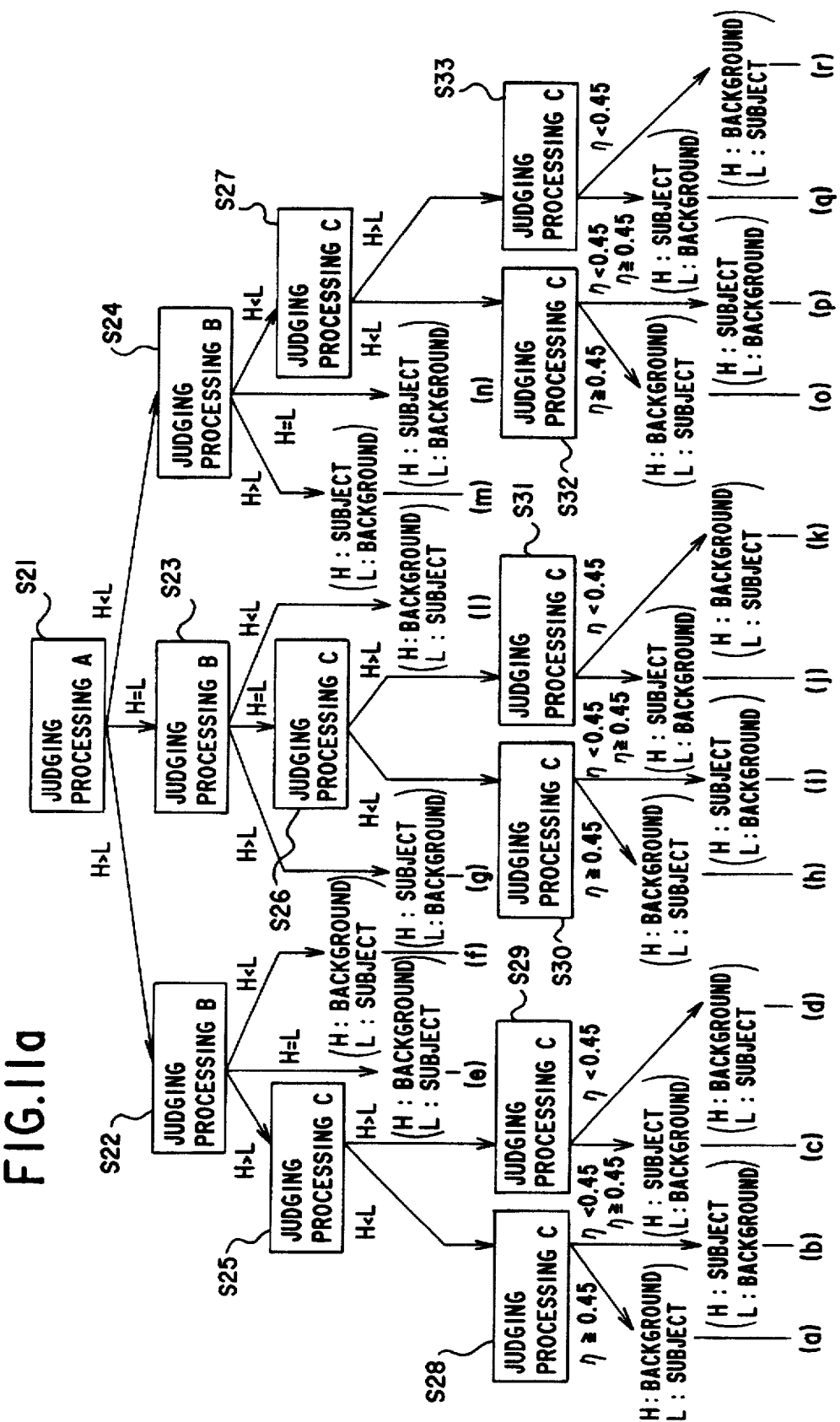

FIGS. 11a and 11b show the detailed flow of the judging processing A, B and C and the processing for calculating the target value of the delay in the steps S13, S14 and S15 shown in FIG. 5a.

In the step S21, the judging processing A is performed. Specifically, the total number of H blocks existing in the first target area shown in FIG. 7 and the number of L blocks existing in the first target area are compared with each other. The program proceeds to the step S22 when the total number of H blocks is larger, the program proceeds to the step S23 when the total numbers of both blocks are equal, and the program proceeds to the step S24 when the total number of L blocks is larger.

In the steps S22, S23 and S24, the judging processing B is performed. Specifically, the total number of H blocks existing in the second target area shown in FIG. 8 and the total number of L blocks existing in the second target area are compared with each other.

When it is judged in the step S22 that the total number of H blocks is larger, the program proceeds to the step S25. When it is judged in the step S22 that the total numbers of both blocks are equal or the total number of L blocks is larger, it is judged that the H blocks are background areas and the L blocks are subject areas (the final results of judgment (e) and (f)).

When it is judged in the step S23 that the total number of H blocks is larger, it is judged that the H blocks are subject areas and the L blocks are background areas (the final result of judgment (g)). When it is judged in the step S23 that the total numbers of both blocks are equal, the program proceeds to the step S26. When it is judge in the step S23 that the total number of L blocks is larger, it is judged that the L blocks are subject areas and the H blocks are background areas (the final result of judgment (1)).

When it is judged in the step S24 that the total number of H blocks is larger or the total numbers of both blocks are equal, it is judged that the H blocks are subject areas and the L blocks are background areas (the final results of judgment (m) and (n)). When it is judged in the step S24 that the total number of L blocks is larger, the program proceeds to the step S27.

In the steps S25, S26 and S27, the first half of the judging processing C is performed. Specifically, the total number of H blocks existing in all the motion vector detecting areas and the total number of L blocks existing in all the motion vector detecting areas are compared with each other. The blocks whose total number is smaller are taken as target blocks.

When it is judged in the steps S25, S26 and S27 that the H blocks are target blocks, the program respectively proceeds to the steps S28, S30 and S32. When it is judged in the steps S25, S26 and S27 that the L blocks are target blocks, the program respectively proceeds to the steps S29, S31 and S33.

In the steps S28 to S33, the latter half of the judging processing C is performed. Specifically, it is judged whether or not the ratio η of the total number of target blocks existing in the first target area to the total number of target blocks existing in all the detecting areas is not less than 0.45.

When it is judged in the steps S28, S30 and S32 that the above described ratio η of the H blocks which are target blocks to the total number of target blocks existing in all the detecting areas is not less than 0.45, it is judged that the H blocks are background areas and the L blocks are subject areas (the final results of judgment (a), (h) and (o)).

When it is judged in the steps S29, S31 and S33 that the above described ratio η of the L blocks which are target blocks to the total number of target blocks existing in all the detecting areas is less than 0.45, it is also judged that the H blocks are background areas and the L blocks are subject areas (the final results of judgment (d), (k) and (r)).

When it is judged in the steps S28, S30 and S32 that the above described ratio η of the H blocks which are target blocks to the total number of target blocks existing in all the detecting areas is less than 0.45, it is judged that the H blocks are subject areas and the L blocks are background areas (the final results of judgment (b), (i) and (p)).

When it is judged in the steps S29, S31 and S33 that the above described ratio η of the L blocks which are target blacks to the total number of target blocks existing in all the detecting areas is not less than 0.45, it is also judged that the H blocks are subject areas and the L blocks are background areas (the final results of judgment (c), (j) and (q)).

In the steps S34 to S51, the target value of the delay is determined. Specifically, the sum of the accumulated sums ΣV of values related to motion vectors in a period of 10 fields preceding the current field for the H blocks is found. The sum ΣΣV of the accumulated sums ΣV is divided by the total number of H blocks, thereby to find the average value AH of the sum ΣΣV of the accumulated sums ΣV. In addition, the sum of the accumulated sums ΣV of values related to motion vectors in a period of 10 fields preceding the current field for the L blocks is found. The sum ΣΣV of the accumulated sums ΣV is divided by the total number of L blocks, thereby to find the average value AL of the sum ΣΣV of the accumulated sums ΣV.

When the H blocks are subject areas and the L blocks are background areas as the final results of the judgment {(b) (c) (g) (i) (j) (m) (n) (p) (q)}, the target value of the delay is determined in the following manner.

Specifically, if the absolute value of the average value AH for the H blocks which are subject areas is not less than the absolute value of the average value AL for the L blocks which are background areas, the target value of the delay is determined on the basis of the following rule I:

Rule I

The target value of the delay is found from the absolute value of the average value AH for the H blocks which are subject areas.

A delayed image signal is selected as an image signal for the eye corresponding to the direction to which the average motion vector (AH) for the H blocks which are subject areas is pointed.

On the other hand, if the absolute value of the average value AL for the L blocks which are background areas is more than the absolute value of the average value AH for the H blocks which are subject areas, the target value of the delay is determined on the basis of the following rule II:

Rule II

The target value of the delay is found from the absolute value of the average value AH for the L blocks which are background areas.

A delayed image signal is selected as an image signal for the eye corresponding to the direction opposite to the direction to which the average motion vector (AL) for the L blocks which are background areas is pointed.

When the H blocks are background areas and the L blocks are subject areas as the final results of the judgment {(a) (d) (e) (f) (h) (k) (l) (o) (r)}, the target value of the delay is determined in the following manner.

Specifically, if the absolute value of the average value AL for the L blocks which are subject areas is not less than the absolute value of the average value AH for the H blocks which are background areas, the target value of the delay is determined on the basis of the following rule III:

Rule III

The target value of the delay is found from the absolute value of the average value AL for the L blocks which are subject areas.

A delayed image signal is selected as an image signal for the eye corresponding to the direction to which the average motion vector (AL) for the L blocks which are subject areas is pointed.

On the other hand, if the absolute value of the average value AH for the H blocks which are background areas is more than the absolute value of the average value AL for the L blocks which are subject areas, the target value of the delay is determined on the basis of the following rule IV:

Rule IV

The target value of the delay is found from the absolute value of the average value AH for the H blocks which are background areas.

A delayed image signal is selected as an image signal for the eye corresponding to the direction opposite to the direction to which the average motion vector (AH) for the H blocks which are background areas is pointed.

Description is now made of the judging processing A, B and C and the processing for calculating a target value of a delay with respect to specific images respectively illustrated in FIGS. 12, 14, 16, 18, 20, 22 and 24.

FIG. 12 illustrates images in which a subject (an automobile) is moving from the left to the right on a screen ahead of a background (trees). The image on the left side of FIG. 12 is an image corresponding to the first field, and the image on the right side of FIG. 12 is an image corresponding to the tenth field.

Figure 13A:
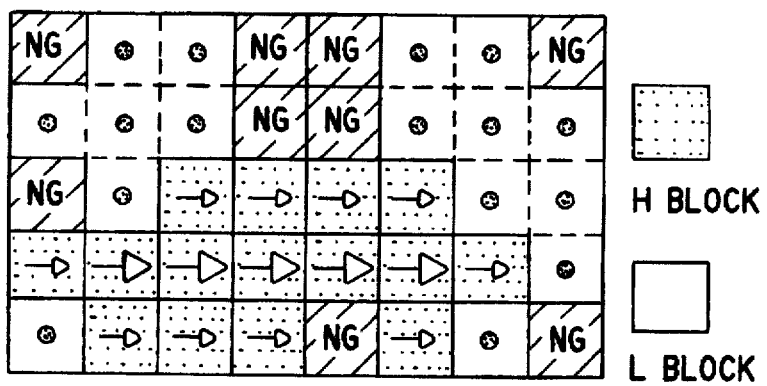
FIGS. 13a to 13c are diagrams for explaining processing for judging the back-and-forth positional relationship between subjects with respect to the 2D images shown in FIG. 12.
Figure 13B:
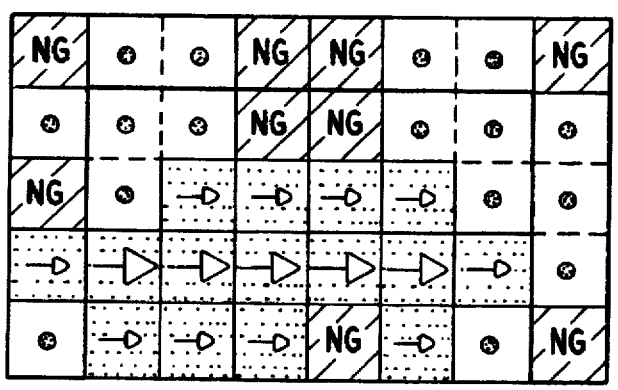

In such images, the sum of values related to motion vectors corresponding to ten fields for each of the motion vector detecting areas and NG areas are as shown in FIG. 13a, for example. As shown in FIG. 13b, the total number of H blocks existing in the first target area is one, and the total number of L blocks existing in the first target area is nine.

In the judging processing A in the step S21 shown in FIG. 11a, therefore, it is judged that the total number of L blocks is larger, after which the program proceeds to the step S24. That is, as the result of the judging processing A, the H blocks are subject areas and the L blocks are background areas.

Figure 13C:
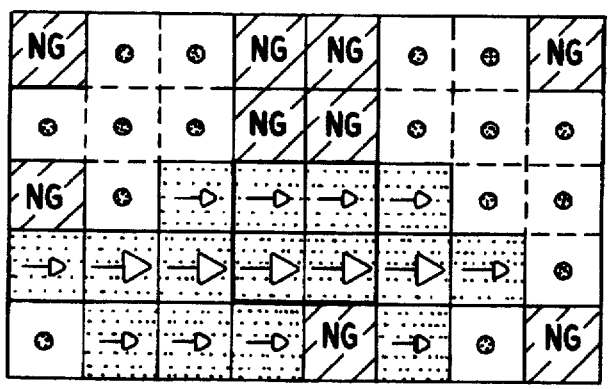

As shown in FIG. 13c, the total number of H blocks existing in the second target area is four, and the total number of L blocks existing in the second target area is zero. In the judging processing B in the step S24 shown in FIG. 11a, therefore, it is judged that the total number of H blocks is larger, whereby the final result of subject/background judgment (m) is obtained.

That is, as the result of the judging processing B, the H blocks are subject areas and the L blocks are background areas. The result of the judging processing B is the same as the result of the judging processing A, whereby the result of the judgment becomes the final result of judgment.

Furthermore, the absolute value of the average motion vector (AH) for the H blocks which are subject areas is larger than the absolute value of the average motion vector (AL) for the L blocks which are background areas. Accordingly, the determination of the target value of the delay in the step S46 shown in FIG. 11b is made in accordance with the rule I.

Specifically, the target value of the delay is taken as the absolute value of the average motion vector (AH) for the H blocks which are subject areas. In addition, a delayed image signal is selected as a right eye image corresponding to the direction to which the average motion vector (AH) for the H blocks is pointed.

In the images shown in FIG. 12, therefore, a delayed image is selected as a right eye image corresponding to the direction in which the automobile is moving, thereby to obtain a 3D image in which the automobile is positioned ahead of trees which are a background.

FIG. 14 illustrates images in which a background (a house) behind a subject (an automobile) is moving from the left to the right on a screen. The image on the left side of FIG. 14 is an image corresponding to the first field, and the image on the right side of FIG. 14 is an image corresponding to the tenth field.

Figure 15A:
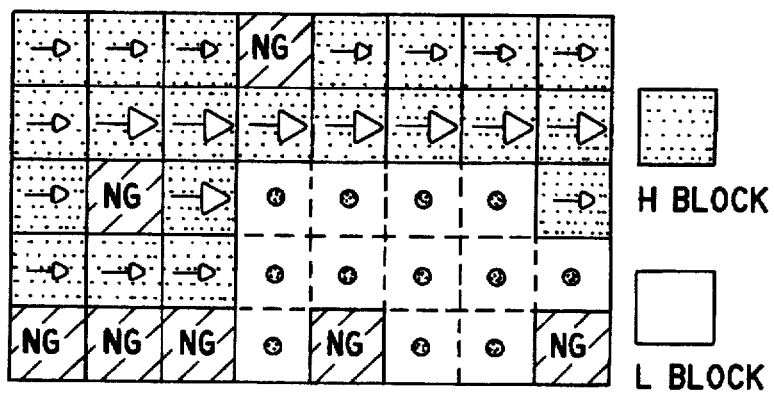
FIGS. 15a to 15c are diagrams for explaining processing for judging the back-and-forth positional relationship between subjects with respect to the 2D images shown in FIG. 14.
Figure 15B:
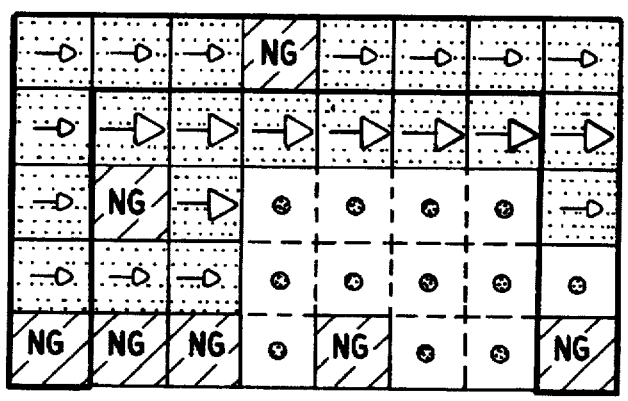

In such images, the sum of values related to motion vectors corresponding to ten fields for each of the motion vector detecting areas and NG areas are as shown in FIG. 15a, for example. As shown in FIG. 15b, the total number of H blocks existing in the first target area is twelve, and the total number of L blocks existing in the first target area is one. In the judging processing A in the step S21 shown in FIG. 11a, therefore, it is judged that the total number of H blocks is larger, after which the program proceeds to the step S22. That is, as the result of the judging processing A, the H blocks are background areas and the L blocks are subject areas.

Figure 15C:
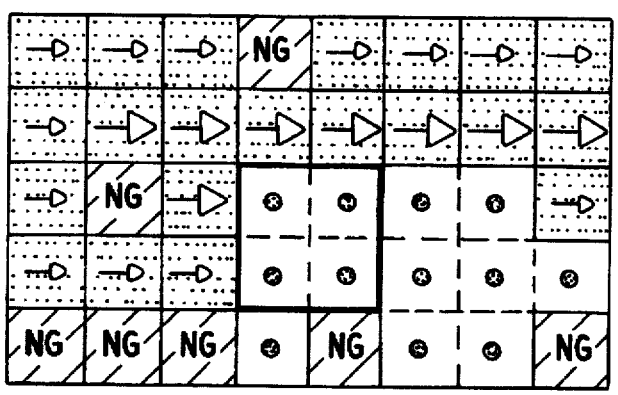

As shown in FIG. 15c, the total number of H blocks existing in the second target area is zero, and the total number of L blocks existing in the second target area is four. In the judging processing B in the step S22 shown in FIG. 11a, therefore, it is judged that the total number of L blocks is larger, whereby the final result of subject/background judgment (f) is obtained.

That is, as the result of the judging processing B, the H blocks are background areas and the L blocks are subject areas. The result of the judging processing B is the same as the result of the judging processing A, whereby the result of the judgment becomes the final result of judgment.

Furthermore, the absolute value of the average motion vector (AH) for the H blocks which are background areas is larger than the absolute value of the average motion vector (AL) for the L blocks which are subject areas. Accordingly, the determination of the target value of the delay in the step S39 shown in FIG. 11b is made in accordance with the rule IV.

Specifically, the target value of the delay is taken as the absolute value of the average motion vector (AH) for the H blocks which are background areas. In addition, a delayed image signal is selected as a left eye image corresponding to the direction opposite to the direction to which the average motion vector (AH) for the H blocks is pointed.

In the images shown in FIG. 14, therefore, a delayed image is selected as a left eye image corresponding to the direction opposite to the direction in which the house is moving, thereby to obtain a 3D image in which the house is positioned behind the automobile.

The foregoing is an example in a case where the results of the judging processing A and the judging processing B are equal. Description is now made of an example in a case where the results of the judging processing A and the judging processing B differ, and the judging processing C is performed.

FIG. 16 illustrates images in which a subject (birds) ahead of a background (mountains) is moving from the left to the right on a screen. The image on the left side of FIG. 16 is an image corresponding to the first field, and the image on the right side of FIG. 16 is an image corresponding to the tenth field.

Figure 17A:
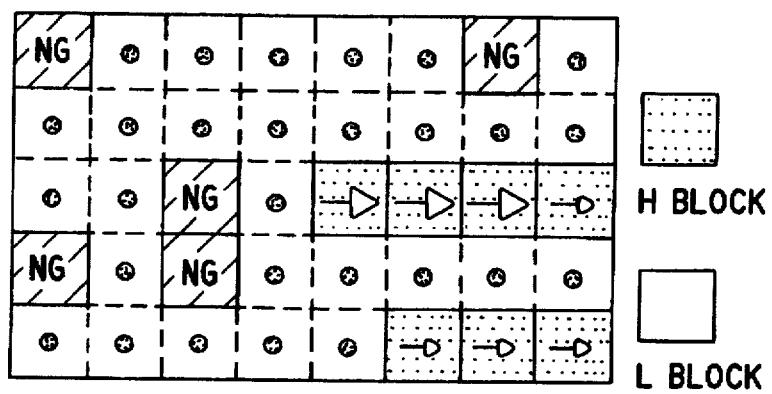
FIGS. 17a to 17c are diagrams for explaining processing for judging the back-and-forth positional relationship between subjects with respect to the 2D images shown in FIG. 16.
Figure 17B:
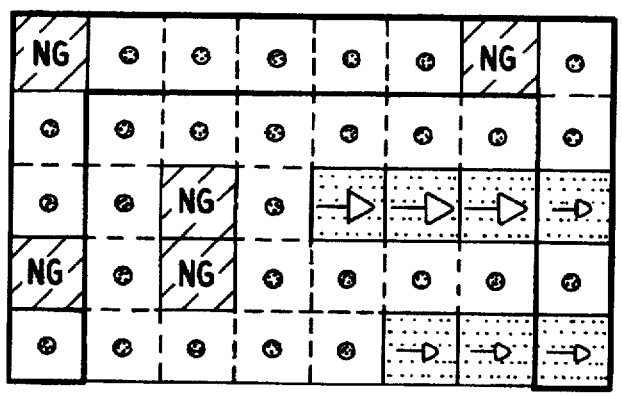

In such images, the sum of values related to motion vectors corresponding to ten fields for each of the motion vector detecting areas and NG areas are as shown in FIG. 17a, for example. As shown in FIG. 17b, the total number of H blocks existing in the first target area is two, and the total number of L blocks existing in the first target area is 11. In the judging processing A in the step S21 shown in FIG. 11a, therefore, it is judged that the total number of L blocks is larger, after which the program proceeds to the step S24. That is, as the result of the judging processing A, the H blocks are subject areas and the L blocks are background areas.

Figure 17C:
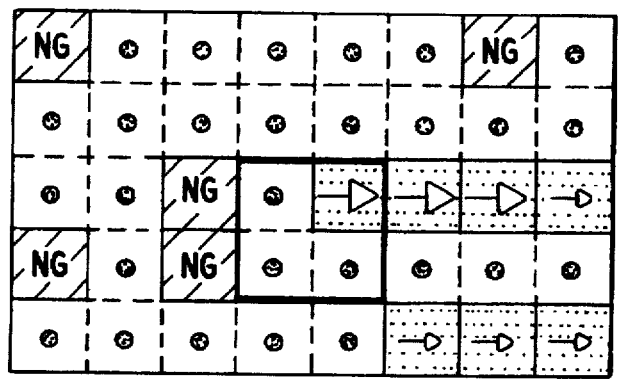

As shown in FIG. 17c, the total number of H blocks existing in the second target area is one, and the total number of L blocks existing in the second target area is three. In the judging processing B in the step S24 shown in FIG. 11a, therefore, it is judged that the total number of L blocks is larger. That is, as the result of the judging processing B, the H blocks are background areas and the L blocks are subject areas. The result of the judging processing B differs from the result of the judging processing A, whereby the program proceeds to the step S27.

In the step S27, the total number of H blocks existing in all the motion vector detecting areas and the total number of L blocks existing in all the motion vector detecting areas are compared with each other, and the blocks whose total number is smaller are taken as target blocks. In this example, the total number of H blocks is seven, and the total number of L blocks is 28, whereby the H blocks are selected as target blocks. The program then proceeds to the step S32.

In the step S32, the ratio η of the total number of H blocks existing in the first target area to the total number of H blocks which are target blocks is found. In this example, the total number of H blocks is seven, and the total number of H blocks existing in the first target area is two. Therefore, the ratio η of the total number of H blocks existing in the first target area to the total number of H blocks becomes 2/7 (=0.28 . . . ), which is less than 0.45, whereby the final result of judgment (p) is obtained. That is, it is judged that the H blocks are subject areas and the L blocks are background areas, and the result of the judgment is the final result of judgment.

Furthermore, the absolute value of the average motion vector (AH) for the H blocks which are subject areas is larger than the absolute value of the average motion vector (AL) for the L blocks which are background areas.

Accordingly, the determination of the target value of the delay in the step S49 shown in FIG. 11b is made in accordance with the rule I.

Specifically, the target value of the delay is taken as the absolute value of the average motion vector (AH) for the H blocks which are subject areas. In addition, a delayed image signal is selected as a right eye image corresponding to the direction to which the average motion vector (AH) for the H blocks is pointed.

In the images shown in FIG. 16, therefore, a delayed image is selected as a right eye image corresponding to the direction in which the birds are moving, thereby to obtain a 3D image in which the birds are positioned ahead of the mountains.

Figure 18B:
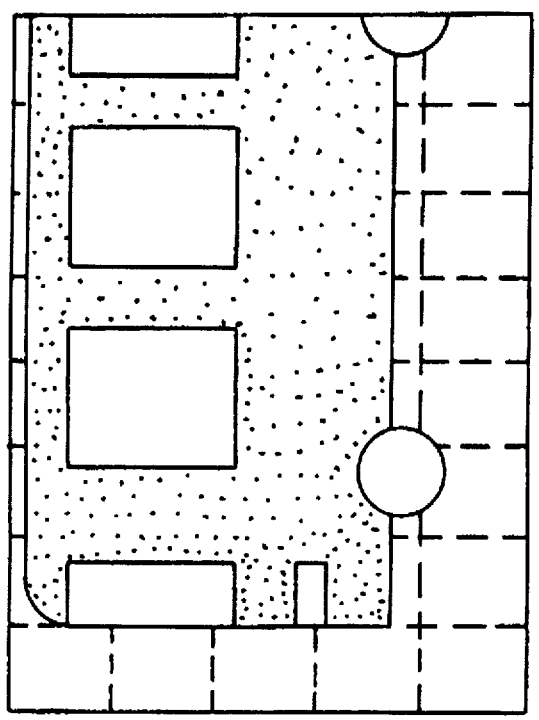
FIG. 18 is a typical diagram showing one example of 2D images.
Figure 18A:
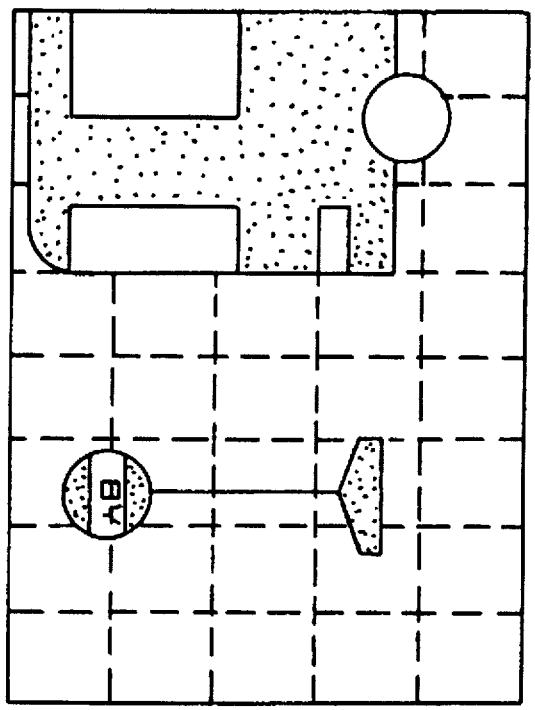

FIG. 18 illustrates images in which a subject (a bus) ahead of a background (a sign) is moving from the right end to the left on a screen. The image on the left side of FIG. 18 is an image corresponding to the first field, and the image on the right side of FIG. 18 is an image corresponding to the tenth field.

Figure 19A:
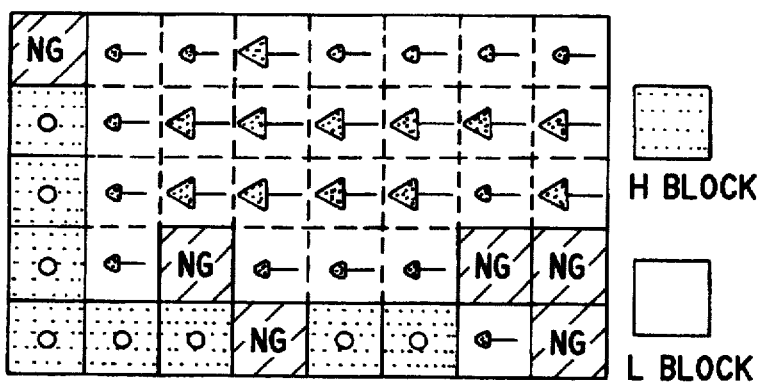
FIGS. 19a to 19c are diagrams for explaining processing for judging the back-and-forth positional relationship between subjects with respect to the 2D images shown in FIG. 18.
Figure 19B:
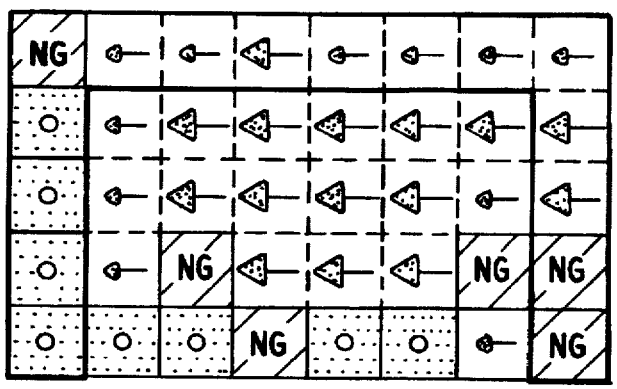

In such images, the sum of values related to motion vectors corresponding to ten fields for each of the motion vector detecting areas and NG areas are as shown in FIG. 19a, for example. As shown in FIG. 19b, the total number of H blocks existing in the first target area is four, and the total number of L blocks existing in the first target area is nine. In the judging processing A in the step S21 shown in FIG. 11a, therefore, it is judged that the total number of L blocks is larger, after which the program proceeds to the step S24. That is, as the result of the judging processing A, the L blocks are background areas and the H blocks are subject areas.

Figure 19C:
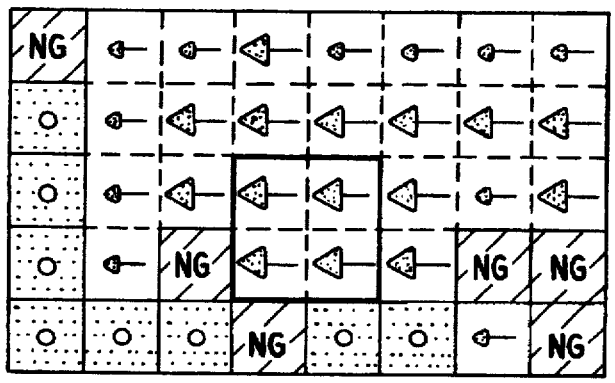

As shown in FIG. 19c, the total number of H blocks existing in the second target area is zero, and the total number of L blocks existing in the second target area is four. In the judging processing B in the step S24 shown in FIG. 11a, therefore, it is judged that the total number of L blocks is larger. That is, as the result of the judging processing B, the L blocks are subject areas and the H blocks are background areas. The result of the judging processing B differs from the result of the judging processing A, whereby the program proceeds to the step S27.

In the step S27, the total number of H blocks existing in all the motion vector detecting areas and the total number of L blocks existing in all the motion vector detecting areas are compared with each other, and the blocks whose total number is smaller are taken as target blocks. In this example, the total number of H blocks is eight, and the total number of L blocks is 26, whereby the H blocks are selected as target blocks. The program then proceeds to the step S32.

In the step S32, the ratio η of the total number of H blocks existing in the first target area to the total number of H blocks which are target blocks is found. In this example, the total number of H blocks is eight, and the total number of H blocks existing in the first target area is four. Therefore, the ratio η of the total number of H blocks existing in the first target area to the total number of H blocks becomes 4/8 (=0.5 ...), which is not less than 0.45, whereby the final result of judgment (o) is obtained. That is, it is judged that the H blocks are background areas and the L blocks are subject areas, and the result of the judgment is the final result of judgment.

Furthermore, the absolute value of the average motion vector (AL) for the L blocks which are subject areas is larger than the absolute value of the average motion value (AH) for the H blocks which are background areas. Accordingly, the determination of the target value of the delay in the step S48 shown in FIG. 11b is made in accordance with the rule III.

Specifically, the target value of the delay is taken as the absolute value of the average motion vectors (AL) for the L blocks which are subject areas. In addition, a delayed image signal is selected as a left eye image corresponding to the direction to which the average motion vector (AL) for the L blocks is pointed.

In the images shown in FIG. 18, therefore, a delayed image is selected as a left eye image corresponding to the direction in which the bus is moving, thereby to obtain a 3D image in which the bus is positioned ahead of the sign.

Figure 20B:
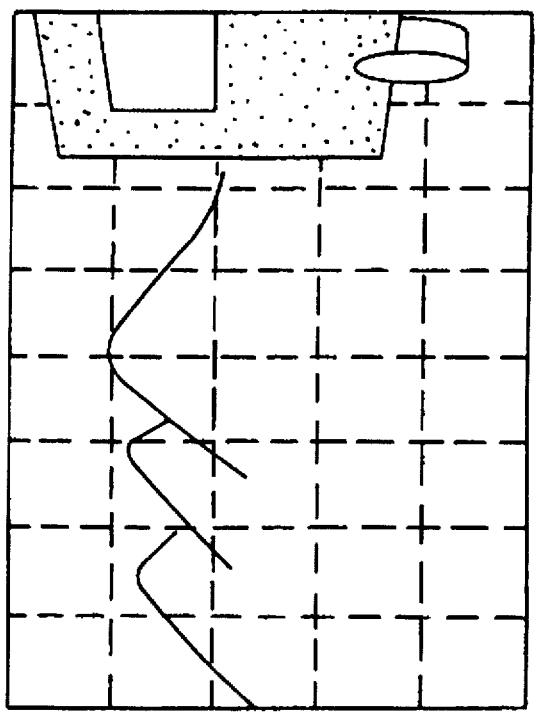
FIG. 20 is a typical diagram showing one example of 2D images.
Figure 20A:
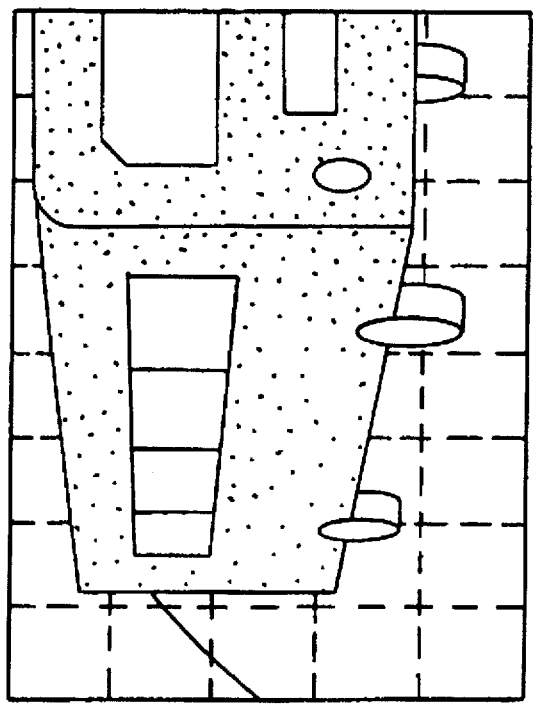

FIG. 20 illustrates images in which a subject (a bus) ahead of a background (mountains) is moving from the left to the right on a screen. The image on the left side of FIG. 20 is an image corresponding to the first field, and the image on the right side of FIG. 20 is an image corresponding to the tenth field.

Figure 21A:
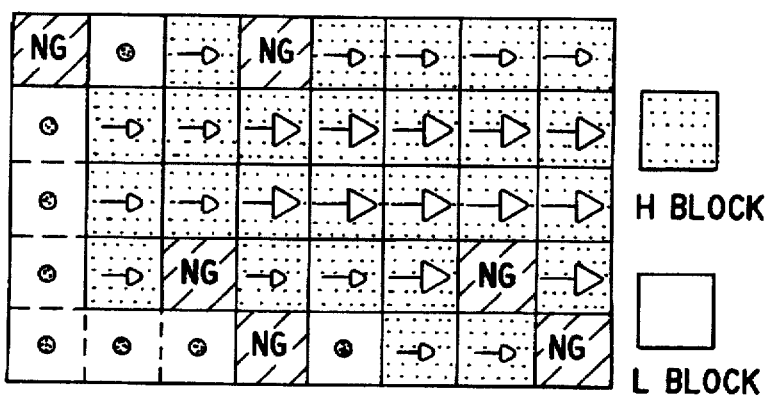
FIGS. 21a to 21c are diagrams for explaining processing for judging the back-and-forth positional relationship between subjects with respect to the 2D images shown in FIG. 20.
Figure 21B:
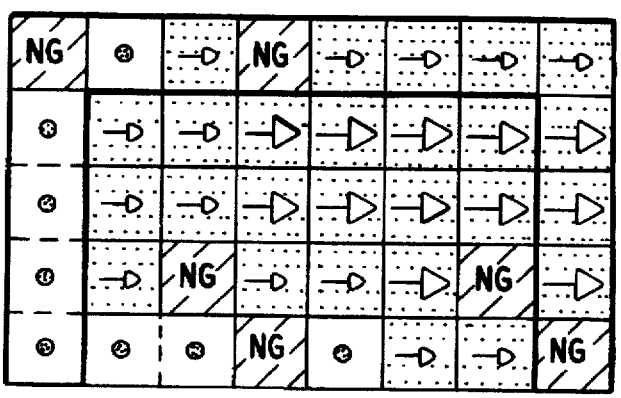

In such images, the sum of values related to motion vectors corresponding to ten fields for each of the motion vector detecting areas and NG areas are as shown in FIG. 21a, for example. As shown in FIG. 21b, the total number of H blocks existing in the first target area is eight, and the total number of L blocks existing in the first target area is five. In the judging processing A in the step S21 shown in FIG. 11a, therefore, it is judged that the total number of H blocks is larger, after which the program proceeds to the step S22. That is, as the result of the judging processing A, the H blocks are background areas and the L blocks are subject areas.

Figure 21C:
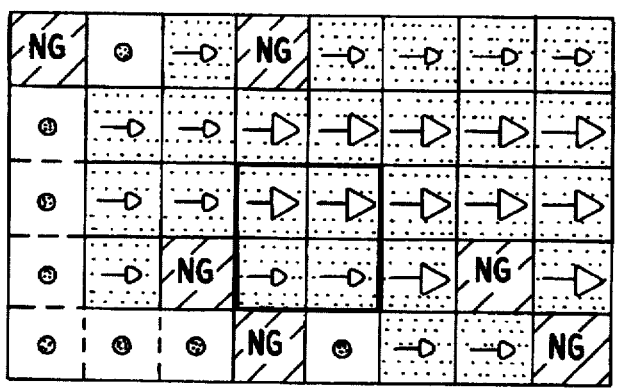

As shown in FIG. 21c, the total number of H blocks existing in the second target area is four, and the total number of L blocks existing in the second target area is zero. In the judging processing B in the step S22 shown in FIG. 11a, therefore, it is judged that the total number of H blocks is larger. That is, as the result of the judging processing B, the H blocks are subject areas and the L blocks are background areas. The result of the judging processing B differs from the result of the judging processing A, whereby the program proceeds to the step S25.

In the step S25, the total number of H blocks existing in all the motion vector detecting areas and the total number of L blocks existing in all the motion vector detecting areas are compared with each other, and the blocks whose total number is smaller are taken as target blocks. In this example, the total number of H blocks is 26, while the total number of L blocks is eight, whereby the L blocks are selected as target blocks. The program then proceeds to the step S29.

In the step S29, the ratio η of the total number of L blocks existing in the first target area to the total number of L blocks which are target blocks is found. In this example, the total number of L blocks is eight, and the total number of L blocks existing in the first target area is five. Therefore, the ratio η of the total number of L blocks existing in the first target area to the total number of L blocks becomes 5/8 (=0.625 ...), which is not less than 0.45, whereby the final result of judgment (c) is obtained. That is, it is judged that the H blocks are subject areas and the L blocks are background areas, and the result of the judgment is the final result of judgment.

Furthermore, the absolute value of the average motion vector (AH) for the H blocks which are subject areas is larger than the absolute value of the average motion value (AL) for the L blocks which are background areas. Accordingly, the determination of the target value of the delay in the step S36 shown in FIG. 11b is made in accordance with the rule I.

Specifically, the target value of the delay is taken as the absolute value of the average motion vector (AH) for the H blocks which are subject areas. In addition, a delayed image signal is selected as a right eye image corresponding to the direction to which the average motion vector (AH) for the H blocks is pointed.

In the image shown in FIG. 20, therefore, a delayed image is selected as a right eye image corresponding to the direction in which the bus is moving, thereby to obtain a 3D image in which the bus is positioned ahead of the mountains.

Figure 22B:
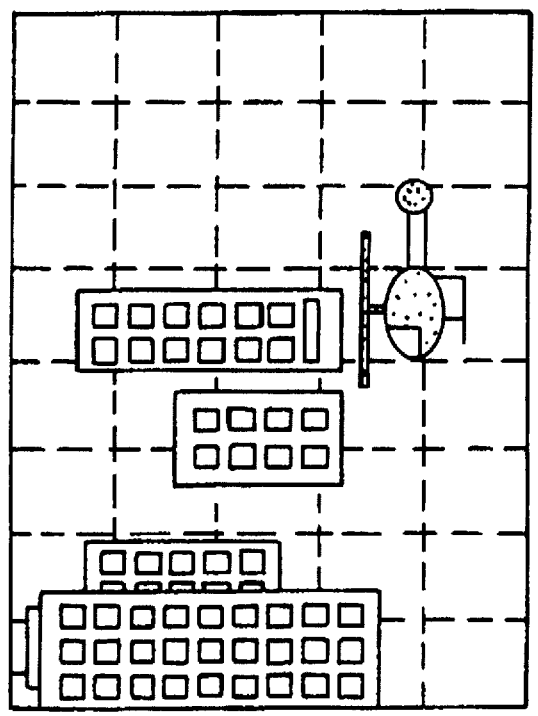
FIG. 22 is a typical diagram showing one example of 2D images.
Figure 22A:
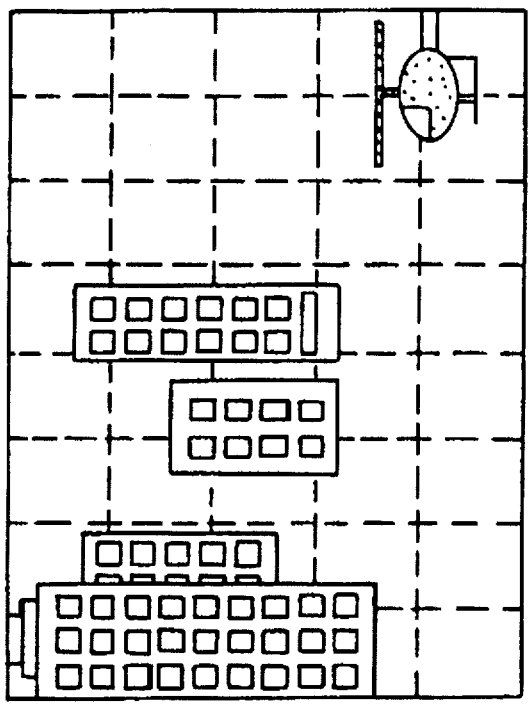

FIG. 22 illustrates images in which a subject (a helicopter) ahead of a background (buildings) is moving from the right end to the left on a screen. The image on the left side of FIG. 22 is an image corresponding to the first field, and the image on the right side of FIG. 22 is an image corresponding to the tenth field.

Figure 23A:
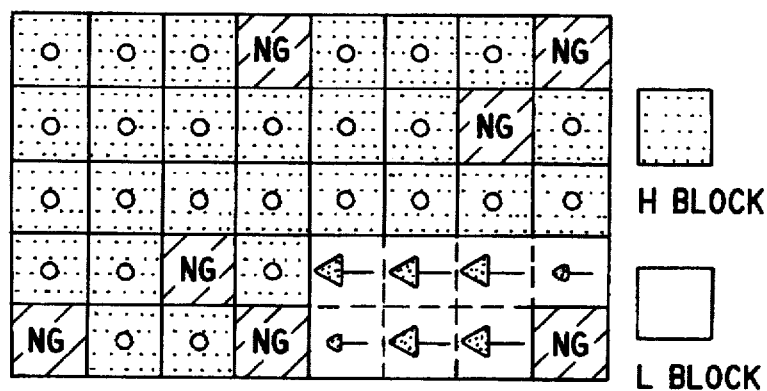
FIGS. 23a to 23c are diagrams for explaining processing for judging the back-and-forth positional relationship between subjects with respect to the 2D images shown in FIG. 22.
Figure 23B:
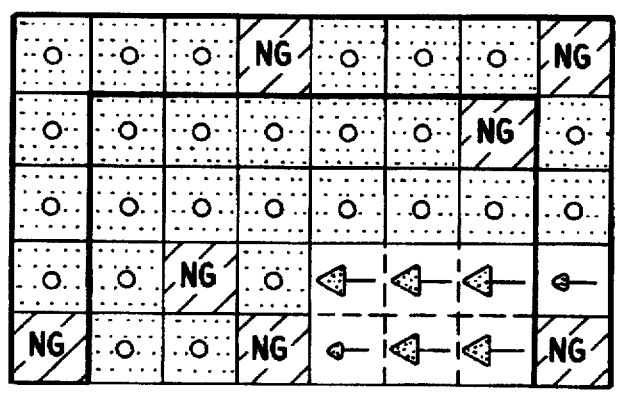

In such images, the sum of values related to motion vectors corresponding to ten fields for each of the motion vector detecting areas and NG areas are as shown in FIG. 23a, for example. As shown in FIG. 23b, the total number of H blocks existing in the first target area is 11, and the total number of L blocks existing in the first target area is one. In the judging processing A in the step S21 shown in FIG. 11a, therefore, it is judged that the total number of H blocks is larger, after which the program proceeds to the step S22. That is, as the result of the judging processing A, the H blocks are background areas and the L blocks are subject areas.

Figure 23C:
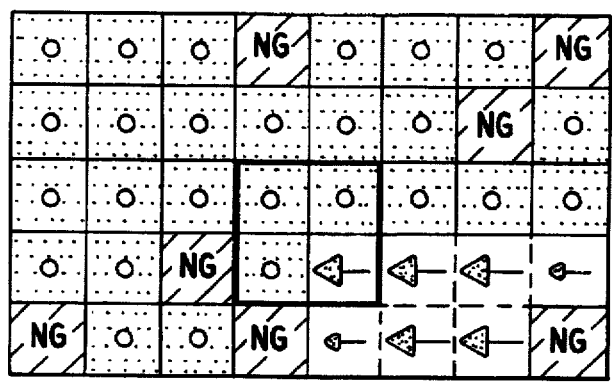

As shown in FIG. 23c, the total number of H blocks existing in the second target area is three, and the total number of L blocks existing in the second target area is one. In the judging processing B in the step S22 shown in FIG. 11a, therefore, it is judged that the total number of H blocks is larger. That is, as the result of the judging processing B, the H blocks are subject areas and the L blocks are background areas. The result of the judging processing B differs from the result of the judging processing A, whereby the program proceeds to the step S25.

In the step S25, the total number of H blocks existing in all the motion vector detecting areas and the total number of L blocks existing in all the motion vector detecting areas are compared with each other, and the blocks whose total number is smaller are taken as target blocks. In this example, the total number of H blocks is 26, and the total number of L blocks is seven, whereby the L blocks are selected as target blocks. The program then proceeds to the step S29.

In the step S29, the ratio η of the total number of L blocks existing in the first target area to the total number of L blocks which are target blocks is found. In this example, the total number of L blocks is seven, and the total number of L blocks existing in the first target area is one. Therefore, the ratio η of the total number of L blocks existing in the first target area to the total number of L blocks becomes 1/7 (=0.14 ... ), which is less than 0.45, whereby the final result of judgment (d) is obtained. That is, it is judged that the H blocks are background areas and the L blocks are subject areas, and the result of the judgment is the final result of judgment.

Furthermore, the absolute value of the average motion vector (AL) for the L blocks which are subject areas is larger than the absolute value of the average motion value (AH) for the H blocks which are background areas. Accordingly, the determination of the target value of the delay in the step S37 shown in FIG. 11b is made in accordance with the rule III.

Specifically, the target value of the delay is taken as the absolute value of the average motion vector (AL) for the L blocks which are subject areas. In addition, a delayed image signal is selected as a left eye image corresponding to the direction to which the average motion vector (AL) for the L blocks is pointed.

In the images shown in FIG. 22, therefore, a delayed image is selected as a left eye image corresponding to the direction in which the helicopter is moving, thereby to obtain a 3D image in which the helicopter is positioned ahead of the buildings.

Figure 24B:
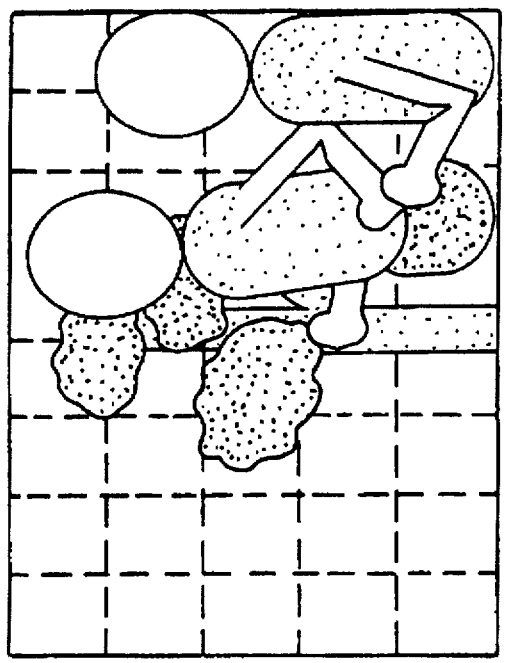
FIG. 24 is a typical diagram showing one example of 2D images.
Figure 24A:
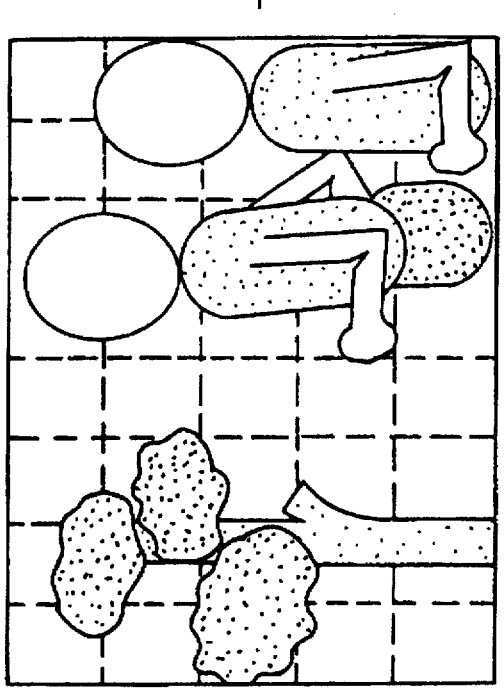

FIG. 24 illustrates images in which a background (a tree) behind a subject (persons) is moving from the left end to the right on a screen. The image on the left side of FIG. 24 is an image corresponding to the first field, and the image on the right side of FIG. 24 is an image corresponding to the tenth field.

Figure 25A:
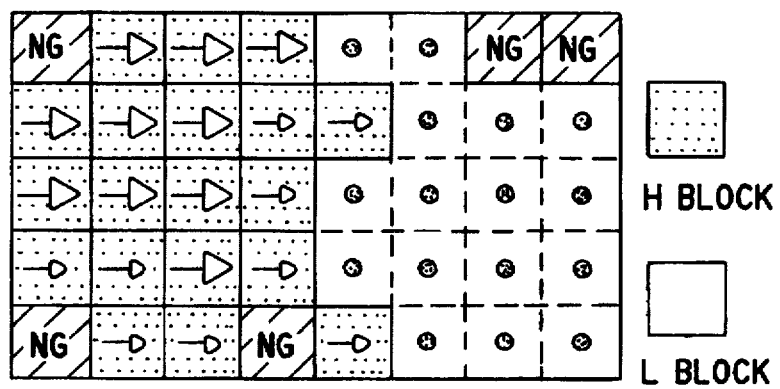
FIGS. 25a to 25c are diagrams for explaining processing for judging the back-and-forth positional relationship between subjects with respect to the 2D images shown in FIG. 24.
Figure 25B:
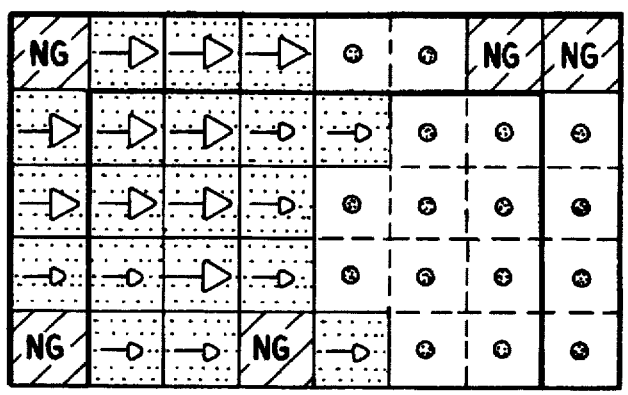

In such images, the sum of values related to motion vectors corresponding to ten fields for each of the motion vector detecting areas and NG areas are as shown in FIG. 25a, for example. As shown in FIG. 25b, the total number of H blocks existing in the first target area is six, and the total number of L blocks existing in the first target area is six. In the judging processing A in the step S21 shown in FIG. 11a, therefore, it is judged that the total number of H blocks and the total number of L blocks are equal, after which the program proceeds to the step S23.

Figure 25C:
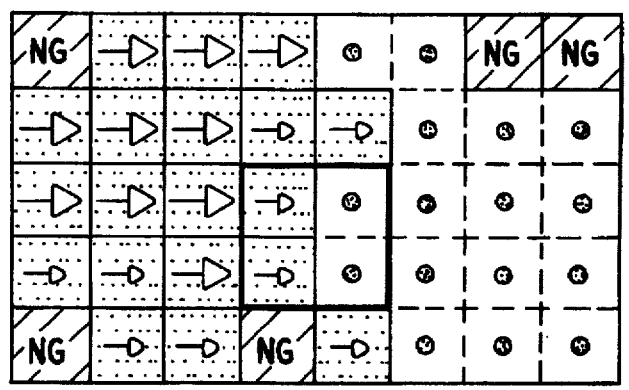

As shown in FIG. 25c, the total number of H blocks existing in the second target area is two, and the total number of L blocks existing in the second target area is two. Also in the judging processing B in the step S23 shown in FIG. 11a, therefore, it is judged that the total number of H blocks and the total number of L blocks are equal, after which the program proceeds to the step S26.

In the step S26, the total number of H blocks existing in all the motion vector detecting areas and the total number of L blocks existing in all the motion vector detecting areas are compared with each other, and the blocks whose total number is smaller are taken as target blocks. In this example, the total number of H blocks is 19, and the total number of L blocks is 16, whereby the L blocks are selected as target blocks. The program then proceeds to the step S31.

In the step S31, the ratio η of the total number of L blocks existing in the first target area to the total number of L blocks which are target blocks is found. In this example, the total number of L blocks is 16, and the total number of L blocks existing in the first target area is six. Therefore, the ratio η of the total number of L blocks existing in the first target area to the total number of L blocks becomes 6/16 (=0.37 ... ), which is less than 0.45, whereby the final result of judgment (k) is obtained. That is, it is judged that the H blocks are background areas and the L blocks are subject areas, and the result of the judgment is the final result of the judgment.

Furthermore, the absolute value of the average motion vector (AH) for the H blocks which are background areas is larger than the absolute value of the average motion value (AL) for the L blocks which are subject areas. Accordingly, the determination of the target value of the delay in the step S44 shown in FIG. 11b is made in accordance with the rule IV.

Specifically, the target value of the delay is taken as the absolute value of the average motion vector (AH) for the H blocks which are background areas. In addition, a delayed image signal is selected as a left eye image corresponding to the direction opposite to the direction to which the average motion vector (AH) for the H blocks is pointed.

In the images shown in FIG. 24, therefore, a delayed image is selected as a left eye image corresponding to the direction opposite to the direction in which the tree is moving, thereby to obtain a 3D image in which the tree is positioned behind the persons.

When in the steps S25, 26 and 27, the total number of H blocks and the total number of L blocks are equal, a target value of a delay is not calculated in the present period of 10 fields. In such a case, it is preferable that a target value of a delay calculated in the previous period of 10 fields as a target value of a delay in the subsequent period of 10 fields. In such a case, the target value of the delay in the subsequent field may be set to zero.

Figure 26:
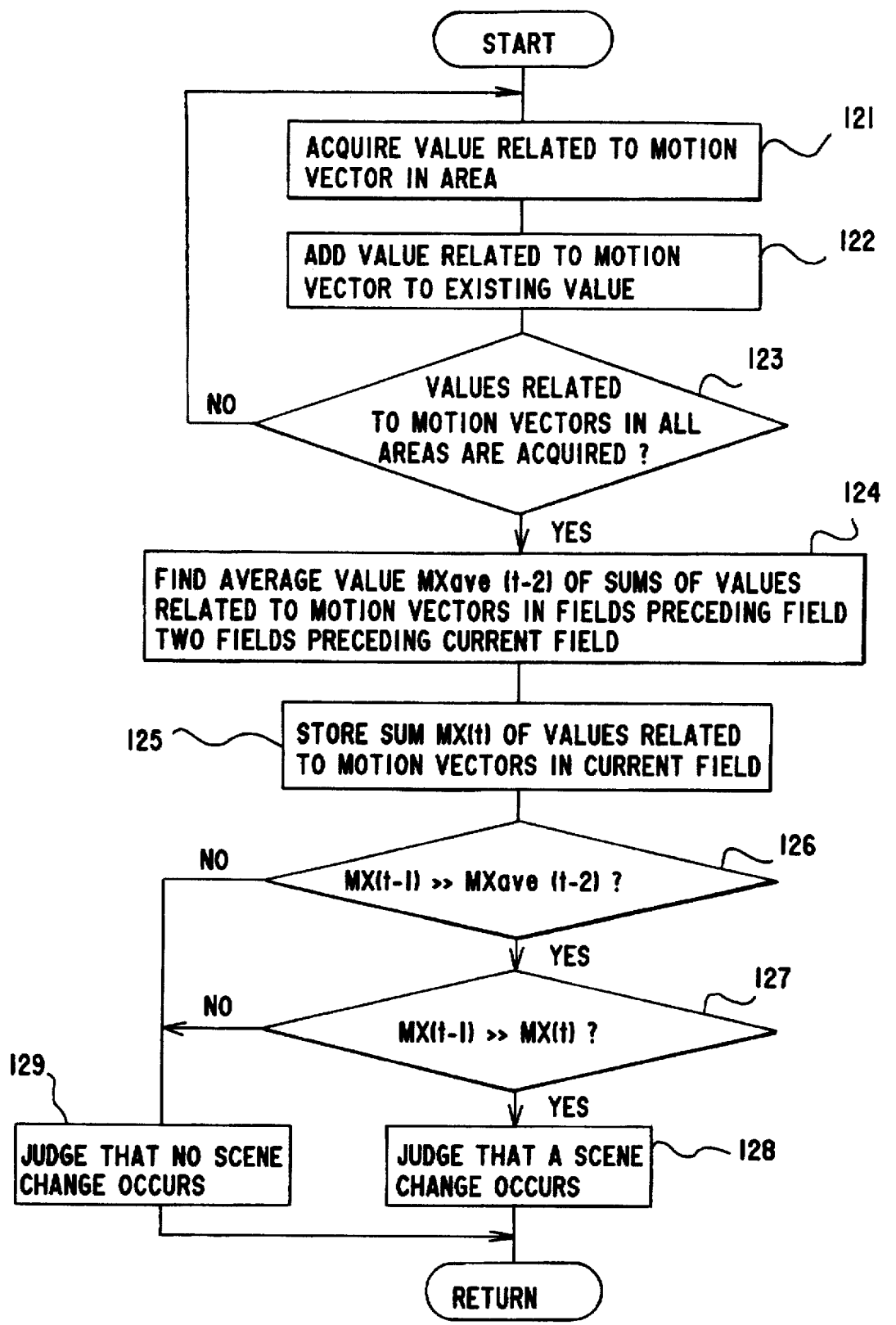

FIG. 26 shows processing used for judging whether or not a scene change occurs in the step 1 shown in FIG. 5a.

The magnitude of a motion vector in the horizontal direction (a value related to a motion vector) in the current field in predetermined one motion vector detecting area A1 out of a plurality of motion vector detecting areas A1 to H5 is first acquired (step 121). The value related to the motion vector acquired in the step 121 is then added to the existing value (step 122). The initial value of the existing value is zero. The program is then returned to the step 121. In the step 121, the magnitude of a motion vector in the horizontal direction (a value related to a motion vector) in the current field in the other motion vector detecting area B1 is acquired (step 121). The acquired value related to the motion vector is added to the existing value, that is, the value related to the motion vector in the motion vector detecting area A1 (step 122). The sum of values related to motion vectors in the current field in all the motion vector detecting areas A1 to H5 is thus calculated (steps 121, 122, 123).

When the current field is the t-th field (t is a natural number) and the sum of the values related to the motion vectors in the current field is taken as MX(t), MX(t) is represented by the following equation (1):

$$MX(t) = \sum_{i=1}^{Nx} \sum_{j=1}^{Ny} |\vec{Mij(t)} \cdot \vec{ex}| \qquad (1)$$

Nx: the number of motion vector detecting areas in the transverse direction of a screen Ny: the number of motion vector detecting areas in the longitudinal direction of the screen $\vec{Mij(t)}$: a motion vector in the t-th field $\vec{ex}$: a unit vector in the transverse direction When the sum of the values related to the motion vectors in the current field for all the motion vector detecting areas is calculated (YES in the step 123), the average value of the sums of values related to motion vectors in fields preceding a field which is two fields preceding the current field is found (step 124).

Specifically, the average value MXave(t−2) of the sum MX(t−3) of values related to motion vectors in an image corresponding to a field which is three fields preceding the current field and the sum MX(t−2) of values related to motion vectors in an image corresponding to a field which is two fields preceding the current field is taken as the average value MXave(t−2) of the sums of the values related to the motion vectors in the fields preceding the field which is two fields preceding the current field. MXave(t−2) is found on the basis of the following equation (2):

$$MXave(t) = \frac{1}{S} \cdot \sum_{k=1}^{S} MX(t+1-k) \qquad (2)$$

S: the number of fields for finding an average value

MX(t+1−k) : the sum of values related to motion vectors in the (t+1−k) field

In this example, S=2. Although in the present embodiment, the average value MXave(t−2) of the sum MX(t−3) of the values related to the motion vectors in the image corresponding to the field which is three fields preceding the current field and the sum MX(t−2) of the values related to the motion vectors in the image corresponding to the field which is two fields preceding the current field is taken as the average value of the sums of the values related to the motion vectors in the fields preceding the field which is two fields preceding the current field, the average value in two or more fields, for example, eight fields (S=8) from a field which is two fields preceding the current field to a field which is nine fields preceding the current field may be taken as the average value of the sums of the values related to the motion vectors in the fields preceding the field which is two fields preceding the current field.

The sum Mx(t) of the values related to the motion vectors in the current field which are obtained in the foregoing steps 121, 122 and 123 is then stored in a save memory (step 125). The sum of values related to motion vectors for each field is ensured with respect to images corresponding to several fields preceding the current field in the save memory.

It is then judged whether or not the sum MX(t−1) of values related to motion vectors in a field preceding the current field which is stored in the save memory is larger than the average value MXave(t−2) obtained in the step 124 by not less than a predetermined value (for example, 40 pixels) (step 126). When the sum MX(t−1) is not larger than the average value MXave(t−2) by not less than a predetermined value, it is judged that no scene change occurs between the (t−2)-th field and the (t−1)-th field (step 129).

When the sum MX(t−1) is larger than the average value MXave(t−2) by not less than a predetermined value, it is judged whether or not the sum MX(t−1) of the values related to the motion vectors in the field preceding the current field which is stored in the save memory is larger than the sum MX(t) of the values related to the motion vectors in the current field which is stored in the save memory by not less than a predetermined value (for example, 40 pixels) (step 127). When the sum MX(t−1) is not larger than the sum MX(t) by not less than a predetermined value, it is judged that no scene change occurs between the (t−2)-th field and the (t−1)-th field (step 129).

When the sum MX(t−1) is larger than the sum MX(t) by not less than a predetermined value, it is judged that a change point between scenes occurs between the image corresponding to the field which is two fields preceding the current field and the image corresponding to the field which is one field preceding the current field after which the program proceeds to the step 128.

Specifically, when the following expression (3) satisfying the conditions of MX(t−1)>>MXave(t−2) and MX(t−1)>>MX(t) holds, it is judged that the value related to a motion vector is rapidly increased, and it is judged that a scene change occurs between the (t−2)-th field and the (t−1)-th field (step 128):

$$MX(t-1) >> MXave(t-2) \cap MX(t-1) >> MX(t) \qquad (3)$$

(2) Description of Second Embodiment

Referring now FIGS. 27 to 31, a second embodiment of the present invention will be described in detail.

Figure 27:
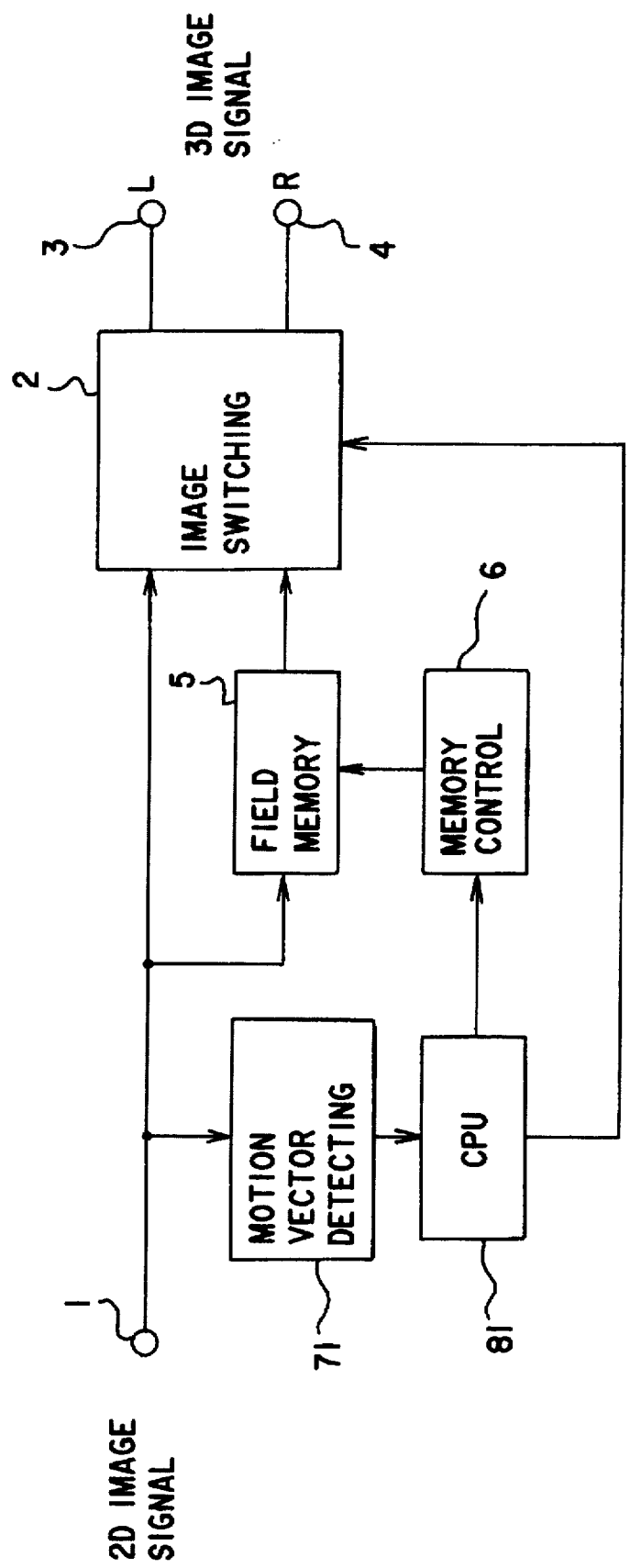
FIG. 27 is a block diagram showing the construction of a 2D/3D image converter.

FIG. 27 illustrates the construction of a 2D/3D image converter for converging 2D images into 3D images. In FIG. 27, the same units as those shown in FIG. 1 are assigned the same reference numerals and hence, the description thereof is not repeated.

In the 2D/3D image converter, processing for judging the back-and-forth positional relationship between subjects differs from the processing for judging the back-and-forth positional relationship between subjects which is performed in the 2D/3D image converter shown in FIG. 1.

Figure 28:
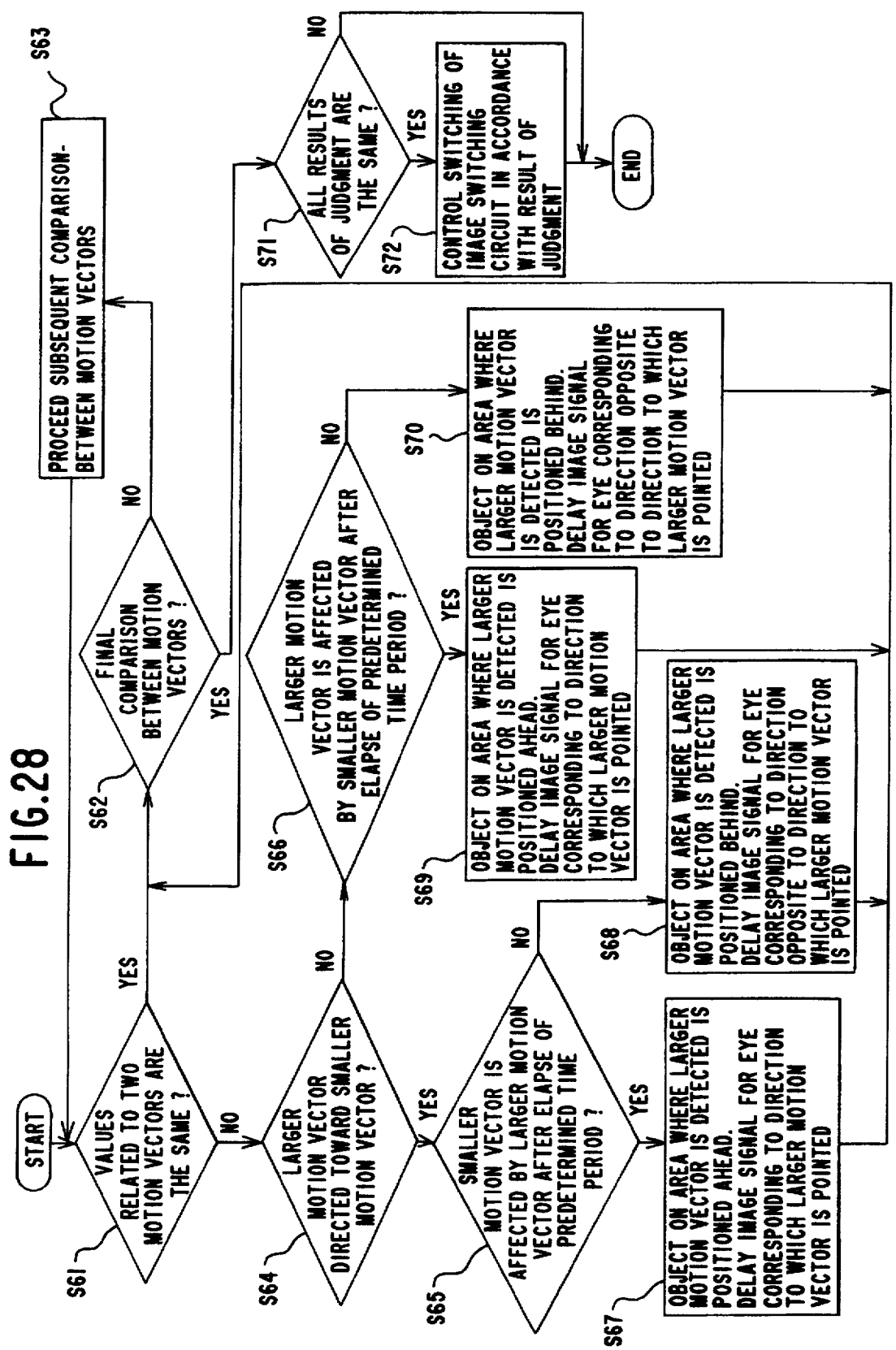
FIG. 28 is a flow chart showing the procedure for processing for judging the back-and-forth positional relationship between subjects by a CPU.

FIG. 28 shows the procedure for the processing for judging the back-and-forth positional relationship between subjects by a CPU 81.

Out of horizontal components of motion vectors (hereinafter merely referred to as motion vectors) respectively detected in a plurality of motion vector detecting areas existing on one screen, two motion vectors detected in motion vector detecting areas adjacent to each other in the horizontal direction are selected, and it is judged whether or not the selected two motion vectors are the same (are the same in both the magnitude and the direction) (step S61). The processing in the step S61 shall be referred to as comparing processing of motion vectors.

When it is judged that the motion vectors are the same (YES in the step S61), the program is returned to the step S61 through processing in the steps S62 and S63. In the step S61, new two motion vectors are selected, and it is judged whether or not the selected two motion vectors are the same.

When it is judged that the motion vectors differ (NO in the step S61), the program is returned to the step S61 through processing in the steps S64, S65, S67 (or S68), S62 and S63 or processing in the steps S64, S66, S69 (or S70), S62 and S63. In the step S61, new two motion vectors are selected, and it is judged whether or not the selected two motion vectors are the same.

Figure 29:
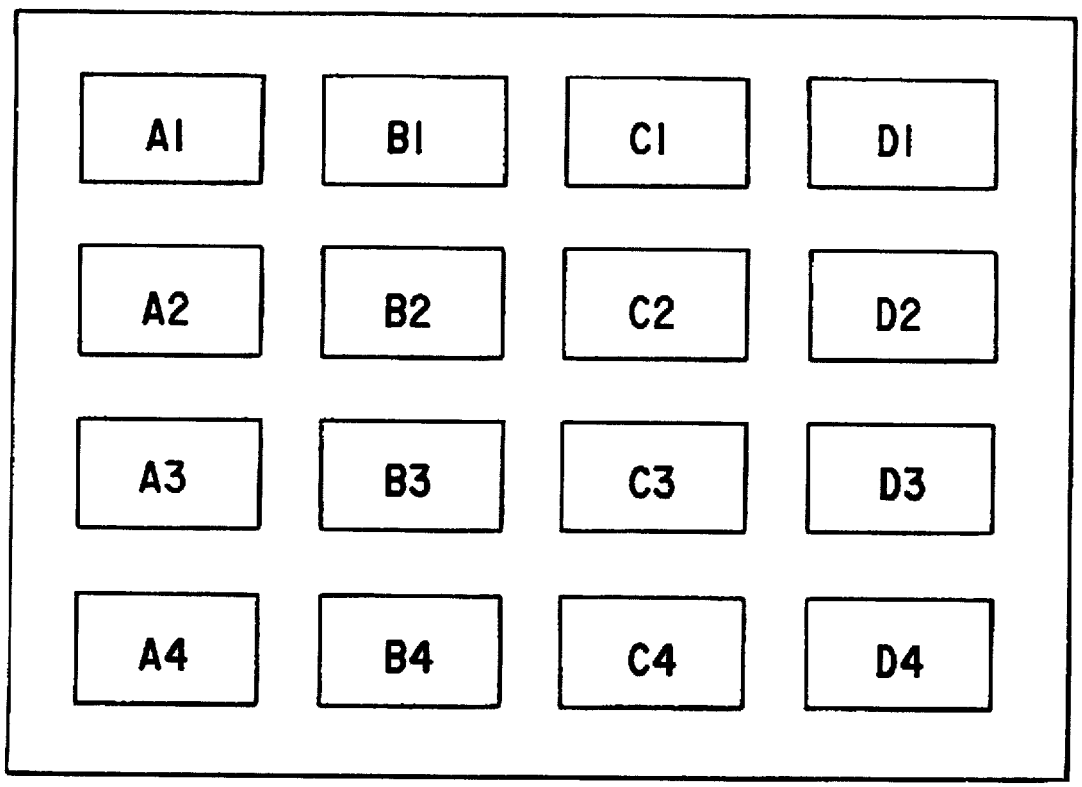
FIG. 29 is a typical diagram showing motion vector detecting areas A1 to D4.

In the present embodiment, a motion vector detecting circuit 71 detects motion vectors in 16 detecting areas A1, B1, C1, D1, A2, B2, C2, D2, A3, B3, C3, D3, A4, B4, C4 and D4 obtained by dividing a screen constituting one field into four in the longitudinal direction and four in the transverse direction, as shown in FIG. 29.

The comparing processing of motion vectors is performed from the left to the right on the first line from the top of FIG. 29, from the left to the right on the second line from the top, from the left to the right on the third line from the top, and from the left to the right on the fourth line from the top in this order. Specifically, if motion vectors respectively detected in the detecting areas A1, B1, C1, . . . D4 are respectively taken as a1, b1, c1 . . . d4, comparing processing of the motion vectors a1 and b1, comparing processing of the motion vectors the b1 and c1, comparing processing of the motion vectors c1 and d1, comparing processing of the motion vectors a2 and b2 . . . and comparing processing of the motion vectors c4 and d4 are performed in this order.

Description is made of processing performed in a case where it is judged in the step S61 that the motion vectors differ (NO in the step S61).

When it is judged that the motion vectors differ, it is judged whether or not the direction (the left direction or the right direction) of the larger motion vector out of the two motion vectors which are compared in the step S61 is the direction toward an area where the smaller motion vector is detected (step S64). At this time, the large or small relationship between the motion vectors is judged by the absolute values of values related to the motion vectors.

When it is judged that the larger motion vector is directed toward the area where the smaller motion vector is detected (YES in the step S64), it is judged whether or not a motion vector detected after an elapse of a predetermined time period in the area where the smaller motion vector out of the two motion vectors is detected is affected by the larger motion vector (step S65).

Specifically, it is judged whether or not a value related to the motion vector detected after an elapse of a predetermined time period in the area where the smaller motion vector is detected is the same as a value related to the larger motion vector or approaches the value related to the larger motion vector.

Furthermore, the predetermined time period is an estimated time period elapsed until an object on an area where the larger motion vector is detected is moved to the adjacent motion vector detecting area, and is calculated from the absolute value of the value related to the larger motion vector. Consequently, the larger the absolute value of the value related to the larger motion vector is, the shorter the predetermined time period is.

When it is judged that the motion vector is affected (YES in the step S65), it is judged that the object on the area where the larger motion vector is detected is a subject moving ahead of a background (step S67). It is judged that a delayed image signal should be selected as an image signal for the eye (the left eye or the right eye) corresponding to the direction (the left direction or the right direction) to which the larger motion vector is pointed.

When it is judged that the motion vector is not affected (NO in the step 65), it is judged that the object on the area where the larger motion vector is detected is a background moving behind a subject (step S68). It is judged that a delayed image signal should be selected as an image signal for the eye corresponding to the direction opposite to the direction to which the larger motion vector is pointed.

When it is judged in the foregoing step S64 that the larger motion vector is not directed toward the area where the smaller motion vector is detected (NO in the step S64), it is judged whether or not a motion vector detected after an elapse of a predetermined time period in the area where the larger motion vector out of the two motion vectors is detected is affected by the smaller motion vector (step S66).

Specifically, it is judged whether or not a value related to the motion vector detected after an elapse of a predetermined time period in the area where the larger motion vector is detected is the same as a value related to the smaller motion vector or approaches the value related to the smaller motion vector.

Furthermore, the predetermined time period is an estimated time period elapsed until an object on the area where the smaller motion vector is detected is moved to the adjacent motion vector detecting area, and is calculated from the absolute value of the value related to the smaller motion vector. Consequently, the larger the absolute value of the value related to the smaller motion vector is, the shorter the predetermined time period is.

When it is judged that the motion vector is affected (YES in the step S66), it is judged that the object on the area where the larger motion vector is detected is a subject moving ahead of a background (step S69). It is judged that a delayed image signal should be selected as an image signal for the eye corresponding to the direction to which the larger motion vector is pointed.

When it is judged that the motion vector is not affected (NO in the step S66), it is judged that the object on the area where the larger motion vector is detected is a background moving behind a subject (step S70). It is judged that a delayed image signal should be selected as an image signal for the eye corresponding to the direction opposite to the direction to which the larger motion vector is pointed.

When the processing in the foregoing step S67, S68, S69 or S70 is performed, the program proceeds to the step S62.

It is judged in the step S62 whether or not the comparison between motion vectors made in the step S61 is the final comparison between motion vectors on a screen constituting one field where motion vectors are detected. That is, it is judged in the step S61 that the motion vector c4 detected in the detecting area C4 and the motion vector d4 detected in the detecting area D4 are compared with each other.

When the comparison in the step S61 is not the comparison between the motion vector c4 detected in the detecting area C4 and the motion vector d4 detected in the detecting area D4, the program proceeds to the subsequent comparison between motion vectors (step S63). That is, the program is returned to the step S61. In the step S61, the subsequent comparison between motion vectors is made.

When it is judged in the step S61 that the motion vectors are the same (YES in the step S61), the program proceeds to the step S62.

It is judged in the step S62 whether or not the motion vector c4 detected in the detecting area C4 and the motion vector d4 detected in the detecting area D4 are compared with each other. When the comparison in the step S61 is not the comparison between the motion vector c4 detected in the detecting area C4 and the motion vector d4 detected in the detecting area D4, the program proceeds to the subsequent comparison between motion vectors (step S63).

When it is judged in the step S62 that the comparison in the step S61 is the comparison between the motion vector c4 detected in the detecting area C4 and the motion vector d4 detected in the detecting area D4, the program proceeds to the step S71.

It is judged in the step S71 whether or not all the results of judgment which are obtained in the foregoing steps S67, S68, S69 and S70 coincide as to whether a delayed image should be selected as a right eye image signal or a left eye image signal.

Specifically, when all the results of judgment are the result of judgment that a delayed image signal should be selected as a right eye image signal or when all the results of judgment are the result of judgment that a delayed image signal should be selected as a left eye image signal, it is judged that all the results of judgment coincide.

When it is judged that all the results of judgment coincide, the image switching circuit 2 is controlled in accordance with the results of judgment which are obtained in the foregoing steps S67, S68, S69 and S70 (step S72). Specifically, when all the results of judgment are the result of judgment that a delayed image signal should be selected as a right eye image signal, the image switching circuit 2 is so controlled that a delayed image signal is selected as a right eye image signal. When all the results of judgment are the result of judgment that a delayed image signal should be selected as a left eye image signal, the image switching circuit 2 is so controlled that a delayed image signal is selected as a left eye image signal.

When it is not judged in the foregoing step S71 that all the results of judgment coincide, the present processing is terminated without carrying out the control in the step S72. That is, switching control is not carried out with respect to the image switching circuit 2.

Figures 31A, 31B, 31C:
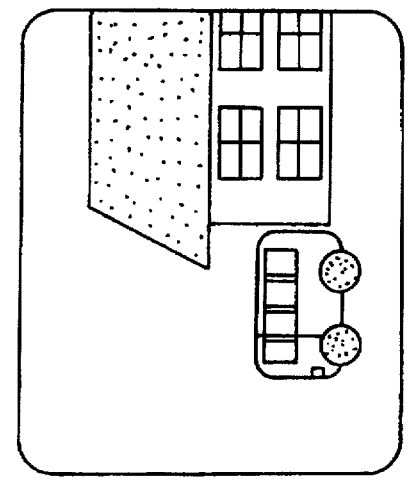
FIG. 31 is a diagram for specifically explaining the procedure for the processing for judging the back-and-forth positional relationship between subjects.
Figures 31D, 31E, 31F:
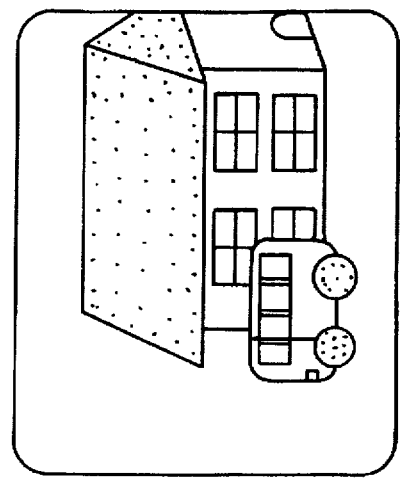

Description is now made of processing for judging the back-and-forth positional relationship between subjects which is performed by the CPU 81 in a case where the original 2D image signal inputted to the input terminal 1 is an image representing the first scene shown in FIG. 30 and a case where the original 2D image signal is an image representing the second scene shown in FIG. 31.

FIG. 30 illustrates images respectively corresponding to three fields constituting the first scene, that is, images, (a), (b) and (c) which are elapsed in this order and the magnitude and the direction of motion vectors in each of the images. The scene illustrated in FIG. 30 is represented by images in which a bird (a subject) is flying from the left to the right ahead of mountains (a background) in a still state.

The image (b) is an image corresponding to a field which is several fields succeeding a field corresponding to the image (a) (after an elapse of a predetermined time period). The image (c) is an image corresponding to a field which is several fields succeeding a field corresponding to the image (b) (after an elapse of a predetermined time period).

FIG. 31 illustrates images respectively corresponding to three fields constituting the second scene, that is, images (a), (b) and (c) which are elapsed in this order and the magnitude and the direction of motion vectors in each of the images. The scene illustrated in FIG. 31 is represented by images in which a bus (a subject) is running from the left to the right. However, the images are images picked up centered around the bus. Accordingly, a house (a background) is moving from the left to the right behind the bus in a still state on a screen. That is, on this scene, the house (a background) is moving behind the bus (a subject).

The image (b) is an image corresponding to a field which is several fields succeeding a field corresponding to the image (a) (after an elapse of a predetermined time period). The image (c) is an image corresponding to a field which is several fields succeeding a field corresponding to the image (b) (after an elapse of a predetermined time period).

Description is now made of the operation of the CPU 81 in a case where the original 2D image inputted to the input terminal 1 is the image representing the first scene shown in FIG. 30.

In the images representing the first scene shown in FIG. 30, when the current field corresponds to the image (a) shown in FIG. 30, mountains (a background) are an object to be detected in motion vector detecting areas A1, B1, C1, D1, A2, B2, C2 and D2 on the first line and the second line, whereby values related to motion vectors a1, b1, c1, d1, a2, b2, c2 and d2 are all zero. Consequently, all the values related to the motion vectors detected in the respective motion vector detecting areas A1 to D2 on the first line and the second line are equal. While comparing processing of motion vectors detected between the detecting areas adjacent to each other in the transverse direction is performed in the motion vector detecting areas A1 to D2 on the first line and the second line, therefore, the processing in the foregoing steps S61, S62 and S63 is repeated.

In the first, third and fourth motion vector detecting areas A3, C3 and D3 from the left on the third line, mountains (a background) are an object to be detected, whereby values related to motion vectors a3, c3 and d3 are zero. On the other hand, in the second motion vector detecting area B3 from the left, a bird flying from the left to the right is an object to be detected, whereby a motion vector b3 becomes a vector directed from the left to the right (a vector directed rightward).

When the motion vector a3 detected in the area A3 and the motion vector b3 detected in the area B3 are compared with each other, therefore, it is judged that both the motion vectors are not the same, whereby the answer is in the negative in the step S61, after which the program proceeds to the step S64.

It is judged in the step S64 whether or not the larger motion vector b3 out of the motion vector a3 and the motion vector b3 is directed toward the area A3 where the smaller motion vector a3 is detected. In this example, the motion vector b3 is not directed toward the area A3, whereby the program proceeds to the step S66.

It is judged in the step S66 whether or not a motion vector detected after an elapse of a predetermined time period in the area B3 where the larger motion vector b3 is detected is affected by the smaller motion vector a3. In this example, as shown in FIG. 30(b), a value related to a motion vector b3' detected after an elapse of a predetermined time period in the area B3 becomes zero, and is equal to the value related to the smaller motion vector a3. Therefore, it is judged that the motion vector detected after an elapse of a predetermined time period in the area B3 where the larger motion vector b3 is detected is affected by the smaller motion vector a3, after which the program proceeds to the step S69.

It is judged in the step S69 that an object on the area where the larger motion vector b3 is detected (a bird) is positioned ahead of an object on the area where the smaller motion vector a3 is detected (mountains). It is judged that a delayed image signal should be selected as an image signal for the right eye corresponding to the right direction to which the larger motion vector b3 is pointed.

Thereafter, the program proceeds to the step S62. It is judged in the step S62 that comparison of all motion vectors on one screen has not been terminated. In the step S63, two motion vector detecting areas where subsequent comparison between motion vectors is to be made are selected, after which the program is returned to the step S61.

In the step S61, the motion vector b3 detected in the second area B3 from the left on the third line and the motion vector c3 detected in the third area C3 from the left are compared with each other. It is judged that both the motion vectors b3 and c3 are not the same, after which the program proceeds to the step S64.

It is judged in the step S64 whether or not the larger motion vector b3 out of the motion vector b3 and the motion vector c3 is directed toward the area C3 where the smaller motion vector c3 is detected. In this example, the motion vector b3 is directed toward the area C3, whereby the program proceeds to the step S65.

It is judged in the step S65 whether or not a motion vector detected after an elapse of a predetermined time period in the area C3 where the smaller motion vector c3 is detected is affected by the larger motion vector b3. In this example, as shown in FIG. 30(b), a value related to a motion vector c3' detected after an elapse of a predetermined time period in the area C3 is the same as the value related to the larger motion vector b3. Therefore, it is judged that the motion vector detected after an elapse of a predetermined time period in the area C3 where the smaller motion vector c3 is detected is affected by the larger motion vector b3, after which the program proceeds to the step S67.

It is judged in the step S67 that an object on the area where the larger motion vector b3 is detected (a bird) is positioned ahead of an object on the area where the smaller motion vector c3 is detected (mountains). It is judged that a delayed image signal should be selected as an image signal for the right eye corresponding to the right direction to which the larger motion vector b3 is pointed.

Thereafter, the program proceeds to the step S62. It is judged in the step S62 that comparison of all motion vectors on one screen has not been terminated. In the step S63, two motion vector detecting areas where subsequent comparison between motion vectors is to be made are selected, after which the program is returned to the step S61.

In the step S61, the motion vector c3 detected in the third area C3 from the left on the third line and the motion vector d3 detected in the fourth area D3 from the left are compared with each other. It is judged that both the motion vectors c3 and d3 are the same, after which the program is returned to the step S61.

In the step S61, comparing processing of motion vectors in motion vector detecting areas on the fourth line is started. In the first, third and fourth motion vector detecting areas A4, C4 and D4 from the left on the fourth line, mountains (a background) are an object to be detected, as in the motion vector detecting areas on the third line, whereby values related to the motion vectors a4, c4 and d4 are zero. In the second detecting area B4 from the left, a bird flying from the left to the right is an object to be detected, whereby the motion vector b4 is a vector directed from the left to the right (a vector directed rightward).

Consequently, the same processing as the above described processing on the third line is performed. Specifically, in the processing based on comparison between the motion vector a4 and the motion vector b4, it is judged that an object on an area where the motion vector b4 is detected is positioned ahead of an object on an area where the motion vector a4 is detected, whereby it is judged that a delayed image signal should be selected as a right eye image signal.

Furthermore, in the processing based on comparison between the motion vector b4 and the motion vector c4, it is judged that the object on the area where the motion vector b4 is detected is positioned ahead of an object on an area where the motion vector c4 is detected, whereby it is judged that a delayed image signal should be selected as a right eye image signal.

When the comparison between the motion vector c4 and the motion vector d4 is terminated, it is judged in the step S62 that comparison of all motion vectors on one screen is terminated, after which the program proceeds to the step S71.

In the step S71, the four results of judgment obtained in the foregoing processing are compared. In this example, all the four results of judgment are the result of judgment that a delayed image signal should be selected as a right eye image signal, whereby all the results of judgment coincide, after which the program proceeds to the step S72.

In the step S72, the switching of the image switching circuit 2 is so controlled that a delayed image signal is selected as a right eye image signal in accordance with the foregoing result of judgment.

Consequently, such a 3D image that a bird (a subject) which is an object on the areas where the motion vectors b3 and b4 are detected is raised forward against mountains (a background) which are an object on the areas where the motion vectors a3, c3, a4 and c4 are detected is recognized by a viewer.

Description is now made of a case where the current field corresponds to the image (b) shown in FIG. 30. The result of processing based on comparison between the motion vectors b3' and C3' and the result of processing based on comparison between motion vectors b4' and c4' are the same as the result of processing based on the comparison between the motion vectors a3 and b3 shown in FIG. 30(a). In addition, the result of processing based on comparison between motion vectors c3' and d3' and the result of processing based on comparison between motion vectors c4' and d4' are the same as the result of processing based on the comparison between the motion vectors b3 and c3 shown in FIG. 30(a). Therefore, in the step S72, the switching of the image switching circuit 2 is so controlled that a delayed image signal is selected as a right eye image signal.

Consequently, such a 3D image that a bird (a subject) which is an object on areas where the motion vectors b3' and c4' are detected is raised forward against mountains (a background) which are an object on areas where the motion vectors b3', d3', b4' and d4' are detected is recognized by a viewer.

Description is now made of the operation of the CPU 81 in a case where the original 2D image inputted to the input terminal 1 is the image representing the second scene shown in FIG. 31.

In the images representing the second scene shown in FIG. 31, when the current field corresponds to the image (a) shown in FIG. 31, a house (a background) moving rightward on a screen is an object to be detected in motion vector detecting areas A1, B1, C1, D1, A2, B2, C2 and D2 on the first line and the second line, whereby motion vectors a1, b1, c1, d1, a2, b2, c2 and d2 are vectors directed rightward, and all values related to the motion vectors are equal. While comparing processing of motion vectors detected between the detecting areas adjacent to each other in the transverse direction is performed in the motion vector detecting areas A1 to D2 on the first line and the second line, therefore, the processing in the foregoing steps S61, S62 and S63 is repeated.

In the first, third and fourth motion vector detecting areas A3, C3 and D3 from the left on the third line, a house (a background) moving from the left to the right is an object to be detected, whereby the motion vectors a3, c3 and d3 become vectors directed rightward, and all values related to the motion vectors are equal. On the other hand, in the second motion vector detecting area B3 from the left, an automobile which stands still on the screen is an object to be detected, whereby a value related to the motion vector b3 is zero.

When the motion vector a3 detected in the area A3 and the motion vector b3 detected in the area B3 are compared with each other, therefore, it is judged that both the motion vectors are not the same, whereby the answer is in the negative in the step S61, after which the program proceeds to the step S64.

It is judged in the step S64 whether or not the larger motion vector a3 out of the motion vector a3 and the motion vector b3 is directed toward the area B3 where the smaller motion vector b3 is detected. In this example, the motion vector a3 is directed toward the area B3, whereby the program proceeds to the step S65.

It is judged in the step S65 whether or not a motion vector detected after an elapse of a predetermined time period in the area B3 where the smaller motion vector b3 is detected is affected by the larger motion vector a3. In this example, as shown in FIG. 31(b), a value related to a motion vector b3' detected after an elapse of a predetermined time period in the area B3 remains zero. Therefore, it is judged that the motion vector detected after an elapse of a predetermined time period in the area B3 where the smaller motion vector b3 is detected is not affected by the larger motion vector a3, after which the program proceeds to the step S68.

It is judged in the step S68 that an object on the area where the larger motion vector a3 is detected (a house) is positioned behind an object on the area where the smaller motion vector b3 is detected (an automobile). It is judged that a delayed image signal should be selected as an image signal for the left eye corresponding to the left direction opposite to the right direction to which the larger motion vector a3 is pointed.

Thereafter, the program proceeds to the step S62. It is judged in the step S62 that comparison of all motion vectors on one screen has not been terminated. In the step S63, two motion vector detecting areas where subsequent comparison between motion vectors is to be made are selected, after which the program is returned to the step S61.

In the step S61, the motion vector b3 detected in the second area B3 from the left on the third line and the motion vector c3 detected in the third area C3 from the left are compared with each other. It is judged that both the motion vectors b3 and c3 are not the same, after which the program proceeds to the step S64.

It is judged in the step S64 whether or not the larger motion vector c3 out of the motion vector b3 and the motion vector c3 is directed toward the area B3 where the smaller motion vector b3 is detected. In this example, the motion vector c3 is not directed toward the area B3, whereby the program proceeds to the step S66.

It is judged in the step S66 whether or not a motion vector detected after an elapse of a predetermined time period in the area C3 where the larger motion vector c3 is detected is affected by the smaller motion vector b3. In this example, as shown in FIG. 31(b), a motion vector c3' detected after an elapse of a predetermined time period in the area C3 remains the motion vector c3. Therefore, it is judged that the motion vector detected after an elapse of a predetermined time period in the area C3 where the larger motion vector c3 is detected is not affected by the smaller motion vector b3, after which the program proceeds to the step S70.

It is judged in the step S70 that an object on the area where the larger motion vector c3 is detected (a house) is positioned behind an object on the area where the smaller motion vector b3 is detected (an automobile). It is judged that a delayed image signal should be selected as an image signal for the left eye corresponding to the left direction opposite to the right direction to which the larger motion vector c3 is pointed.

Thereafter, the program proceeds to the step S62. It is judged in the step S62 that comparison of all motion vectors on one screen has not been terminated. In the step S63, two motion vector detecting areas where subsequent comparison between motion vectors is to be made are selected, after which the program is returned to the step S61.

In the step S61, the motion vector c3 detected in the third area C3 from the left on the third line and the motion vector d3 detected in the fourth area D3 from the left are compared with each other. It is judged that both the motion vectors c3 and d3 are the same, after which the program is returned to the step S61.

In the step S61, comparing processing of motion vectors in motion vector detecting areas on the fourth line is started. In the first, third and fourth motion vector detecting areas A4, C4 and D4 from the left on the fourth line, a house (a background) moving from the left to the right on the screen is an object to be detected, as in the motion vector detecting areas on the third line, whereby the motion vectors a4, c4 and d4 are vectors directed rightward. In the second motion vector detecting area B4 from the left, an automobile which stands still on the screen is an object to be detected, whereby a value related to the motion vector b3 is zero.

Consequently, the same processing as the above described processing on the third line is performed. Specifically, in the processing based on comparison between the motion vector a4 and the motion vector b4, it is judged that an object on an area where the motion vector a4 is detected is positioned behind an object on an area where the motion vector b4 is detected, whereby it is judged that a delayed image signal should be selected as a left eye image signal.

Furthermore, in the processing based on comparison between the motion vector b4 and the motion vector c4, it is judged that an object on an area where the motion vector c4 is detected is positioned behind the object on the area where the motion vector b4 is detected, whereby it is judged that a delayed image signal should be selected as a left eye image signal.

When the comparison between the motion vector c4 and the motion vector d4 is terminated, it is judged in the step S62 that comparison of all motion vectors on one screen is terminated, after which the program proceeds to the step S71.

In the step S71, the four results of judgment obtained in the foregoing processing are compared. In this example, all the four results of judgment are the result of judgment that a delayed image signal should be selected as a left eye image signal, whereby all the results of judgment coincide, after which the program proceeds to the step S72.

In the step S72, the switching of the image switching circuit 2 is so controlled that a delayed image signal is selected as a left eye image signal in accordance with the foregoing result of judgment.

Consequently, such a 3D image that a house (a background) which is an object on the areas where the motion vectors a3, c3, a4 and c4 are detected is raised forward against an automobile (a subject) which is an object on the areas where the motion vectors b3 and b4 are detected is recognized by a viewer.

Description is now made of a case where the current field corresponds to the image (b) shown in FIG. 31. The result of processing based on comparison between motion vectors a3' and b3' and the result of processing based on comparison between motion vectors a4' and b4' are the same as the result of processing based on the comparison between the motion vectors a3 and b3 shown in FIG. 31(a). In addition, the result of processing based on comparison between the motion vectors b3' and c3' and the result of processing based on comparison between motion vectors c4' and c4' are the same as the result of processing based on the comparison between the motion vectors b3 and c3 shown in FIG. 31(a). Therefore, in the step S72, the switching of the image switching circuit 2 is so controlled that a delayed image signal is selected as a left eye image signal.

Consequently, such a 3D image that a house (a background) which is an object on areas where the motion vectors a3', c3', a4' and c4' are detected is raised backward against an automobile (a subject) which is an object on areas where the motion vectors b3' and b4' are detected is recognized by a viewer.

Although in the above described examples shown in FIGS. 30 and 31, all the results of judgment which are obtained in the step S67, S68, S69 or S70 are the same, whereby the program proceeds to the step 72 from the step S71. When the movement of a subject in the original 2D image is complicated and motion vectors are not accurately detected, different results of judgment are included in the results of judgment which are obtained in the step S67, 68, 69 or 70.

In such a case, it is judged in the step S71 that all the results of judgment do not coincide with each other, whereby switching control of the image switching circuit 2 is not carried out in the step S72, whereby the present switched state is held.

Although in the above described embodiments, motion vectors are detected for each image corresponding to one field, motion vectors may be detected for each image corresponding to one frame or for each image corresponding to several fields. In the broad sense of the present invention, one frame and several fields are also represented by one field.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of judging the back-and-forth positional relationship between subjects, comprising:

a first step of setting in an image area constituting a two-dimensional image a plurality of detecting areas for detecting amounts of horizontal movement of subjects;

a second step of respectively detecting the amounts of horizontal movement of the subjects for said detecting areas;

a third step of comparing the amounts of horizontal movement of the subjects which are detected for said respective detecting areas after assigning the amounts of horizontal movement plus or minus signs depending on the direction of the movement, to classify all the detecting areas into two types of detecting areas in such a manner that the detecting areas where a relatively large amount of horizontal movement is detected are taken as first detecting areas, while the detecting areas where a relatively small amount of horizontal movement is detected are taken as second detecting areas;

a fourth step of setting a target area in a peripheral portion in said image area, to judge which of the total number of first detecting areas existing in said target area and the total number of second detecting areas existing in the target area is larger; and a fifth step of judging that the subjects in all the detecting areas whose total number existing in the target area is judged to be larger are positioned behind the subjects in all the detecting areas whose total number existing in the target area is judged to be smaller.

2. A method of judging the back-and-forth positional relationship between subjects, comprising:

a first step of setting in an image area constituting a two-dimensional image a plurality of detecting areas for detecting amounts of horizontal movement of subjects;

a second step of respectively detecting the amounts of horizontal movement of the subjects for said detecting areas;

a third step of comparing the amounts of horizontal movement of the subjects which are detected for said respective detecting areas after assigning the amounts of horizontal movement plus or minus signs depending on the direction of the movement, to classify all the detecting areas into two types of detecting areas in such a manner that the detecting areas where a relatively large amount of horizontal movement is detected are taken as first detecting areas, while the detecting areas where a relatively small amount of horizontal movement is detected are taken as second detecting areas;

a fourth step of setting a target area in a central portion in said image area, to judge which of the total number of first detecting areas existing in said target area and the total number of second detecting areas existing in the target area is larger; and a fifth step of judging that the subjects in all the detecting areas whose total number existing in the target area is judged to be larger are positioned ahead of the subjects in all the detecting areas whose total number existing in the target area is judged to be smaller.

3. A method of judging the back-and-forth positional relationship between subjects, comprising:

a first step of setting in an image area constituting a two-dimensional image a plurality of detecting areas for detecting amounts of horizontal movement of subjects;

a second step of respectively detecting the amounts of horizontal movement of the subjects for said detecting areas;

a third step of comparing the amounts of horizontal movement of the subjects which are detected for said respective detecting areas after assigning the amounts of horizontal movement plus or minus signs depending on the direction of the movement, to classify all the detecting areas into two types of detecting areas in such a manner that the detecting areas where a relatively large amount of horizontal movement is detected are taken as first detecting areas, while the detecting areas where a relatively small amount of horizontal movement is detected are taken as second detecting areas;

a fourth step of setting a first target area in a peripheral portion in said image area, to judge which of the total number of first detecting areas existing in said first target area and the total number of second detecting areas existing in the first target area is larger;

a fifth step of setting a second target area in a central portion in said image area, to judge which of the total number of first detecting areas existing in said second target area and the total number of second detecting areas existing in the second target area is larger; and a sixth step of judging, when the detecting areas whose total number existing in the first target area is judged to be larger in said fourth step out of the first detecting areas and the second detecting areas and the detecting areas whose total number existing in the second target area is judged to be larger in said fifth step out of the first detecting areas and the second detecting areas differ, that the subjects in all the detecting areas whose total number existing in the first target area is judged to be larger in said fourth step are positioned behind the subjects in all the detecting areas whose total number existing in the first target area is judged to be smaller in said fourth step.

4. A method of judging the back-and-forth positional relationship between subjects, comprising:

a first step of setting in an image area constituting a two-dimensional image a plurality of detecting areas for detecting amounts of horizontal movement of subjects;

a second step of respectively detecting the amounts of horizontal movement of the subjects for said detecting areas;

a third step of comparing the amounts of horizontal movement of the subjects which are detected for said respective detecting areas after assigning the amounts of horizontal movement plus or minus signs depending on the direction of the movement, to classify all the detecting areas into two types of detecting areas in such a manner that the detecting areas where a relatively large amount of horizontal movement is detected are taken as first detecting areas, while the detecting areas where a relatively small amount of horizontal movement is detected are taken as second detecting areas;

a fourth step of setting a first target area in a peripheral portion in said image area, to judge which of the total number of first detecting areas existing in said first target area and the total number of second detecting areas existing in the first target area is larger;

a fifth step of setting a second target area in a central portion in said image area, to judge which of the total number of first detecting areas existing in said second target area and the total number of second detecting areas existing in the second target area is larger;

a sixth step of judging, when the detecting areas whose total number existing in the first target area is judged to be larger in said fourth step out of the first detecting areas and the second detecting areas and the detecting areas whose total number existing in the second target area is judged to be larger in said fifth step out of the first detecting areas and the second detecting areas differ, that the subjects in all the detecting areas whose total number existing in the first target area is judged to be larger in said fourth step are positioned behind the subjects in all the detecting areas whose total number existing in the first target area is judged to be smaller in said fourth step;

a seventh step of judging, when the detecting areas whose total number existing in the first target area is judged to be larger in said fourth step out of the first detecting areas and the second detecting areas and the detecting areas whose total number existing in the second target area is judged to be larger in said fifth step out of the first detecting areas and the second detecting areas are the same, which of the total number of first detecting areas existing in all the detecting areas and the total number of second detecting areas existing in all the detecting areas is smaller; and an eighth step of taking as third detecting areas the detecting areas whose total number existing in all the detecting areas is judged to be smaller in said seventh step out of the first detecting areas and the second detecting areas, to judge the back-and-forth positional relationship between the subjects in the first detecting areas and the subjects in the second detecting areas on the basis of the ratio of the total number of third detecting areas existing in said first target area to the total number of third detecting areas existing in all the detecting areas.

5. The method according to claim 4, wherein said eighth step comprises the steps of judging that the subjects in one detecting areas, which correspond to the third detecting areas, out of the first detecting areas and the second detecting areas are positioned behind the subjects in the other detecting areas when the ratio of the number of third detecting areas existing in the first target area to the total number of third detecting areas existing in all the detecting areas is not less than a predetermined value, and judging that the subjects in the one detecting areas, which correspond to the third detecting areas, out of the first detecting areas and the second detecting areas are positioned ahead of the subjects in the other detecting areas when the ratio of the number of third detecting areas existing in the first target area to the total number of third detecting areas in all the detecting areas is less than a predetermined value.

6. A method of judging the back-and-forth positional relationship between subjects, comprising:

a first step of setting in an image area constituting a two-dimensional image a plurality of detecting areas for detecting amounts of horizontal movement of subjects;

a second step of respectively detecting the amounts of horizontal movement of the subjects for said detecting areas;

a third step of comparing the amounts of horizontal movement of the subjects which are detected for said respective detecting areas after assigning the amounts of horizontal movement plus or minus signs depending on the direction of the movement, to classify all the detecting areas into two types of detecting areas in such a manner that the detecting areas where a relatively large amount of horizontal movement is detected are taken as first detecting areas, while the detecting areas where a relatively small amount of horizontal movement is detected are taken as second detecting areas;

a fourth step of setting a first target area in a peripheral portion in said image area, to judge which of the total number of first detecting areas existing in said first target area and the total number of second detecting areas existing in the first target area is larger;

a fifth step of setting a second target area in a central portion in said image area, to judge which of the total number of first detecting areas existing in said second target area and the total number of second detecting areas existing in the second target area is larger;

a sixth step of judging, when the detecting areas whose total number existing in the first target area is judged to be larger in said fourth step out of the first detecting areas and the second detecting areas and the detecting areas whose total number existing in the second target area is judged to be larger in said fifth step out of the first detecting areas and the second detecting areas differ, that the subjects in all the detecting areas whose total number existing in the first target area is judged to be larger in said fourth step are positioned behind the subjects in all the detecting areas whose total number existing in the first target area is judged to be smaller in said fourth step;

a seventh step of judging, when it is judged in said fourth step that the total number of either first detecting areas or second detecting areas existing in the first target area is larger and it is judged in said fifth step that the total numbers of first detecting areas and second detecting areas existing in the second target area are equal, that the subjects in all the detecting areas whose total number existing in the first target area is judged to be larger in said fourth step are positioned behind the subject in all the detecting areas whose total number existing in the first target area is judged to be smaller in said fourth step;

an eighth step of judging, when it is judged in said fourth step that the total numbers of first detecting areas and second detecting areas existing in the first target area are equal and it is judged in said fifth step that the total number of either first detecting areas or second detecting areas existing in the second target area is larger, that the subjects in all the detecting areas whose total number existing in the second target area is judged to be larger in said fifth step are positioned ahead of the subjects in all the detecting areas whose total number existing in the second target area is judged to be smaller in said fifth step;

a ninth step of judging, when the detecting areas whose total number existing in the first target area is judged to be larger in said fourth step out of the first detecting areas and the second detecting areas and the detecting areas whose total number existing in the second target area is judged to be larger in said fifth step out of the first detecting areas and the second detecting areas are the same, or it is judged in both said fourth step and said fifth step that the total numbers of first detecting areas and second detecting areas in said target area are equal, which of the total number of first detecting areas existing in all the detecting areas and the total number of second detecting areas existing in all the detecting areas is smaller; and a tenth step of taking as third detecting areas the detecting areas whose total number existing in all the detecting areas is judged to be smaller in said ninth step out of the first detecting areas and the second detecting areas, to judge the back-and-forth positional relationship between the subjects in the first detecting areas and the subjects in the second detecting areas on the basis of the ratio of the total number of third detecting areas existing in said first target area to the total number of third detecting areas existing in all the detecting areas.

7. The method according to claim 6, wherein said tenth step comprises the steps of judging that the subjects in one detecting areas, which correspond to the third detecting areas, out of the first detecting areas and the second detecting areas are positioned behind the subjects in the other detecting areas when the ratio of the number of third detecting areas existing in the first target area to the total number of third detecting areas existing in all the detecting areas is not less than a predetermined value, and judging that the subjects in the one detecting areas, which correspond to the third detecting areas, out of the first detecting areas and the second detecting areas are positioned ahead of the subjects in the other detecting areas when the ratio of the number of third detecting areas existing in the first target area to the total number of third detecting areas in all the detecting areas is less than a predetermined value.

8. A method of judging the back-and-forth positional relationship between subjects, comprising:

a first step of setting in an image area constituting a two-dimensional image a plurality of detecting areas for detecting amounts of horizontal movement of subjects;

a second step of respectively detecting the amounts of horizontal movement of the subjects for said detecting areas;

a third step of comparing for two detecting areas adjacent to each other in the horizontal direction out of said detecting areas the amounts of horizontal movement of the subjects which are detected in both the detecting areas;

a fourth step of judging, when the amounts of horizontal movement of the subjects which are detected in the two detecting areas adjacent to each other in the horizontal direction differ and the subject whose amount of horizontal movement is larger is moving toward the subject whose amount of horizontal movement is smaller, whether the amount of horizontal movement of a subject which is detected after an elapse of a predetermined time period in the detecting area where the subject whose amount of horizontal movement is smaller is detected is changed in the direction in which it approaches the amount of horizontal movement of the subject whose amount of horizontal movement is larger;

a fifth step of judging, when it is judged in said fourth step that the amount of horizontal movement of the subject which is detected after an elapse of a predetermined time period in the detecting area where the subject whose amount of horizontal movement is smaller is detected is changed in the direction in which it approaches the amount of horizontal movement of the subject whose amount of horizontal movement is larger, that the subject whose amount of horizontal movement is larger is positioned ahead of the subject whose amount of horizontal movement is smaller;

a sixth step of judging, when it is judged in said fourth step that the amount of horizontal movement of the subject which is detected after an elapse of a predetermined time period in the detecting area where the subject whose amount of horizontal movement is smaller is detected is not changed in the direction in which it approaches the amount of horizontal movement of the subject whose amount of horizontal movement is larger, that the subject whose amount of horizontal movement is larger is positioned behind the subject whose amount of horizontal movement is smaller;

a seventh step of judging, when the amounts of horizontal movement of the subjects which are detected in the two detecting areas adjacent to each other in the horizontal direction differ and the subject whose amount of horizontal movement is larger is not moving toward the subject whose amount of horizontal movement is smaller, whether the amount of horizontal movement of a subject which is detected after an elapse of a predetermined time period in the detecting area where the subject whose amount of horizontal movement is larger is detected is changed in the direction in which it approaches the amount of horizontal movement of the subject whose amount of horizontal movement is smaller;

an eighth step of judging, when it is judged in said seventh step that the amount of horizontal movement of the subject which is detected after an elapse of a predetermined time period in the detecting area where the subject whose amount of horizontal movement is larger is detected is changed in the direction in which it approaches the amount of horizontal movement of the subject whose amount of horizontal movement is smaller, that the subject whose amount of horizontal movement is larger is positioned ahead of the subject whose amount of horizontal movement is smaller; and a ninth step of judging, when it is judged in said seventh step that the amount of horizontal movement of the subject which is detected after an elapse of a predetermined time period in the detecting area where the subject whose amount of horizontal movement is larger is detected is not changed in the direction in which it approaches the amount of horizontal movement of the subject whose amount of horizontal movement is smaller, that the subject whose amount of horizontal movement is larger is positioned behind the subject whose amount of horizontal movement is smaller.

9. A method of converting two-dimensional images into three-dimensional images, in which a main image signal and a sub-image signal delayed from the main image signal are produced from a two-dimensional image signal, and one of the main image signal and the sub-image signal is taken as a left eye image and the other image signal is taken as a right eye image, comprising the steps of:

judging the back-and-forth positional relationship between subjects whose amount of horizontal movement is larger and subjects whose amount of horizontal movement is smaller on the basis of said two-dimensional image signal; and determining which of the main image signal and the sub-image signal is taken as a left eye image or a right eye image on the basis of the result of the judgment of the back-and-forth positional relationship.

10. The method according to claim 9, wherein said step of judging the back-and-forth positional relationship between subjects whose amount of horizontal movement is larger and subjects whose amount of horizontal movement is smaller comprises a first step of setting in an image area constituting a two-dimensional image a plurality of detecting areas for detecting amounts of horizontal movement of subjects, a second step of respectively detecting the amounts of horizontal movement of the subjects for said detecting areas, a third step of comparing the amounts of horizontal movement of the subjects which are detected for said respective detecting areas after assigning the amounts of horizontal movement plus or minus signs depending on the direction of the movement, to classify all the detecting areas into two types of detecting areas in such a manner that the detecting areas where a relatively large amount of horizontal movement is detected are taken as first detecting areas, while the detecting areas where a relatively small amount of horizontal movement is detected are taken as second detecting areas, a fourth step of setting a target area in a peripheral portion in said image area, to judge which of the total number of first detecting areas existing in said target area and the total number of second detecting areas existing in the target area is larger, and a fifth step of judging that the subjects in all the detecting areas whose total number existing in the target area is judged to be larger are positioned behind the subjects in all the detecting areas whose total number existing in the target area is judged to be smaller.

11. The method according to claim 9, wherein said step of judging the back-and-forth positional relationship between subjects whose amount of horizontal movement is larger and subjects whose amount of horizontal movement is smaller comprises a first step of setting in an image area constituting a two-dimensional image a plurality of detecting areas for detecting amounts of horizontal movement of subjects, a second step of respectively detecting the amounts of horizontal movement of the subjects for said detecting areas, a third step of comparing the amounts of horizontal movement of the subjects which are detected for said respective detecting areas after assigning the amounts of horizontal movement plus or minus signs depending on the direction of the movement, to classify all the detecting areas into two types of detecting areas in such a manner that the detecting areas where a relatively large amount of horizontal movement is detected are taken as first detecting areas, while the detecting areas where a relatively small amount of horizontal movement is detected are taken as second detecting areas, a fourth step of setting a target area in a central portion in said image area, to judge which of the total number of first detecting areas existing in said target area and the total number of second detecting areas existing in the target area is larger, and a fifth step of judging that the subjects in all the detecting areas whose total number existing in the target area is judged to be larger are positioned ahead of the subjects in all the detecting areas whose total number existing in the target area is judged to be smaller.

12. The method according to claim 9, wherein said step of judging the back-and-forth positional relationship between subjects whose amount of horizontal movement is larger and subjects whose amount of horizontal movement is smaller comprises a first step of setting in an image area constituting a two-dimensional image a plurality of detecting areas for detecting amounts of horizontal movement of subjects, a second step of respectively detecting the amounts of horizontal movement of the subjects for said detecting areas, a third step of comparing the amounts of horizontal movement of the subjects which are detected for said respective detecting areas after assigning the amounts of horizontal movement plus or minus signs depending on the direction of the movement, to classify all the detecting areas into two types of detecting areas in such a manner that the detecting areas where a relatively large amount of horizontal movement is detected are taken as first detecting areas, while the detecting areas where a relatively small amount of horizontal movement is detected are taken as second detecting areas, a fourth step of setting a first target area in a peripheral portion in said image area, to judge which of the total number of first detecting areas existing in said first target area and the total number of second detecting areas existing in the first target area is larger, a fifth step of setting a second target area in a central portion in said image area, to judge which of the total number of first detecting areas existing in said second target area and the total number of second detecting areas existing in the second target area is larger, and a sixth step of judging, when the detecting areas whose total number existing in the first target area is judged to be larger in said fourth step out of the first detecting areas and the second detecting areas and the detecting areas whose total number existing in the second target area is judged to be larger in said fifth step out of the first detecting areas and the second detecting areas differ, that the subjects in all the detecting areas whose total number existing in the first target area is judged to be larger in said fourth step are positioned behind the subjects in all the detecting areas whose total number existing in the first target area is judged to be smaller in said fourth step.

13. The method according to claim 9, wherein said step of judging the back-and-forth positional relationship between subjects whose amount of horizontal movement is larger and subjects whose amount of horizontal movement is smaller comprises a first step of setting in an image area constituting a two-dimensional image a plurality of detecting areas for detecting amounts of horizontal movement of subjects, a second step of respectively detecting the amounts of horizontal movement of the subjects for said detecting areas, a third step of comparing the amounts of horizontal movement of the subjects which are detected for said respective detecting areas after assigning the amounts of horizontal movement plus or minus signs depending on the direction of the movement, to classify all the detecting areas into two types of detecting areas in such a manner that the detecting areas where a relatively large amount of horizontal movement is detected are taken as first detecting areas, while the detecting areas where a relatively small amount of horizontal movement is detected are taken as second detecting areas, a fourth step of setting a first target area in a peripheral portion in said image area, to judge which of the total number of first detecting areas existing in said first target area and the total number of second detecting areas existing in the first target area is larger, a fifth step of setting a second target area in a central portion in said image area, to judge which of the total number of first detecting areas existing in said second target area and the total number of second detecting areas existing in the second target area is larger, and a sixth step of judging, when the detecting areas whose total number existing in the first target area is judged to be larger in said fourth step out of the first detecting areas and the second detecting areas and the detecting areas whose total number existing in the second target area is judged to be larger in said fifth step out of the first detecting areas and the second detecting areas differ, that the subjects in all the detecting areas whose total number existing in the first target area is judged to be larger in said fourth step are positioned behind the subjects in all the detecting areas whose total number existing in the first target area is judged to be smaller in said fourth step, a seventh step of judging, when the detecting areas whose total number existing in the first target area is judged to be larger in said fourth step out of the first detecting areas and the second detecting areas and the detecting areas whose total number existing in the second target area is judged to be larger in said fifth step out of the first detecting areas and the second detecting areas are the same, which of the total number of first detecting areas existing in all the detecting areas and the total number of second detecting areas existing in all the detecting areas is smaller, and an eighth step of taking as third detecting areas the detecting areas whose total number existing in all the detecting areas is judged to be smaller in said seventh step out of the first detecting areas and the second detecting areas, to judge the back-and-forth positional relationship between the subjects in the first detecting areas and the subjects in the second detecting areas on the basis of the ratio of the total number of third detecting areas existing in said first target area to the total number of third detecting areas existing in all the detecting areas.

14. The method according to claim 13, wherein said eighth step comprises the steps of judging that the subjects in one detecting areas, which correspond to the third detecting areas, out of the first detecting areas and the second detecting areas are positioned behind the subjects in the other detecting areas when the ratio of the number of third detecting areas existing in the first target area to the total number of third detecting areas existing in all the detecting areas is not less than a predetermined value, and judging that the subjects in the one detecting areas, which correspond to the third detecting areas, out of the first detecting areas and the second detecting areas are positioned ahead of the subjects in the other detecting areas when the ratio of the number of third detecting areas existing in the first target area to the total number of third detecting areas in all the detecting areas is less than a predetermined value.

15. The method according to claim 9, wherein said step of judging the back-and-forth positional relationship between subjects whose amount of horizontal movement is larger and subjects whose amount of horizontal movement is smaller, comprises a first step of setting in an image area constituting a two-dimensional image a plurality of detecting areas for detecting amounts of horizontal movement of subjects, a second step of respectively detecting the amounts of horizontal movement of the subjects for said detecting areas, a third step of comparing the amounts of horizontal movement of the subjects which are detected for said respective detecting areas after assigning the amounts of horizontal movement plus or minus signs depending on the direction of the movement, to classify all the detecting areas into two types of detecting areas in such a manner that the detecting areas where a relatively large amount of horizontal movement is detected are taken as first detecting areas, while the detecting areas where a relatively small amount of horizontal movement is detected are taken as second detecting areas, a fourth step of setting a first target area in a peripheral portion in said image area, to judge which of the total number of first detecting areas existing in said first target area and the total number of second detecting areas existing in the first target area is larger, a fifth step of setting a second target area in a central portion in said image area, to judge which of the total number of first detecting areas existing in said second target area and the total number of second detecting areas existing in the second target area is larger, a sixth step of judging, when the detecting areas whose total number existing in the first target area is judged to be larger in said fourth step out of the first detecting areas and the second detecting areas and the detecting areas whose total number existing in the second target area is judged to be larger in said fifth step out of the first detecting areas and the second detecting areas differ, that the subjects in all the detecting areas whose total number existing in the first target area is judged to be larger in said fourth step are positioned behind the subjects in all the detecting areas whose total number existing in the first target area is judged to be smaller in said fourth step, a seventh step of judging, when it is judged in said fourth step that the total number of either first detecting areas or second detecting areas existing in the first target area is larger and it is judged in said fifth step that the total numbers of first detecting areas and second detecting areas existing in the second target area are equal, that the subjects in all the detecting areas whose total number existing in the first target area is judged to be larger in said fourth step are positioned behind the subjects in all the detecting areas whose total number existing in the first target area is judged to be smaller in said fourth step, an eighth step of judging, when it is judged in said fourth step that the total numbers of first detecting areas and second detecting areas existing in the first target area are equal and it is judged in said fifth step that the total number of either first detecting areas or second detecting areas existing in the second target area is larger, that the subjects in all the detecting areas whose total number existing in the second target area is judged to be larger in said fifth step is positioned ahead of the subjects in all the detecting areas whose total number existing in the second target area is judged to be smaller in said fifth step, a ninth step of judging, when the detecting areas whose total number existing in the first target area is judged to be larger in said fourth step out of the first detecting areas and the second detecting areas and the detecting areas whose total number existing in the second target area is judged to be larger in said fifth step out of the first detecting areas and the second detecting areas are the same, or it is judged in both said fourth step and said fifth step that the total numbers of first detecting areas and second detecting areas in said target area are equal, which of the total number of first detecting areas existing in all the detecting areas and the total number of second detecting areas existing in all the detecting areas is smaller, and a tenth step of taking as third detecting areas the detecting areas whose total number existing in all the detecting areas is judged to be smaller in said ninth step out of the first detecting areas and the second detecting areas, to judge the back-and-forth positional relationship between subjects in the first detecting areas and the subjects in the second detecting areas on the basis of the ratio of the total number of third detecting areas existing in said first target area to the total number of third detecting areas existing in all the detecting areas.

16. The method according to claim 15, wherein said tenth step comprises the steps of judging that the subjects in one detecting areas, which correspond to the third detecting areas, out of the first detecting areas and the second detecting areas are positioned behind the subjects in the other detecting areas when the ratio of the number of third detecting areas existing in the first target area to the total number of third detecting areas existing in all the detecting areas is not less than a predetermined value, and judging that the subjects in the one detecting areas, which correspond to the third detecting areas, out of the first detecting areas and the second detecting areas are positioned ahead of the subjects in the other detecting areas when the ratio of the number of third detecting areas existing in the first target area to the total number of third detecting areas in all the detecting areas is less than a predetermined value.

17. The method according to claim 9 wherein said step of judging the back-and-forth positional relationship between subjects whose amount of horizontal movement is larger and subjects whose amount of horizontal movement is smaller, comprising a first step of setting in an image area constituting a two-dimensional image a plurality of detecting areas for detecting amounts of horizontal movement of the subjects, a second step of respectively detecting the amounts of horizontal movement of the subjects for said detecting areas, a third step of comparing for the two detecting areas adjacent to each other in the horizontal direction out of said detecting areas the amounts of horizontal movement of the subjects which are detected in both the detecting areas, a fourth step of judging, when the amounts of horizontal movement of the subjects which are detected in the two detecting areas adjacent to each other in the horizontal direction differ and the subject whose amount of horizontal movement is larger is moving toward the subject whose amount of horizontal movement is smaller, whether the amount of horizontal movement of the subject which is detected after an elapse of a predetermined time period in the detecting area where the subject whose amount of horizontal movement is smaller is detected is changed in the direction in which it approaches the amount of horizontal movement of the subject whose amount of horizontal movement is larger, a fifth step of judging, when it is judged in said fourth step that the amount of horizontal movement of a subject which is detected after an elapse of a predetermined time period in the detecting area where the subject whose amount of horizontal movement is smaller is detected is changed in the direction in which it approaches the amount of horizontal movement of the subject whose amount of horizontal movement is larger, that the subject whose amount of horizontal movement is larger is positioned ahead of the subject whose amount of horizontal movement is smaller, a sixth step of judging, when it is judged in said fourth step that the amount of horizontal movement of the subject which is detected after an elapse of a predetermined time period in the detecting area where the subject whose amount of horizontal movement is smaller is detected is not changed in the direction in which it approaches the amount of horizontal movement of the subject whose amount of horizontal movement is larger, that the subject whose amount of horizontal movement is larger is positioned behind the subject whose amount of horizontal movement is smaller, a seventh step of judging, when the amounts of movement of the subjects which are detected in the two detecting areas adjacent to each other in the horizontal direction differ and the subject whose amount of horizontal movement is larger is not moving toward the subject whose amount of horizontal movement is smaller, whether the amount of horizontal movement of a subject which is detected after an elapse of a predetermined time period in the detecting areas where the subject whose amount of horizontal movement is larger is detected is changed in the direction in which it approaches the amount of horizontal movement of the subject whose amount of horizontal movement is smaller, an eighth step of judging, when it is judged in said seventh step that the amount of horizontal movement of the subject which is detected after an elapse of a predetermined time period in the detecting area where the subject whose amount of horizontal movement is larger is detected is changed in the direction in which it approaches the amount of horizontal movement of the subject whose amount of horizontal movement is smaller, that the subject whose amount of horizontal movement is larger is positioned ahead of the subject whose amount of horizontal movement is smaller, and a ninth step of judging, when it is judged in said seventh step that the amount of horizontal movement of the subject which is detected after an elapse of a predetermined time period in the detecting area where the subject whose amount of horizontal movement is larger is detected is not changed in the direction in which it approaches the amount of horizontal movement of the subject whose amount of horizontal movement is smaller, that the subject whose amount of horizontal movement is larger is positioned behind the subject whose amount of horizontal movement is smaller.

* * * * *